United States Patent
Park et al.

(10) Patent No.: US 10,547,865 B2
(45) Date of Patent: Jan. 28, 2020

(54) INTER-LAYER VIDEO ENCODING METHOD FOR COMPENSATING FOR LUMINANCE DIFFERENCE AND DEVICE THEREFOR, AND VIDEO DECODING METHOD AND DEVICE THEREFOR

(71) Applicant: SAMSUNG ELECTRONICS CO., LTD., Suwon-si (KR)

(72) Inventors: Min-woo Park, Yongin-si (KR); Jin-young Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 206 days.

(21) Appl. No.: 15/319,487

(22) PCT Filed: Jun. 28, 2015

(86) PCT No.: PCT/KR2015/006215
§ 371 (c)(1),
(2) Date: Dec. 16, 2016

(87) PCT Pub. No.: WO2015/194896
PCT Pub. Date: Dec. 23, 2015

(65) Prior Publication Data
US 2017/0155920 A1 Jun. 1, 2017

Related U.S. Application Data
(60) Provisional application No. 62/013,805, filed on Jun. 18, 2014.

(51) Int. Cl.
*H04N 19/52* (2014.01)
*H04N 19/176* (2014.01)
(Continued)

(52) U.S. Cl.
CPC ........... *H04N 19/52* (2014.11); *H04N 19/176* (2014.11); *H04N 19/55* (2014.11); *H04N 19/563* (2014.11); *H04N 19/625* (2014.11)

(58) Field of Classification Search
None
See application file for complete search history.

(56) References Cited

U.S. PATENT DOCUMENTS

| 8,311,095 | B2 | 11/2012 | Brown et al. |
| 9,083,983 | B2 | 7/2015 | Coban et al. |

(Continued)

FOREIGN PATENT DOCUMENTS

| CN | 103843347 A | 6/2014 |
| EP | 0 986 262 A2 | 3/2000 |

(Continued)

OTHER PUBLICATIONS

Park et al., "3D-CE5.h related: Simplification of illumination compensation", 4. JCT-3V Meeting; Apr. 20, 2013-Apr. 26, 2013; Incheon; (The Joint Collaborative Team on 3D Video Coding Extension Development of ISO/IEC JTC1/SC29/WG11 and ITU-T SG.16) (Year: 2013).*

(Continued)

Primary Examiner — William C Vaughn, Jr.
Assistant Examiner — Joseph Daniel A Towe
(74) Attorney, Agent, or Firm — Sughrue Mion, PLLC

(57) ABSTRACT

An inter-layer video decoding method includes decoding a first layer image and determining a reference location of the first layer image corresponding to a location of a second layer current block. The method also includes determining neighboring sample values by using sample values of a boundary of the first layer image when neighboring sample locations of the reference location are outside the boundary of the first layer image, and determining an illumination (Continued)

compensation parameter of the second layer current block based on the neighboring sample values.

15 Claims, 32 Drawing Sheets

(51) Int. Cl.
*H04N 19/55* (2014.01)
*H04N 19/563* (2014.01)
*H04N 19/625* (2014.01)

(56) References Cited

U.S. PATENT DOCUMENTS

| | | | |
|---|---|---|---|
| 2011/0122950 A1* | 5/2011 | Ji | H04N 19/563 375/240.16 |
| 2013/0083853 A1* | 4/2013 | Coban | H04N 19/563 375/240.16 |
| 2014/0044188 A1 | 2/2014 | Sugio et al. | |
| 2014/0314148 A1* | 10/2014 | Lainema | H04N 19/70 375/240.12 |
| 2016/0037177 A1 | 2/2016 | Park et al. | |
| 2016/0134869 A1* | 5/2016 | Ikai | H04N 19/176 382/166 |

FOREIGN PATENT DOCUMENTS

| | | | |
|---|---|---|---|
| EP | 0986262 A2 * | 3/2000 | H04N 19/563 |
| KR | 10-2005-0026484 A | 3/2005 | |
| KR | 10-2014-0074377 A | 6/2014 | |
| WO | 2013/189257 A1 | 12/2013 | |

OTHER PUBLICATIONS

Chen et al., "Test Model 8 of 3D-HEVC and MV-HEVC", 8. JCT-3V Meeting; Mar. 29, 2014-Apr. 4, 2014; Valencia; (The Joint Collaborative Team on 3D Video Coding Extension Development of ISO/IEC JTC1/SC29/WG11 and ITU-T SG.16) (Year: 2014).*

Park et al., "3D-CD5.h related: Simplification of illumination compensation", Apr. 13, 2013, Joint Collaborative Team on 3D Video Coding Extensions of ITU-T SG 16 WP 3 and ISO/IEC JTC 1/SC 29/WG 11, JCT3V-D0114, XP030130778, 8 pages total. (Year: 2013).*

International Search Report dated Sep. 24, 2015 issued by the International Searching Authority in counterpart International Application No. PCT/KR2015/006215 (PCT/ISA/210).

Written Opinion dated Sep. 24, 2015 issued by the International Searching Authority in counterpart International Application No. PCT/KR2015/006215.

Z. Gu et al; "Improvement on illumination compensation reference pixels selection"; JCT3V document JCT3V-H0128v3, Mar. 29, 2014; pp. 1-6; 8 pages total.

Communication dated Dec. 20, 2017, issued by the European Patent Office in counterpart European application No. 15809344.3.

Park, et al., "Parameter Derivation for Illumination Compensation", Jun. 26, 2014, Joint Collaborative Team on 3D Video Coding Extensions of ITU-T SG16 WP 3 and ISO/IEC JTC 1/SC 29AVG11, JCT3V-I0080, XP030132380, 6 pages total.

Chen, et al., "Test Model 8 of 3D-HEVC and MV-HEVC", May 15, 2014, Joint Collaborative Team on 3D Video Coding Extension Development of ITU-T SG 16 WP 3 and ISO/IEC JTC 1/SC 29/WG 11, JCT3V-H1003, XP030132293, 54 pages total.

Park, et al., "3D-CD5.h related: Simplification of illumination compensation", Apr. 13, 2013, Joint Collaborative Team on 3D Video Coding Extensions of ITU-T SG 16 WP 3 and ISO/IEC JTC 1/SC 29/WG 11, JCT3V-D0114, XP030130778, 8 pages total.

Communication dated Apr. 30, 2019, issued by the State Intellectual Property Office of P.R. China in counterpart Chinese Application No. 201580043773.0.

* cited by examiner

CODING UNIT (1010)

INTER-LAYER VIDEO ENCODING METHOD FOR COMPENSATING FOR LUMINANCE DIFFERENCE AND DEVICE THEREFOR, AND VIDEO DECODING METHOD AND DEVICE THEREFOR

TECHNICAL FIELD

The present disclosure relates to inter-layer video encoding methods and decoding methods, and more particularly, to methods of inducing an illumination compensation parameter for illumination compensation between inter-layer images.

BACKGROUND ART

As hardware for reproducing and storing high resolution or high quality video content is being developed and supplied, a need for a video codec for effectively encoding or decoding the high resolution or high quality video content is increasing. According to a conventional video codec, a video is encoded according to a limited encoding method based on a macroblock having a predetermined size.

Image data of a spatial domain is transformed into coefficients of a frequency domain via frequency transformation. According to a video codec, an image is split into blocks having a predetermined size, discrete cosine transformation (DCT) is performed on each block, and frequency coefficients are encoded in block units, for rapid calculation of frequency transformation. Compared with image data of a spatial domain, coefficients of a frequency domain are easily compressed. In particular, since an image pixel value of a spatial domain is expressed according to a prediction error via inter prediction or intra prediction of a video codec, when frequency transformation is performed on the prediction error, a large amount of data may be transformed to 0. According to a video codec, an amount of data may be reduced by replacing data that is consecutively and repeatedly generated with small-sized data.

A multilayer video codec encodes and decodes a first layer video and at least one second layer video. Amounts of data of the first layer video and the second layer video may be reduced by removing temporal/spatial redundancy and layer redundancy of the first layer video and the second layer video.

DETAILED DESCRIPTION OF THE INVENTION

Technical Problem

First layer neighboring sample locations for inducing an illumination compensation parameter may be outside a boundary of a first layer image of a multilayer image.

Technical Solution

Provided are an inter-layer video encoding method, an apparatus therefor, and an inter-layer video decoding method capable of increasing coding efficiency by using sample values of a boundary of a first layer image of a multilayer image when first layer neighboring sample locations used to induce an illumination compensation parameter are outside the boundary of the first layer image.

According to an aspect of an embodiment, an inter-layer video decoding method includes decoding a first layer image, determining a reference location of the first layer image corresponding to a location of a second layer current block, determining neighboring sample values by using sample values of a boundary of the first layer image when neighboring sample locations of the reference location are outside the boundary of the first layer image, and determining an illumination compensation parameter of the second layer current block based on the neighboring sample values.

The technical problems of the present disclosure are not limited to the aforementioned features, and other unstated technical problems will be clearly understood by one of ordinary skill in the art in view of descriptions below.

BEST MODE

Figure 1A:
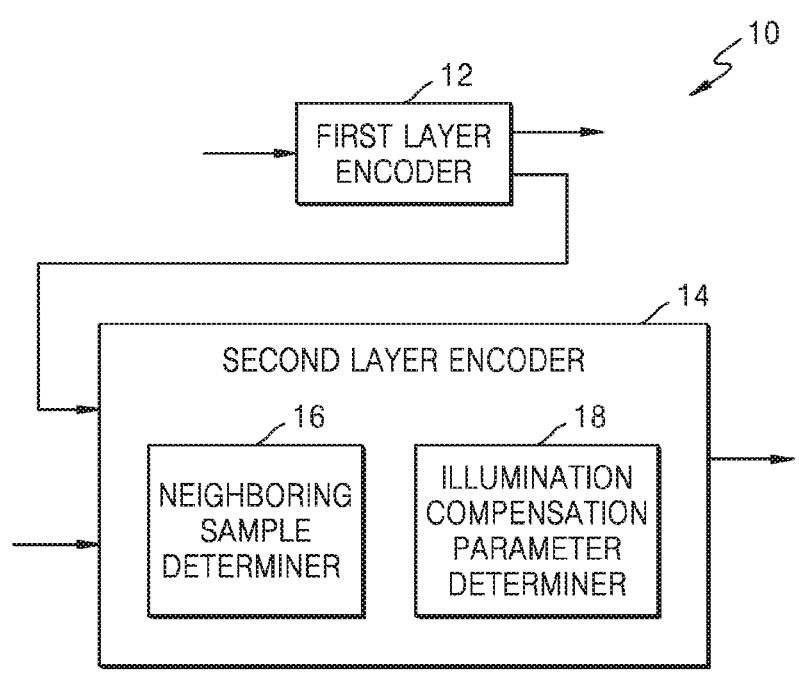
FIG. 1A is a block diagram of an inter-layer video encoding apparatus according to various embodiments.

According to an aspect of an embodiment, an inter-layer video decoding method includes decoding a first layer image, determining a reference location of the first layer image corresponding to a location of a second layer current block, determining neighboring sample values by using sample values of a boundary of the first layer image when neighboring sample locations of the reference location are outside the boundary of the first layer image, and determining an illumination compensation parameter of the second layer current block based on the neighboring sample values.

The determining of the neighboring sample values may include clipping the neighboring sample locations of the reference location based on the boundary of the first layer image.

The determining of the neighboring sample values may include determining the neighboring sample values by using sample values of a left boundary or a right boundary of the first layer image when the neighboring sample locations are outside the left boundary or the right boundary of the first layer image, and determining the neighboring sample values by using sample values of a top boundary or a bottom boundary of the first layer image when the neighboring sample locations are outside the top boundary or the bottom boundary of the first layer image.

The method may further include compensating an illumination value of the second layer current block by using the determined illumination compensation parameter.

The determining of the reference location of the first layer image may include obtaining a disparity vector indicating a first layer reference block corresponding to the second layer current block, and determining the reference location of the first layer image corresponding to the location of the second layer current block by using the disparity vector.

The determining of the reference location of the first layer image may include determining the reference location based on an integer-pel location adjacent to a location of a first layer indicated by the disparity vector.

A sub-pel location of the first layer image may be determined as the reference location when the disparity vector indicates the sub-pel location, and the neighboring sample locations may be determined based on the determined reference location.

The illumination compensation parameter may include at least one of a scale factor and an offset.

According to an aspect of another embodiment, an inter-layer video decoding apparatus includes a first layer decoder configured to reconstruct a first layer image, and a second layer decoder configured to reconstruct a second layer image by using the reconstructed first layer image, wherein the second layer decoder includes a neighboring sample determiner configured to determine a reference location of the first layer image corresponding to a location of a second layer current block, and determine neighboring sample values by using sample values of a boundary of the first layer image when neighboring sample locations of the reference location are outside the boundary of the first layer image, and an illumination compensation parameter determiner configured to determine an illumination compensation parameter of the second layer current block based on the neighboring sample values.

According to an aspect of another embodiment, an inter-layer video encoding method includes encoding a first layer image, determining a reference location of the first layer image corresponding to a location of a second layer current block, determining neighboring sample values by using sample values of a boundary of the first layer image when neighboring sample locations of the reference location are outside the boundary of the first layer image, and determining an illumination compensation parameter of the second layer current block based on the neighboring sample values.

The determining of the neighboring sample values may include clipping the neighboring sample locations of the reference location based on the boundary of the first layer image.

The determining of the neighboring sample values may include determining the neighboring sample values by using sample values of a left boundary or a right boundary of the first layer image when the neighboring sample locations are outside the left boundary or the right boundary of the first layer image, and determining the neighboring sample values by using sample values of a top boundary or a bottom boundary of the first layer image when the neighboring sample locations are outside the top boundary or the bottom boundary of the first layer image.

The method may further include compensating an illumination value of the second layer current block by using the determined illumination compensation parameter.

The determining of the reference location of the first layer image may include obtaining a disparity vector indicating a first layer reference block corresponding to the second layer current block, and determining the reference location of the first layer image corresponding to the location of the second layer current block by using the disparity vector.

The determining of the reference location of the first layer image may include determining the reference location based on an integer-pel location adjacent to a location of a first layer indicated by the disparity vector.

A sub-pel location of the first layer image may be determined as the reference location when the disparity vector indicates the sub-pel location, and the neighboring sample locations may be determined based on the determined reference location.

The illumination compensation parameter may include at least one of a scale factor and an offset.

According to an aspect of another embodiment, an inter-layer video encoding apparatus includes a first layer encoder configured to encode a first layer image, and a second layer encoder configured to encode a second layer image by using the first layer image, wherein the second layer encoder includes a neighboring sample determiner configured to determine a reference location of the first layer image corresponding to a location of a second layer current block, and determine neighboring sample values by using sample values of a boundary of the first layer image when neighboring sample locations of the reference location are outside the boundary of the first layer image, and an illumination compensation parameter determiner configured to determine an illumination compensation parameter of the second layer current block based on the neighboring sample values.

Mode of the Invention

Hereinafter, with reference to FIGS. 1A to 7C, an inter-layer video encoding technique and an inter-layer video decoding technique for determining whether to perform illumination compensation, based on block characteristics, according to various embodiments will be described. Also, with reference to FIGS. 8 through 20, a video encoding technique and a video decoding technique, which are based on coding units having a tree structure, according to embodiments that are applicable to the inter-layer video encoding and decoding techniques will be described. Also, with reference to FIGS. 21 through 27, various embodiments to which the video encoding method and the video decoding method are applicable will be described.

Hereinafter, an 'image' may refer to a still image or a moving image of a video, or a video itself.

Hereinafter, a 'sample' refers to data that is assigned to a sampling location of an image and is to be processed. For example, pixel values of an image or residuals of a block in the spatial domain may be samples.

Initially, with reference to FIGS. 1A to 7C, an inter-layer video encoding apparatus, an inter-layer video encoding method, an inter-layer video decoding apparatus, and an inter-layer video decoding method according to embodiments will be described.

FIG. 1A is a block diagram of an inter-layer video encoding apparatus 10 according to various embodiments.

The inter-layer video encoding apparatus 10 according to various embodiments includes a first layer encoder 12 and a second layer encoder 14. The second layer encoder 14 may include a neighboring sample determiner 16 and an illumination compensation parameter determiner 18. Alternatively, the second layer encoder 14 may further include an illumination compensation determiner (not shown) for determining whether to perform illumination compensation on a second layer current block.

The neighboring sample determiner 16 and the illumination compensation parameter determiner 18 according to another embodiment may be located outside the second layer encoder 14.

The inter-layer video encoding apparatus 10 according to various embodiments may classify a plurality of image sequences according to layers, may encode each of the image sequences according to a scalable video coding scheme, and may output separate streams including data encoded according to layers. The inter-layer video encoding apparatus 10 may encode a first layer image sequence and a second layer image sequence in different layers.

The first layer encoder 12 may encode first layer images and output a first layer stream including the encoded data of the first layer images.

The second layer encoder 14 may encode second layer images and output a second layer stream including the encoded data of the second layer images.

For example, according to a scalable video coding scheme based on spatial scalability, low resolution images may be encoded as first layer images, and high resolution images may be encoded as second layer images. An encoding result of the first layer images may be output as a first layer stream, and an encoding result of the second layer images may be output as a second layer stream.

As another example, a multiview video may be encoded according to a scalable video coding scheme. Left-view images may be encoded as first layer images and right-view images may be encoded as second layer images. Alternatively, central-view images, left-view images, and right-view images may be each encoded, wherein the central-view images are encoded as first layer images, the left-view images are encoded as second layer images, and the right-view images are encoded as third layer images. Alternatively, a central-view texture image, a central-view depth image, a left-view texture image, a left-view depth image, a right-view texture image, and a right-view depth image may be respectively encoded as a first layer image, a second layer image, a third layer image, a fourth layer image, a fifth layer image, and a sixth layer image. As another example, a central-view texture image, a central-view depth image, a left-view depth image, a left-view texture image, a right-view depth image, and a right-view texture image may be respectively encoded as a first layer image, a second layer image, a third layer image, a fourth layer image, a fifth layer image, and a sixth layer image.

As another example, a scalable video coding method may be performed according to temporal hierarchical prediction based on temporal scalability. A first layer stream including encoding information generated by encoding base frame rate images may be output. Temporal levels may be classified according to frame rates and each temporal level may be encoded according to layers. A second layer stream including encoding information of a high frame rate may be output by further encoding higher frame rate images by referring to the base frame rate images.

Alternatively, scalable video coding may be performed on a first layer and a plurality of extension layers (e.g., a second layer, a third layer, . . . , and a K-th layer). When the number of extension layers is three or more, first layer images and second to K-th layer images may be encoded. As such, a result of encoding the first layer images may be output as a first layer stream, and results of encoding the second to K-th layer images may be output as second to K-th layer streams, respectively.

The inter-layer video encoding apparatus 10 according to various embodiments may perform inter prediction to predict a current image with reference to images of a single layer. Due to inter prediction, a motion vector indicating motion information between a current image and a reference image, and residuals between the current image and the reference image may be generated.

In addition, the inter-layer video encoding apparatus 10 may perform inter-layer prediction to predict second layer images with reference to first layer images.

Alternatively, when the inter-layer video encoding apparatus 10 according to an embodiment allows three or more layers, e.g., a first layer, a second layer, and a third layer, the inter-layer video encoding apparatus 10 may perform inter-layer prediction between a first layer image and a third layer image and between a second layer image and a third layer image based on a multilayer prediction structure.

By performing inter-layer prediction, a displacement component between the current image and a reference image of a different layer, and a residual component between the current image and the reference image of the different layer may be generated.

An inter-layer prediction structure will be described below with reference to FIG. 3.

The inter-layer video encoding apparatus 10 according to various embodiments may perform encoding based on blocks of each image of a video, according to layers. A block may have a square shape, a rectangular shape, or an arbitrary geometrical shape, and is not limited to a data unit having a predetermined size. The block may be a maximum coding unit, a coding unit, a prediction unit, or a transformation unit, among coding units according to a tree structure. A largest coding unit including coding units of a tree structure may be called differently, such as a coding tree unit, a coding block tree, a block tree, a root block tree, a coding tree, a coding root, or a tree trunk. Video encoding and decoding methods based on coding units according to a tree structure will be described below with reference to FIGS. 8 through 20.

Inter prediction and inter-layer prediction may be performed based on a data unit, such as a coding unit, a prediction unit, or a transformation unit.

The first layer encoder 12 according to various embodiments may generate symbol data by performing source coding operations including inter prediction or intra prediction on first layer images. Symbol data indicates a sample value of each encoding parameter and a sample value of a residual.

For example, the first layer encoder 12 may generate symbol data by performing inter or intra prediction, transformation, and quantization on samples of a data unit of first layer images, and may generate a first layer stream by performing entropy encoding on the symbol data.

The second layer encoder 14 may encode second layer images based on coding units of a tree structure. The second layer encoder 14 may generate symbol data by performing inter/intra prediction, transformation, and quantization on samples of a coding unit of second layer images, and generate a second layer stream by performing entropy encoding on the symbol data.

The second layer encoder 14 according to various embodiments may perform inter-layer prediction to predict a second layer image by using reconstructed samples of a first layer image. To encode an original second layer image of a second layer image sequence based on an inter-layer prediction structure, the second layer encoder 14 may generate a predicted second layer image by using a reconstructed first layer image, and encode a prediction error between an original second layer image and the predicted second layer image.

The second layer encoder 14 may perform inter-layer prediction on the second layer image per block, e.g., per coding unit or prediction unit. A block of the reconstructed first layer image to be referred by a block of the second layer image may be determined. For example, a reference block of the first layer image provided at a location corresponding to the location of a current block of the second layer image may be determined. The second layer encoder 14 may determine a second layer prediction block by using the first layer reference block corresponding to the second layer block.

The second layer encoder 14 may use the second layer prediction block determined by using the first layer reference block according to an inter-layer prediction structure, as a reference image for inter-layer prediction with respect to a second layer original block. The second layer encoder 14 may perform entropy encoding by transforming and quantizing an error, i.e., a residual component according to inter-layer prediction, between a sample value of a second layer prediction block and a sample value of a second layer original block, by using a reconstructed first layer image.

As described above, the second layer encoder 14 may encode a current layer image sequence with reference to the first layer images reconstructed based on the inter-layer prediction structure. Alternatively, the second layer encoder 14 according to various embodiments may encode the second layer image sequence based on a single layer prediction structure without reference to samples of another layer. Accordingly, it should be noted that the second layer encoder 14 does not always perform inter-layer prediction to encode the second layer image sequence.

As described above, when the inter-layer video encoding apparatus 10 encodes a multiview video, the first layer encoder 12 may encode a first view video and the second layer encoder 14 may encode a second view video. The different view videos may be obtained by using different cameras or different lenses. Since different views may have different characteristics of shooting angles, lighting levels, or imaging devices (e.g., cameras or lenses), an illumination mismatch may occur between the videos obtained in different views. This illumination mismatch phenomenon may be related to the difference of sample values between the different view videos.

When an illumination mismatch occurs between the different view videos, an inter-layer prediction error may be increased and thus coding efficiency may be lowered. As such, in consideration of an illumination mismatch between views, the second layer encoder 14 of the inter-layer video encoding apparatus 10 may compensate for and encode an illumination difference between different view videos. For example, an illumination difference between the first view image to be encoded by the first layer encoder 12 and the second view image to be encoded by the second layer encoder 14 may be encoded. Since the illumination difference between the first view image and the second view image is encoded, illumination compensation may be performed when the second layer encoder 14 encodes the second view video.

The inter-layer video encoding apparatus 10 may determine whether to perform illumination compensation, in consideration of characteristics per predetermined data unit such as a slice or block of a current image, e.g., partition type information of a current block. The inter-layer video encoding apparatus 10 may generate a second layer bitstream including a parameter indicating whether to perform illumination compensation.

According to various embodiments, an illumination compensation parameter may be used for illumination compensation between a first layer block and a second layer block. For example, the illumination compensation parameter may include at least one of a scale factor and an offset.

The illumination compensation parameter including the scale factor and the offset for illumination compensation between block units may be transmitted in a bitstream or induced by using neighboring sample values of a second layer current block and neighboring sample values of a first layer reference block corresponding to the current block.

Specifically, the neighboring sample determiner 16 of the second layer encoder 14 may determine a reference location of the first layer image, and determine the neighboring sample values of the first layer reference block based on the reference location. A disparity vector indicating a view difference between layers may be used to determine the first layer reference block corresponding to the second layer current block. The disparity vector may be transmitted in a bitstream or induced from other types of coding information.

The disparity vector may indicate the reference location of the first layer image corresponding to the location of the second layer current block. The location of the second layer current block may be the location of a top-left corner sample of the current block as a base location. The reference location of the first layer image may be the location of a top-left corner sample of the first layer reference block.

The neighboring sample determiner 16 may determine neighboring sample locations based on the reference location. For example, the neighboring sample locations may include top sample locations and left sample locations adjacent to the first layer reference block and determined based on the reference location. The neighboring sample locations are locations for determining the neighboring sample values used to induce the illumination compensation parameter, and may be locations spaced apart from the reference location by a predetermined offset.

The illumination compensation parameter determiner 18 of the second layer encoder 14 may determine the neighboring sample values based on whether the neighboring sample locations are valid, and determine the illumination compensation parameter of the second layer current block based on the determined neighboring sample values. The fact that the neighboring sample locations are valid may mean that the neighboring sample locations are provided within the first layer image. A method of determining the illumination compensation parameter will be described in detail below with reference to FIG. 4.

In this case, when the neighboring sample locations of the reference block are outside a boundary of the first layer image, no neighboring sample values of the reference block may be present. Thus, coding efficiency may be reduced. In addition, the amount of calculation for coding may be increased to determine whether the neighboring sample locations are valid.

Accordingly, when the neighboring sample locations based on the first layer reference location are outside the boundary of the first layer image, the inter-layer video encoding apparatus 10 according to various embodiments may change the neighboring sample locations based on boundary locations of the first layer image and determine the illumination compensation parameter of the second layer current block by using sample values of the boundary of the first layer image.

By using the sample values of the boundary of the first layer image, the inter-layer video encoding apparatus 10 does not need to check validity of the neighboring sample values and may obtain more accurate sample values, thereby increasing coding efficiency. For example, the inter-layer video encoding apparatus 10 may not check validity of the neighboring sample values of the first layer and may perform illumination compensation based on whether neighboring sample values of the second layer current block are valid.

Operation of the inter-layer video encoding apparatus 10 for determining the illumination compensation parameter will now be described in detail with reference to FIG. 1B.

Figure 1B:
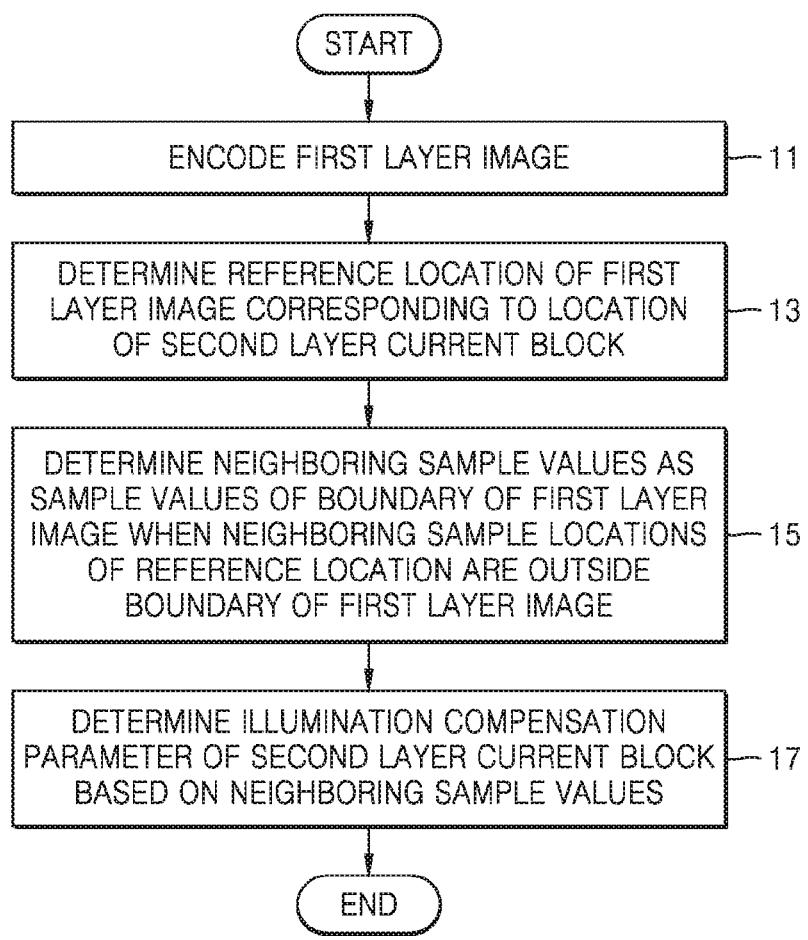
FIG. 1B is a flowchart of an inter-layer video encoding method according to various embodiments.

FIG. 1B is a flowchart of an inter-layer video encoding method according to various embodiments.

In operation 11, the inter-layer video encoding apparatus 10 may encode a first layer image and output a first layer bitstream including the encoded data.

In operation 13, the inter-layer video encoding apparatus 10 may determine a reference location of the first layer image corresponding to the location of a second layer current block.

The inter-layer video encoding apparatus 10 may obtain and use a disparity vector of the second layer current block indicating a first layer reference block. The disparity vector may be induced from neighboring blocks of the current block. Otherwise, the disparity vector may be induced from a depth map block corresponding thereto. Alternatively, the disparity vector may be obtained from a bitstream.

The inter-layer video encoding apparatus 10 may determine the reference location of the first layer image corresponding to the location of the second layer current block, by using the disparity vector. The reference location of the first layer image may be the location of a top-left sample of the first layer reference block corresponding to the second layer current block.

Since the disparity vector may have fractional pixel accuracy, e.g., quarter-pel or half-pel accuracy, the location of the first layer image indicated by the disparity vector of the second layer current block may be a sub-pel location. The sub-pel location may be a pixel location other than an integer-pel location.

When the disparity vector indicates a sub-pel location, the inter-layer video encoding apparatus 10 may determine an integer-pel location adjacent to the sub-pel location as the reference location to reduce complexity of calculation. Alternatively, when the disparity vector indicates a sub-pel location, the inter-layer video encoding apparatus 10 may determine the sub-pel location as the reference location to improve accuracy of an illumination compensation parameter and thus to increase coding efficiency. A process of determining the reference location will be described in detail below with reference to FIGS. 6A to 7B.

The inter-layer video encoding apparatus 10 may determine the first layer reference block based on the determined reference location. For example, the reference location may be the location of a top-left corner of the first layer reference block.

In operation 15, when neighboring sample locations of the reference location are outside a boundary of the first layer image, the inter-layer video encoding apparatus 10 may determine neighboring sample values by using sample values of the boundary of the first layer image.

Specifically, the inter-layer video encoding apparatus 10 may determine the first layer neighboring sample locations based on the reference location. For example, the neighboring sample locations may be determined as locations spaced apart from the reference location by a predetermined offset.

The inter-layer video encoding apparatus 10 may determine whether the determined neighboring sample locations are outside the boundary of the first layer image. For example, the inter-layer video encoding apparatus 10 may determine whether the neighboring sample locations are outside the boundary of the first layer image, by comparing the neighboring sample locations to boundary locations of the first layer image. The inter-layer video encoding apparatus 10 may compare first component values of the neighboring sample locations to a left boundary and a right boundary of the first layer image, and compare second component values of the neighboring sample locations to a top boundary and a bottom boundary of the first layer image. The first component values may be x component values, and the second component values may be y component values.

When the neighboring sample locations are outside the boundary of the first layer image, the inter-layer video encoding apparatus 10 may determine the neighboring sample values by using the sample values of the boundary of the first layer image. For example, the inter-layer video encoding apparatus 10 may change the neighboring sample locations based on the boundary locations of the first layer image, and the neighboring sample values may be the sample values of the boundary of the first layer image.

For example, the inter-layer video encoding apparatus 10 may determine the neighboring sample values by clipping the neighboring sample locations based on the boundary of the first layer image. For example, when the first component values of the neighboring sample locations are outside the left boundary or the right boundary of the first layer image, the inter-layer video encoding apparatus 10 may change the neighboring sample values into sample values of the left boundary or the right boundary of the first layer image. Alternatively, when the second component values of the neighboring sample locations are outside the top boundary or the bottom boundary of the first layer image, the inter-layer video encoding apparatus 10 may change the neighboring sample values into sample values of the top boundary or the bottom boundary of the first layer image. The first component values may be horizontal component values, and the second component values may be vertical component values.

Alternatively, the inter-layer video encoding apparatus 10 may determine the neighboring sample values by padding the neighboring sample values of the reference location by using the sample values of the boundary of the first layer image.

The inter-layer video encoding apparatus 10 may determine a first layer illumination compensation sample list including the determined neighboring sample values.

In operation 17, the inter-layer video encoding apparatus 10 may determine an illumination compensation parameter of the second layer current block based on the determined neighboring sample values. The illumination compensation parameter may include at least one of a scale factor and an offset.

The inter-layer video encoding apparatus 10 may determine the illumination compensation parameter by comparing the determined neighboring sample values of the first layer reference block to neighboring sample values of the second layer current block. For example, the inter-layer video encoding apparatus 10 may determine the illumination compensation parameter by comparing the first layer illumination compensation sample list to a second layer illumination compensation sample list. A method of determining the illumination compensation parameter will be described in detail below with reference to FIG. 4.

The inter-layer video encoding apparatus 10 may generate a second layer bitstream including information indicating whether to perform illumination compensation, and inter-layer prediction information between the first layer reference block and the second layer current block, an illumination value of which is compensated based on the illumination compensation parameter.

The inter-layer video encoding apparatus 10 may encode and transmit information indicating whether to perform illumination compensation on the current block, and the disparity vector used to determine the illumination compensation parameter, in a bitstream. When the information indicating whether to perform illumination compensation, and the disparity vector used to determine the illumination compensation parameter may be determined based on pre-encoded information, the inter-layer video encoding apparatus 10 may not transmit the information indicating whether to perform illumination compensation, and the disparity vector.

Alternatively, the inter-layer video encoding apparatus 10 may encode and transmit the information indicating whether to perform illumination compensation, in a bitstream, and may encode and transmit the disparity vector used to determine the illumination compensation parameter, in a bitstream, or may not transmit the disparity vector when the disparity vector may be determined based on pre-encoded information.

By compensating an illumination difference between the first layer image and a second layer image, an error between the second layer image and the first layer image may be reduced and thus coding efficiency of inter-layer prediction may be improved.

The inter-layer video encoding apparatus 10 according to various embodiments may include a central processor (not shown) for controlling all of the first layer encoder 12, the second layer encoder 14, the neighboring sample determiner 16, and the illumination compensation parameter determiner 18. Alternatively, the first layer encoder 12, the second layer encoder 14, the neighboring sample determiner 16, and the illumination compensation parameter determiner 18 may be controlled by individual processors (not shown) and the processors may operate in association with each other to control the inter-layer video encoding apparatus 10. Otherwise, the first layer encoder 12, the second layer encoder 14, the neighboring sample determiner 16, and the illumination compensation parameter determiner 18 may be controlled by an external processor (not shown) of the inter-layer video encoding apparatus 10.

The inter-layer video encoding apparatus 10 may include one or more data storages (not shown) for storing input and output data of the first layer encoder 12, the second layer encoder 14, the neighboring sample determiner 16, and the illumination compensation parameter determiner 18. The inter-layer video encoding apparatus 10 may include a memory controller (not shown) for controlling data input and output of the data storages.

In order to output a video encoding result, the inter-layer video encoding apparatus 10 may operate in cooperation with an internal video encoding processor installed therein or an external video encoding processor so as to perform video encoding operations including transformation. The internal video encoding processor of the inter-layer video encoding apparatus 10 may perform the video encoding operations as a separate processor. Also, basic video encoding operations may be realized as the inter-layer video encoding apparatus 10, a central processing apparatus, or a graphic processing apparatus includes a video encoding processing module.

Figure 2A:
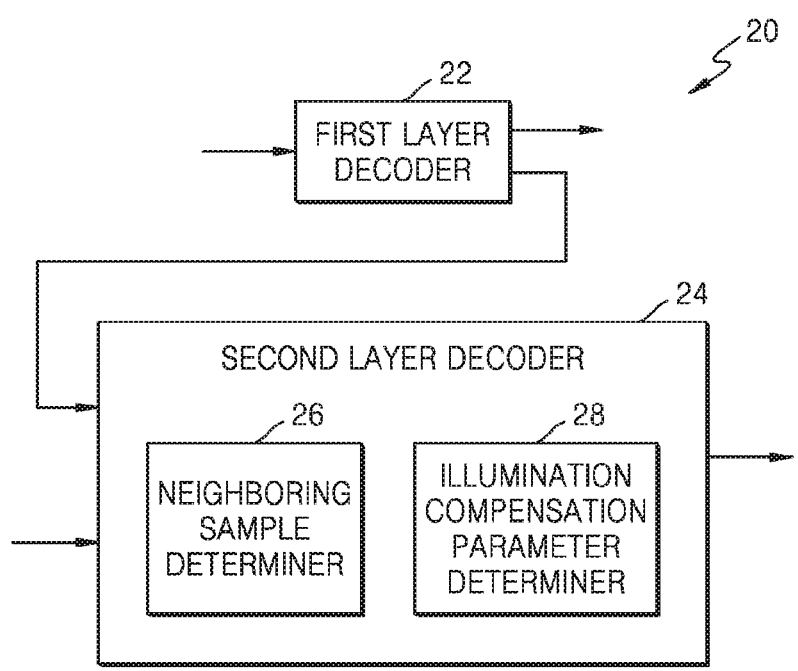
FIG. 2A is a block diagram of an inter-layer video decoding apparatus according to various embodiments.

FIG. 2A is a block diagram of an inter-layer video decoding apparatus 20 according to various embodiments.

The inter-layer video decoding apparatus 20 according to various embodiments includes a first layer decoder 22 and a second layer decoder 24. The second layer decoder 24 may include a neighboring sample determiner 26 and an illumination compensation parameter determiner 28. Alternatively, the second layer decoder 24 may further include an illumination compensation determiner (not shown) for determining whether to perform illumination compensation on a second layer current block.

The neighboring sample determiner 26 and the illumination compensation parameter determiner 28 according to another embodiment may be located outside the second layer decoder 24.

The inter-layer video decoding apparatus 20 according to various embodiments may receive bitstreams according to layers, via a scalable encoding scheme. The number of layers of bitstreams received by the inter-layer video decoding apparatus 20 is not limited. However, for convenience of description, an embodiment in which the first layer decoder 22 of the inter-layer video decoding apparatus 20 receives and decodes a first layer stream and the second layer decoder 24 receives and decodes a second layer stream will be described.

For example, the inter-layer video decoding apparatus 20 based on spatial scalability may receive a stream in which image sequences having different resolutions are encoded in different layers. A first layer stream may be decoded to reconstruct an image sequence having low resolution and a second layer stream may be decoded to reconstruct an image sequence having high resolution.

As another example, a multiview video may be decoded according to a scalable video coding scheme. When a stereoscopic video stream is received in a plurality of layers, a first layer stream may be decoded to reconstruct left-view images. A second layer stream in addition to the first layer stream may be further decoded to reconstruct right-view images.

Alternatively, when a multiview video stream is received in a plurality of layers, a first layer stream may be decoded to reconstruct central-view images. A second layer stream in addition to the first layer stream may be further decoded to reconstruct left-view images. A third layer stream in addition to the first layer stream may be further decoded to reconstruct right-view images.

As another example, a scalable video coding method based on temporal scalability may be performed. A first layer stream may be decoded to reconstruct base frame rate images. A second layer stream may be further decoded to reconstruct high frame rate images.

Also, when there are at least three second layers, first layer images may be reconstructed from a first layer stream, and when a second layer stream is further decoded by referring to reconstructed first layer images, second layer images may be further reconstructed. When K-th layer stream is further decoded by referring to reconstructed second layer images, K-th layer images may be further reconstructed.

The inter-layer video decoding apparatus 20 may obtain encoded data of first layer images and second layer images from a first layer stream and a second layer stream, and in addition, may further obtain a motion vector generated via inter prediction and prediction information generated via inter-layer prediction.

For example, the inter-layer video decoding apparatus 20 may decode inter-predicted data per layer, and may decode inter-layer predicted data between a plurality of layers. Reconstruction may be performed through motion compensation and inter-layer decoding based on a coding unit or a prediction unit.

Images may be reconstructed by performing motion compensation for a current image by referencing reconstructed images predicted via inter prediction of a same layer, with respect to each layer stream. Motion compensation is an operation in which a reconstructed image of a current image is reconstructed by synthesizing a reference image determined by using a motion vector of the current image and a residual component of the current image.

In addition, the inter-layer video decoding apparatus 20 may perform inter-layer decoding with reference to the first layer images to reconstruct the inter-layer predicted second layer images. The inter-layer decoding refers to an operation of configuring a reconstructed image of a current image by combining an another-layer reference image determined to predict the current image, and residuals of the current image.

The inter-layer video decoding apparatus 20 according to an embodiment may perform inter-layer decoding for reconstructing third layer images predicted by referring to second layer images. An inter-layer prediction structure will be described below with reference to FIG. 3.

However, the second layer decoder 24 according to various embodiments may decode a second layer stream without having to reference a first layer image sequence. Accordingly, it should not be limitedly construed that the second layer decoder 24 performs inter-layer prediction to decode a second layer image sequence.

The inter-layer video decoding apparatus 20 performs decoding according to blocks of each image of a video. A block may be, from among coding units according to a tree structure, a largest coding unit, a coding unit, a prediction unit, or a transformation unit.

The first layer decoder 22 may decode a first layer image by using parsed encoding symbols of the first layer image. When the inter-layer video decoding apparatus 20 receives streams encoded based on coding units of a tree structure, the first layer decoder 22 may perform decoding based on the coding units of the tree structure, according to a largest coding unit of a first layer stream.

The first layer decoder 22 may obtain decoding information and decoded data by performing entropy decoding per largest coding unit. The first layer decoder 22 may reconstruct a residual component by performing inverse quantization and inverse transformation on encoded data obtained from a stream. The first layer decoder 22 according to another embodiment may directly receive a bitstream of quantized transformation coefficients. The residual component of images may be reconstructed by performing inverse quantization and inverse transformation on quantized transformation coefficients.

The first layer decoder 22 may reconstruct first layer images by combining the prediction image and the residual component via motion compensation between same layer images.

According to an inter-layer prediction structure, the second layer decoder 24 may generate a second layer prediction image by using samples of a reconstructed first layer image. The second layer decoder 24 may obtain a prediction error according to inter-layer prediction by decoding a second layer stream. The second layer decoder 24 may generate a reconstructed second layer image by combining a second layer prediction image and the prediction error.

The second layer decoder 24 may determine a second layer prediction image by using a first layer reference image decoded by the first layer decoder 22. According to an inter-layer prediction structure, the second layer decoder 24 may determine a block of a first layer image which is to be referenced by a block such as a coding unit or a prediction unit of a second layer image. For example, a reference block of the first layer image provided at a location corresponding to the location of a current block of the second layer image may be determined. The second layer decoder 24 may determine a second layer prediction block by using the first layer reference block corresponding to the second layer block.

The second layer decoder 24 may use the second layer prediction block determined by using the first layer reference block based on an inter-layer prediction structure, as a reference image for inter-layer prediction on a second layer original block. In this case, the second layer decoder 24 may reconstruct the second layer block by combining sample values of the second layer prediction block determined by using the reconstructed first layer image, and residuals based on inter-layer prediction.

Based on spatial scalable video coding, when the first layer decoder 22 has reconstructed the first layer image having a resolution different from that of the second layer image, the second layer decoder 24 may interpolate the first layer reference image to adjust the resolution thereof to be the same as the resolution of the original second layer image. The interpolated first layer reference image may be determined as a predicted second layer image for inter-layer prediction.

Accordingly, the first layer decoder 22 of the inter-layer video decoding apparatus 20 may reconstruct a first layer image sequence by decoding a first layer stream, and the second layer decoder 24 may reconstruct a second layer image sequence by decoding a second layer stream.

In consideration of an illumination mismatch between views, the illumination compensation parameter determiner 28 of the inter-layer video decoding apparatus 20 may compensate for and reconstruct an illumination difference between different view videos. For example, an illumination difference between the first view image to be decoded by the first layer decoder 22 and the second view image to be encoded by the second layer decoder 24 may be obtained from a bitstream. Since the illumination difference between the first view image and the second view image is obtained, whether to perform illumination compensation may be determined when the second layer decoder 24 decodes the second view video.

The inter-layer video decoding apparatus 20 according to various embodiments may use an illumination compensation parameter for illumination compensation between a first layer block and a second layer block. For example, the illumination compensation parameter may include at least one of a scale factor and an offset.

The inter-layer video decoding apparatus 20 may receive information indicating whether to perform illumination compensation, from the bitstream, and determine whether to perform illumination compensation on the second layer current block. Alternatively, the inter-layer video decoding apparatus 20 may determine whether to perform illumination compensation, in consideration of other types of coding information, e.g., partition type information of a current block.

Specifically, the neighboring sample determiner 26 of the second layer decoder 24 may determine a reference location of the first layer image, and determine neighboring sample values of the first layer reference block based on the reference location. A disparity vector indicating a view difference between layers may be used to determine the first layer reference block corresponding to the second layer current block. The disparity vector may be transmitted in a bitstream or induced from other types of coding information.

The disparity vector may indicate the reference location of the first layer image corresponding to the location of the second layer current block. The location of the second layer current block may be the location of a top-left corner sample of the current block as a base location. The reference location of the first layer image may be the location of a top-left corner sample of the first layer reference block.

The neighboring sample determiner 26 may determine neighboring sample locations based on the reference location. For example, the neighboring sample locations may include top sample locations and left sample locations adjacent to the first layer reference block and determined based on the reference location. Specifically, the neighboring sample locations may be locations spaced apart from the reference location by a predetermined offset.

The illumination compensation parameter determiner 28 of the second layer decoder 24 may determine the neighboring sample values based on whether the neighboring sample locations are valid, and determine the illumination compensation parameter of the second layer current block based on the determined neighboring sample values. The fact that the neighboring sample locations are valid may mean that the neighboring sample locations are provided within the first layer image. A method of determining the illumination compensation parameter will be described in detail below with reference to FIG. 4.

In this case, when the neighboring sample locations of the reference block are outside a boundary of the first layer image, no neighboring sample values of the reference block may be present. Thus, coding efficiency may be reduced. In addition, the amount of calculation for coding may be increased to determine whether the neighboring sample locations are valid.

Accordingly, when the neighboring sample locations based on the first layer reference location is outside the boundary of the first layer image, the inter-layer video decoding apparatus 20 according to an embodiment may change the neighboring sample locations based on boundary locations of the first layer image and determine the illumination compensation parameter of the second layer current block by using sample values of the boundary of the first layer image.

By using the sample values of the boundary of the first layer image, the inter-layer video decoding apparatus 20 does not need to check validity of the neighboring sample values and may obtain more accurate sample values, thereby increasing coding efficiency. For example, the inter-layer video decoding apparatus 20 may not check validity of the neighboring sample values of the first layer and may perform illumination compensation based on whether neighboring sample values of the second layer current block are valid.

Operation of the inter-layer video decoding apparatus 20 for determining the illumination compensation parameter will now be described in detail with reference to FIG. 2B.

Figure 2B:
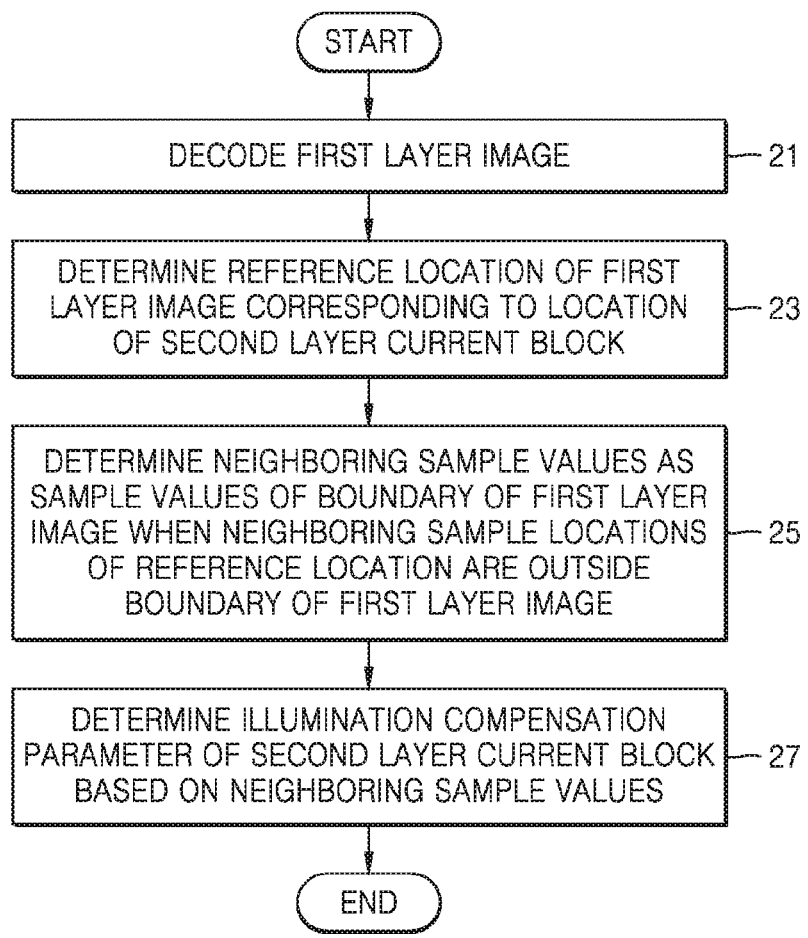
FIG. 2B is a flowchart of an inter-layer video decoding method according to various embodiments.

FIG. 2B is a flowchart of an inter-layer video decoding method according to various embodiments.

In operation 21, the inter-layer video decoding apparatus 20 may decode a first layer image. The inter-layer video decoding apparatus 20 may receive a first layer bitstream and decode the first layer image.

In operation 23, the inter-layer video decoding apparatus 20 may determine a reference location of the first layer image corresponding to the location of a second layer current block.

The inter-layer video decoding apparatus 20 may obtain and use a disparity vector of the second layer current block indicating a first layer reference block. The disparity vector may be induced from neighboring blocks of the current block. Alternatively, the disparity vector may be obtained from a bitstream.

The inter-layer video decoding apparatus 20 may determine the reference location of the first layer image corresponding to the location of the second layer current block, by using the disparity vector. The reference location of the first layer image may be the location of a top-left sample of the first layer reference block corresponding to the second layer current block.

Since the disparity vector may have fractional pixel accuracy, e.g., quarter-pel or half-pel accuracy, the location of the first layer image indicated by the disparity vector of the second layer current block may be a sub-pel location. The sub-pel location may be a pixel location other than an integer-pel location.

When the disparity vector indicates a sub-pel location, the inter-layer video decoding apparatus 20 may determine an integer-pel location adjacent to the sub-pel location as the reference location to reduce complexity of calculation. Alternatively, when the disparity vector indicates a sub-pel location, the inter-layer video decoding apparatus 20 may determine the sub-pel location as the reference location to improve accuracy of an illumination compensation parameter and thus to increase coding efficiency. A process of determining the reference location will be described in detail below with reference to FIGS. 6A to 7B.

The inter-layer video decoding apparatus 20 may determine the first layer reference block based on the determined reference location. For example, the reference location may be the location of a top-left corner of the first layer reference block.

In operation 25, when neighboring sample locations of the reference location are outside a boundary of the first layer image, the inter-layer video decoding apparatus 20 may determine neighboring sample values by using sample values of the boundary of the first layer image.

Specifically, the inter-layer video decoding apparatus 20 may determine the first layer neighboring sample locations based on the reference location. For example, the neighboring sample locations may be determined as locations spaced apart from the reference location by a predetermined offset.

The inter-layer video decoding apparatus 20 may determine whether the determined neighboring sample locations are outside the boundary of the first layer image. For example, the inter-layer video decoding apparatus 20 may determine whether the neighboring sample locations are outside the boundary of the first layer image, by comparing the neighboring sample locations to boundary locations of the first layer image. The inter-layer video decoding apparatus 20 may compare first component values of the neighboring sample locations to a left boundary and a right boundary of the first layer image, and compare second component values of the neighboring sample locations to a top boundary and a bottom boundary of the first layer image. The first component values may be x component values, and the second component values may be y component values.

When the neighboring sample locations are outside the boundary of the first layer image, the inter-layer video decoding apparatus 20 may determine the neighboring sample values by using the sample values of the boundary of the first layer image. For example, the inter-layer video decoding apparatus 20 may change the neighboring sample locations based on the boundary locations of the first layer image, and the neighboring sample values may be the sample values of the boundary of the first layer image.

For example, the inter-layer video decoding apparatus 20 may determine the neighboring sample values by clipping the neighboring sample locations based on the boundary of the first layer image. For example, when the first component values of the neighboring sample locations are outside the left boundary or the right boundary of the first layer image, the inter-layer video decoding apparatus 20 may change the neighboring sample values into sample values of the left boundary or the right boundary of the first layer image. Alternatively, when the second component values of the neighboring sample locations are outside the top boundary or the bottom boundary of the first layer image, the inter-layer video decoding apparatus 20 may change the neighboring sample values into sample values of the top boundary or the bottom boundary of the first layer image. The first component values may be horizontal component values, and the second component values may be vertical component values.

Alternatively, the inter-layer video decoding apparatus 20 may determine the neighboring sample values by padding the neighboring sample values of the reference location by using the sample values of the boundary of the first layer image.

The inter-layer video decoding apparatus 20 may determine a first layer illumination compensation sample list including the determined neighboring sample values.

In operation 27, the inter-layer video decoding apparatus 20 may determine an illumination compensation parameter of the second layer current block based on the determined neighboring sample values. The illumination compensation parameter may include at least one of a scale factor and an offset.

The inter-layer video decoding apparatus 20 may determine the illumination compensation parameter by comparing the determined neighboring sample values of the first layer reference block to neighboring sample values of the second layer current block. For example, the inter-layer video decoding apparatus 20 may determine the illumination compensation parameter by comparing the first layer illumination compensation sample list to a second layer illumination compensation sample list. A method of determining the illumination compensation parameter will be described in detail below with reference to FIG. 4.

As described above, the inter-layer video decoding apparatus 20 may decode the second layer block on which illumination compensation, an illumination value of which is compensated based on the determined illumination compensation parameter.

The inter-layer video decoding apparatus 20 according to various embodiments may include a central processor (not shown) for controlling all of the first layer decoder 22, the second layer decoder 24, the neighboring sample determiner 26, and the illumination compensation parameter determiner 28. Alternatively, the first layer decoder 22, the second layer decoder 24, the neighboring sample determiner 26, and the illumination compensation parameter determiner 28 may be controlled by individual processors (not shown) and the processors may operate in association with each other to control the inter-layer video decoding apparatus 20. Otherwise, the first layer decoder 22, the second layer decoder 24, the neighboring sample determiner 26, and the illumination compensation parameter determiner 28 may be controlled by an external processor (not shown) of the inter-layer video decoding apparatus 20.

The inter-layer video decoding apparatus 20 may include one or more data storages (not shown) for storing input and output data of the first layer decoder 22, the second layer decoder 24, the neighboring sample determiner 26, and the illumination compensation parameter determiner 28. The inter-layer video decoding apparatus 20 may include a memory controller (not shown) for controlling data input and output of the data storages.

In order to decode and reconstruct a video, the inter-layer video decoding apparatus 20 may operate in cooperation with an internal video decoding processor installed therein or an external video decoding processor so as to perform video decoding operations including inverse transformation. The internal video decoding processor of the inter-layer video decoding apparatus 20 may include an individual processor or a video decoding module included in the inter-layer video decoding apparatus 20, a central processing unit, or a graphics processing unit to perform basic video decoding operations.

Referring to FIGS. 2A and 2B, since the inter-layer video decoding apparatus 20 compensates for an illumination difference between different layer images or different views per a certain type of block or slice to decode a second layer image, a reconstructed first layer image and a reconstructed second layer image may have uniform illumination values. Referring to FIGS. 1A and 1B, since the inter-layer video encoding apparatus 10 compensates for an illumination difference between different layer images per a certain type of block or slice, residuals between a predicted image and an original image may be reduced. Accordingly, coding efficiency may be increased.

In addition, coding efficiency may be further increased by more accurately determining first layer neighboring sample values used to induce an illumination compensation parameter, based on a boundary of the first layer image.

Figure 3:
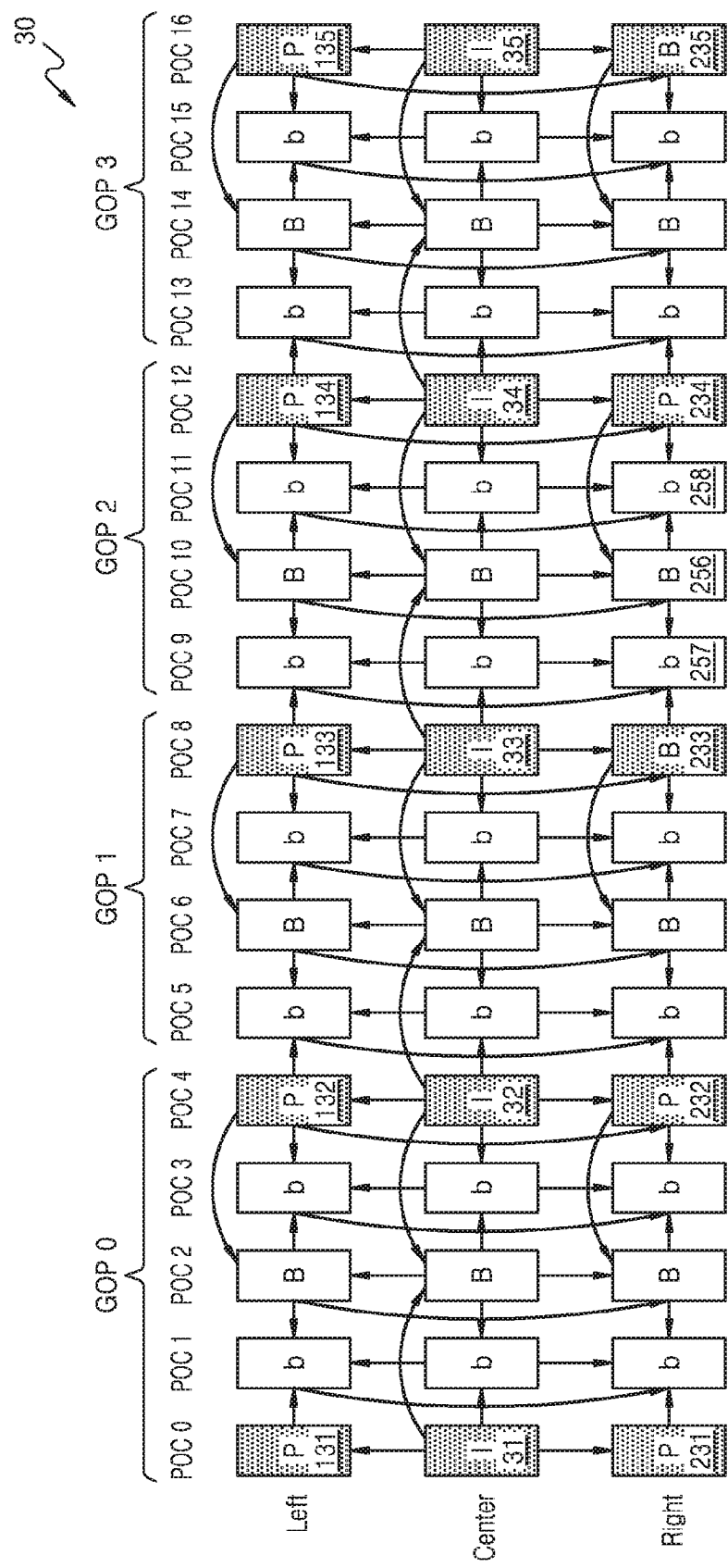
FIG. 3 illustrates an inter-layer prediction structure according to an embodiment.

FIG. 3 illustrates an inter-layer prediction structure according to an embodiment.

The inter-layer video encoding apparatus 10 according to an embodiment may prediction-encode base-view images, left-view images, and right-view images based on a reproduction order 30 of a multiview video prediction structure.

According to the reproduction order 30 of the multiview video prediction structure according to a related technology, images of the same view are arranged in a horizontal direction. Accordingly, the left-view images indicated by 'Left' are arranged in the horizontal direction in a row, the base view images indicated by 'Center' are arranged in the horizontal direction in a row, and the right-view images indicated by 'Right' are arranged in the horizontal direction in a row. Compared to the left/right-view images, the base view images may be central-view images.

Also, images having the same picture order count (POC) order are arranged in a vertical direction. A POC order of images indicates a reproduction order of images forming a video. 'POC X' indicated in the reproduction order 30 of the multiview video prediction structure indicates a relative reproduction order of images in a corresponding column, wherein a reproduction order is in front when a value of X is low, and is behind when the value of X is high.

Thus, according to the reproduction order 30 of the multiview video prediction structure according to the related technology, the left-view images indicated by 'Left' are arranged in the horizontal direction according to the POC order (reproduction order), the base view images indicated by 'Center' are arranged in the horizontal direction according to the POC order (reproduction order), and the right-view images indicated by 'Right' are arranged in the horizontal direction according to the POC order (reproduction order). Also, the left-view image and the right-view image located on the same column as the base view image have different views but the same POC order (reproduction order).

Four consecutive images form one group of pictures (GOP) according to views. Each GOP includes images between consecutive anchor pictures, and one anchor picture (key picture).

An anchor picture is a random access point, and when a reproduction location is arbitrarily selected from images arranged according to a reproduction order, i.e., a POC order, while reproducing a video, an anchor picture closest to the reproduction location according to the POC order is reproduced. The base layer images include base layer anchor pictures 31, 32, 33, 34, and 35, the left-view images include left-view anchor pictures 131, 132, 133, 134, and 135, and the right-view images include right-view anchor pictures 231, 232, 233, 234, and 235.

Multiview images may be reproduced and predicted (reconstructed) according to a GOP order. First, according to the reproduction order 30 of the multiview video prediction structure, images included in GOP 0 may be reproduced, and then images included in GOP 1 may be reproduced, according to views. That is, images included in each GOP may be reproduced in an order of GOP 0, GOP 1, GOP 2, and GOP 3. Also, according to a coding order of the multiview video prediction structure, the images included in GOP 0 may be predicted (reconstructed), and then the images included in GOP 1 may be predicted (reconstructed), according to views. That is, the images included in each GOP may be predicted (reconstructed) in an order of GOP 0, GOP 1, GOP 2, and GOP 3.

According to the reproduction order 30 of the multiview video prediction structure, inter-view prediction (inter-layer prediction) and inter prediction are performed on images. In the multiview video prediction structure, an image where an arrow starts is a reference image, and an image where an arrow ends is an image predicted by using a reference image.

A prediction result of base view images may be encoded and then output in a form of a base view image stream, and a prediction result of additional view images may be encoded and then output in a form of a layer bitstream. Also, a prediction encoding result of left-view images may be output as a first layer bitstream, and a prediction encoding result of right-view images may be output as a second layer bitstream.

Only inter-prediction is performed on base view images. That is, the base layer anchor pictures 31, 32, 33, 34, and 35 of an I-picture type do not refer to other images, but remaining images of B- and b-picture types are predicted by referring to other base view images. Images of a B-picture type are predicted by referring to an anchor picture of an I-picture type, which precedes the images of a B-picture type according to a POC order, and a following anchor picture of an I-picture type. Images of a b-picture type are predicted by referring to an anchor picture of an I-type, which precedes the image of a b-picture type according a POC order, and a following image of a B-picture type, or by referring to an image of a B-picture type, which precedes the images of a b-picture type according to a POC order, and a following anchor picture of an I-picture type.

Inter-view prediction (inter-layer prediction) that references different view images, and inter prediction that references same view images are performed on each of left-view images and right-view images.

Inter-view prediction (inter-layer prediction) may be performed on the left-view anchor pictures 131, 132, 133, 134, and 135 by respectively referring to the base view anchor pictures 31, 32, 33, 34, and 35 having the same POC order. Inter-view prediction may be performed on the right-view anchor pictures 231, 232, 233, 234, and 235 by respectively referring to the base view anchor pictures 31, 32, 33, 34, and 35 or the left-view anchor pictures 131, 132, 133, 134, and 135 having the same POC order. Also, inter-view prediction (inter-layer prediction) may be performed on remaining images other than the left-view images 131, 132, 133, 134, and 135 and the right-view images 231, 232, 233, 234, and 235 by referring to other view images having the same POC.

Remaining images other than the anchor pictures 131, 132, 133, 134, 135, 231, 232, 233, 234, and 235 from among left-view images and right-view images are predicted by referring to the same view images.

However, each of the left-view images and the right-view images may not be predicted by referring to an anchor picture that has a preceding reproduction order from among additional view images of the same view. In other words, in order to perform inter prediction on a current left-view image, left-view images excluding a left-view anchor picture that precedes the current left-view image in a reproduction order may be referenced. Equally, in order to perform inter prediction on a current right-view image, right-view images excluding a right-view anchor picture that precedes the current right-view image in a reproduction order may be referenced.

Also, in order to perform inter prediction on a current left-view image, prediction may be performed by referring to a left-view image that belongs to a current GOP but is to be reconstructed before the current left-view image, instead of referring to a left-view image that belongs to a GOP before the current GOP of the current left-view image. The same is applied to a right-view image.

The inter-layer video decoding apparatus 20 according to an embodiment may reconstruct base view images, left-view images, and right-view images according to the reproduction order 30 of the multiview video prediction structure of FIG. 3.

Left-view images may be reconstructed via inter-view disparity compensation that references base view images and inter-image motion compensation that references left-view images. Right-view images may be reconstructed via inter-view disparity compensation that references base view images and left-view images, and inter-image motion compensation that references right-view images. Reference images may be reconstructed first for disparity compensation and motion compensation of left-view images and right-view images.

For inter-image motion compensation of a left-view image, left-view images may be reconstructed via inter-image motion compensation that references a reconstructed left-view reference image. For inter-image motion compensation of a right-view image, right-view images may be reconstructed via inter-image motion compensation that references a reconstructed right-view reference image.

Also, for inter-image motion compensation of a current left-view image, only a left-view image that belongs to a current GOP of the current left-view image but is to be reconstructed before the current left-view image may be referenced, and a left-view image that belongs to a GOP before the current GOP is not referenced. The same is applied to a right-view image.

As described above, the inter-layer video encoding apparatus 10 and the inter-layer video decoding apparatus 20 may determine whether to perform illumination compensation, based on image characteristics. For example, whether to perform illumination compensation on a block may be determined based on a coding mode of the block, a prediction direction of the block, and a coding type, which are determined based on rate-distortion (RD) optimization.

Figure 4:
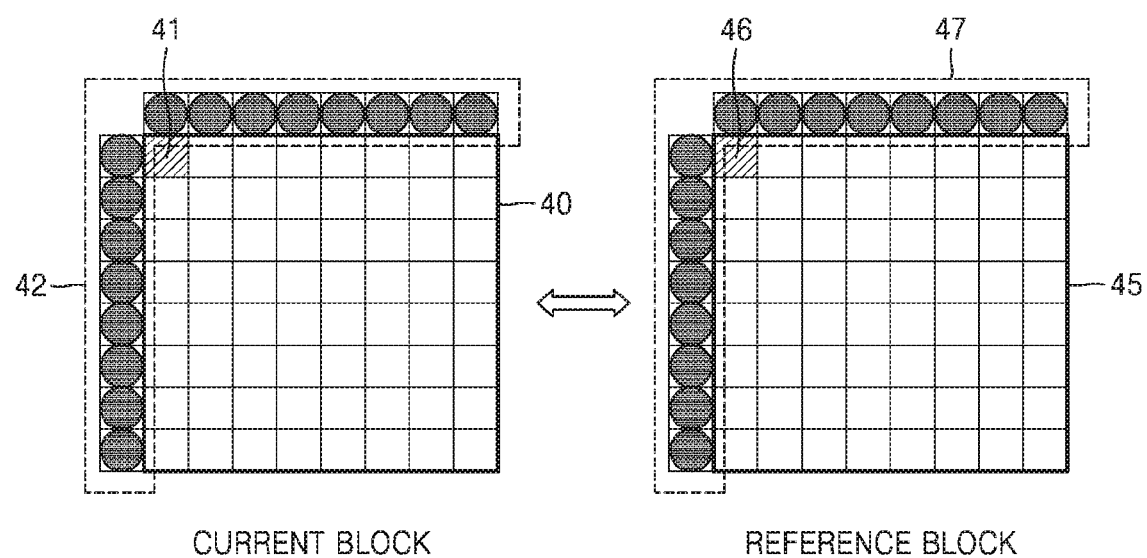
FIG. 4 illustrates an example of a method of determining an illumination compensation parameter, according to an embodiment.

FIG. 4 illustrates an example of a method of determining an illumination compensation parameter, according to an embodiment.

The inter-layer video decoding apparatus 20 according to an embodiment may obtain information indicating whether to perform illumination compensation per coding unit, and determine the illumination compensation parameter for each color component (e.g., Y, U, or V) of each prediction direction per prediction unit of each coding unit. In this case, the illumination compensation parameter may be determined based on neighboring samples of a current block and neighboring samples of a reference block of another layer corresponding to the current block. That is, the illumination compensation parameter may be determined by comparing neighboring samples of the reference block of a first layer to neighboring samples of the current block of a second layer. The illumination compensation parameter may include at least one of a scale factor a and an offset b.

In this case, the neighboring samples of the current block used to induce the illumination compensation parameter may refer to usable neighboring samples of the current block, which are already reconstructed before the current block is reconstructed. Accordingly, when the neighboring samples of the current block are not usable, the illumination compensation parameter may not be induced. That is, the inter-layer video decoding apparatus 20 may determine whether to perform illumination compensation, based on whether the neighboring sample values of the current block are usable.

To determine the illumination compensation parameter, a first layer reference block 45 corresponding to a second layer current block 40 should be found. In this case, a disparity vector may be used. Herein, the disparity vector is a vector indicating a location difference between the second layer current block 40 and the first layer reference block 45.

For example, FIG. 4 shows the second layer current block 40 configured as an 8×8 block and the first layer reference block 45 corresponding to the second layer current block 40. The inter-layer video decoding apparatus 20 may determine a reference location 46 of a first layer image indicated by the disparity vector, based on a location 41 of the second layer current block 40. The location 41 of the current block is a base location of the current block 40 and may be the location of a top-left corner thereof, and the reference location 46 may be the location of a top-left corner of the first layer reference block 45 corresponding to the second layer current block 40.

When the first layer reference block 45 is determined, the illumination compensation parameter may be determined by using neighboring samples 42 of the second layer current block 40 and neighboring samples 47 of the first layer reference block 45. The illumination compensation parameter may be determined by using all or a part of the neighboring samples 42 and 47. For example, an average illumination difference between the neighboring samples 42 and the neighboring samples 47 may be determined as an offset, and thus illumination compensation may be performed on the current block 40 by the determined offset.

According to an embodiment, considering that an illumination difference between samples within the second layer current block 40 and samples within the reference block 45 is similar to an illumination difference between the neighboring samples 42 of the current block 40 and the neighboring samples 47 of the reference block 45, the inter-layer video decoding apparatus 20 may determine the illumination compensation parameters a and b by using the neighboring samples 42 and 47. That is, the inter-layer video decoding apparatus 20 may determine the illumination compensation parameter based on a first layer illumination compensation sample list including the neighboring samples 47 of the first layer reference block 45 and a second layer illumination compensation sample list including the neighboring samples 42 of the second layer current block 40.

Since a and b may be determined by using the neighboring samples 42 and 47, even when the illumination compensation parameter is not received as syntax, the inter-layer video decoding apparatus 20 may calculate the illumination compensation parameter. Accordingly, data to be transmitted may be reduced.

A method of calculating the illumination compensation parameter includes a linear regression scheme, an average of difference based prediction (ADP) scheme, and a difference of average based prediction (DAP) scheme, etc. When the linear regression scheme is used, the illumination compensation parameters a and b may be calculated by using Equation 1.

$$a = \frac{N \cdot \sum_{i=0}^{N-1} NB_{curr}(i) \cdot NB_{ref}(i) - \sum_{i=0}^{N-1} NB_{curr}(i) \cdot \sum_{i=0}^{N-1} NB_{ref}(i)}{N \cdot \sum_{i=0}^{N-1} NB_{ref}(i) \cdot NB_{ref}(i) - \left(\sum_{i=0}^{N-1} NB_{ref}(i)\right)^2}$$

$$b = \frac{\sum_{i=0}^{N-1} NB_{curr}(i) - a \cdot \sum_{i=0}^{N-1} NB_{ref}(i)}{N}$$

Equation 1

N may be the number of neighboring samples of a block (N is 16 in FIG. 4), $NB_{curr}$ may be the value of the neighboring samples 42 of the current block 40, and $NB_{ref}$ may be the value of the neighboring samples 47 of the reference block 45.

The inter-layer video decoding apparatus 20 may perform illumination compensation on the second layer current block 40 by using the determined illumination compensation parameter. For example, the inter-layer video decoding apparatus 20 may compensate for an illumination value Pred(x, y) of each sample of the current block 40 by using an illumination compensation model defined by Equation 2.

Pred'(x, y)=a×Pred(x, y)+b    Equation 2

As described above, since residuals between layers are predicted in an inter-layer prediction structure, a coding operation for predicting an illumination difference between layers may increase the amount of calculation. In particular, an operation of multiplying an illumination value of each pixel by the scale factor a requires many clocks of a computer and thus load may be generated when illumination compensation is performed.

Accordingly, the inter-layer video decoding apparatus 20 according to an embodiment may perform illumination compensation by merely adding an offset in consideration of characteristics per predetermined data unit such as a slice or block of a current image. That is, illumination compensation using only an offset may be performed by using an illumination compensation model defined by Equation 3.

Pred'(x, y)=Pred(x, y)+b'    Equation 3

The inter-layer video decoding apparatus 20 may determine only the offset b'. The inter-layer video decoding apparatus 20 may determine a value obtained by adding the offset b' to the illumination value Pred(x, y) of each sample of the second layer current block 40, as an illumination value Pred'(x, y) of each sample of the illumination-compensated second layer current block 40. Since the illumination compensation model defined by Equation 3 does not include a multiplying operation but includes only an offset-adding operation, the amount of calculation required for illumination compensation may be reduced.

Although the inter-layer video decoding apparatus 20 determines the illumination compensation model and the illumination compensation parameter in FIG. 4, it will be understood by one of ordinary skill in the art that the method described above in relation to FIG. 4 is also applicable to the inter-layer video encoding apparatus 10.

Figure 5A:
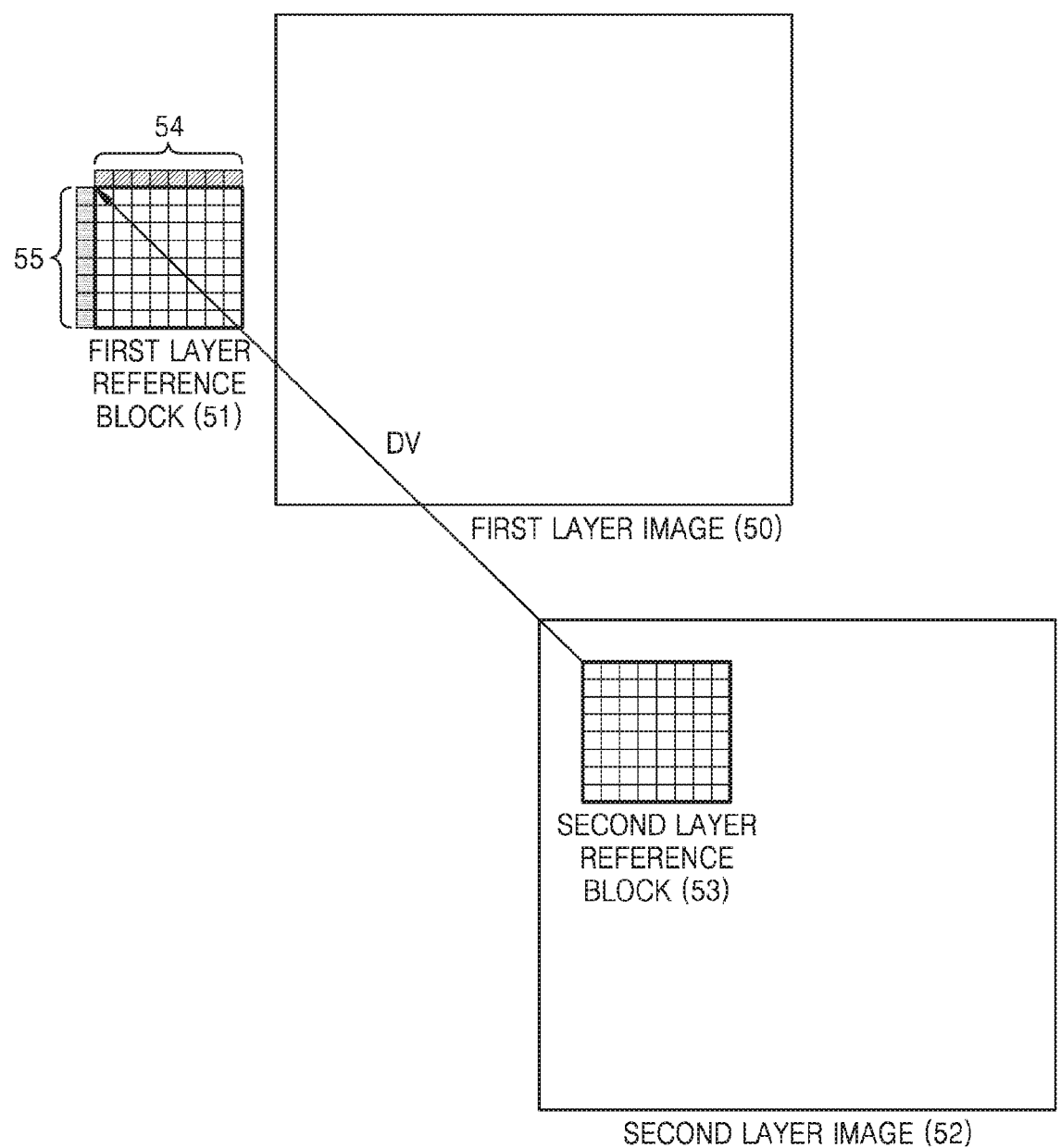
FIGS. 5A and 5B illustrate an example of a process of determining neighboring sample locations of a first layer image, according to various embodiments.
Figure 5B:
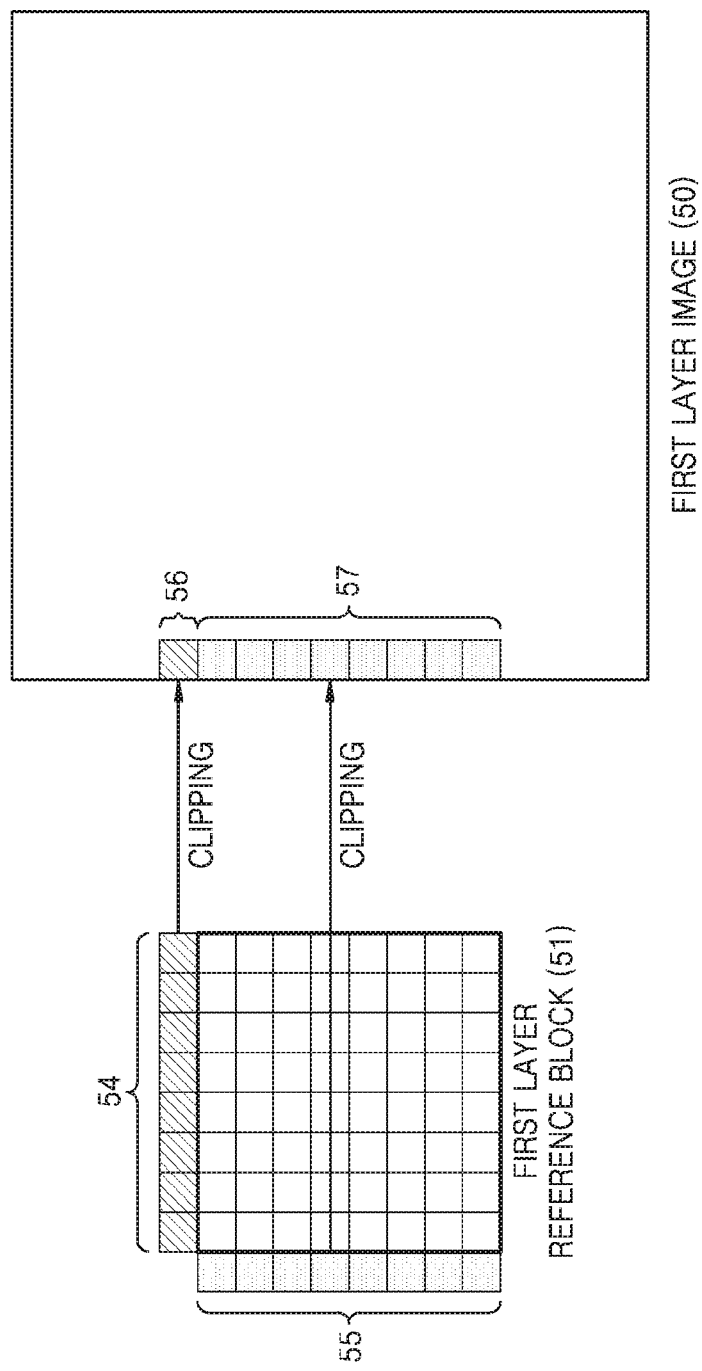

FIGS. 5A and 5B illustrate an example of a process of determining neighboring sample locations of a first layer image 50, according to various embodiments.

To determine an illumination compensation parameter, the inter-layer video decoding apparatus 20 according to various embodiments may determine a first layer reference block 51 corresponding to a current block 53 of a second layer image 52 by using a disparity vector DV. The disparity vector DV may be transmitted in a bitstream or induced from other types of coding information.

Referring to FIG. 5A, when neighboring sample locations 54 and 55 of the reference block 51 are outside a boundary of the first layer image 50, no neighboring sample values of the reference block 51 may be present. Thus, coding efficiency may be reduced. In addition, the amount of calculation for coding may be increased to check validity of the neighboring sample locations 54 and 55.

Accordingly, when the neighboring sample locations 54 and 55 based on a first layer reference location are outside the boundary of the first layer image 50, the inter-layer video decoding apparatus 20 according to various embodiments may determine neighboring sample values by using sample values of the boundary of the first layer image 50. For example, the neighboring sample values may be the sample values of the boundary of the first layer image 50.

By using the sample values of the boundary of the first layer image 50, the inter-layer video decoding apparatus 20 does not need to check validity of the neighboring sample values and may obtain more accurate sample values, thereby increasing coding efficiency. For example, the inter-layer video decoding apparatus 20 may not check validity of the neighboring sample values of the first layer and may perform illumination compensation based on whether neighboring sample values of the second layer current block 53 are valid.

Referring to FIG. 5B, a process of determining the neighboring sample values by the inter-layer video decoding apparatus 20 is shown.

When the neighboring sample locations 54 and 55 based on the first layer reference location are outside the boundary of the first layer image 50, the inter-layer video decoding apparatus 20 according to various embodiments may determine the neighboring sample values by using the sample values of the boundary of the first layer image 50.

In FIG. 5B, when the first layer neighboring sample locations 54 and 55 are outside the boundary of the first layer image 50, the inter-layer video decoding apparatus 20 may determine the neighboring sample values by changing the neighboring sample locations 54 and 55 based on boundary locations 56 and 57 of the first layer image 50. That is, the inter-layer video decoding apparatus 20 may determine the neighboring sample values by clipping the neighboring sample locations 54 and 55 of the reference location based on the boundary of the first layer image 50.

Specifically, the inter-layer video decoding apparatus 20 may compare first component values of the neighboring sample locations 54 and 55 to a left boundary and a right boundary of the first layer image 50, and compare second component values of the neighboring sample locations 54 and 55 to a top boundary and a bottom boundary of the first layer image 50. The first component values may be x component values, and the second component values may be y component values.

When the neighboring sample locations 54 and 55 are outside the left boundary or the right boundary of the first layer image 50, the inter-layer video decoding apparatus 20 may determine the neighboring sample values by using sample values of the left boundary or the right boundary of the first layer image 50. When the neighboring sample locations 54 and 55 are outside the top boundary or the bottom boundary of the first layer image 50, the inter-layer video decoding apparatus 20 may determine the neighboring sample values by using sample values of the top boundary or the bottom boundary of the first layer image 50.

For example, in FIG. 5B, since the neighboring sample locations 54 are outside the left boundary of the first layer image 50, the inter-layer video decoding apparatus 20 may determine top neighboring sample values of the first layer reference block 51 by using a sample value of a left boundary location 56 of the first layer image 50. In addition, since the neighboring sample locations 55 are outside the left boundary of the first layer image 50, the inter-layer video decoding apparatus 20 may determine left neighboring sample values of the first layer reference block 51 by using sample values of left boundary locations 57 of the first layer image 50. The top neighboring sample values of the first layer reference block 51 may correspond to the sample value of the left boundary location 56 of the first layer image 50, and the left neighboring sample values of the first layer reference block 51 may be the sample values of the left boundary locations 57 of the first layer image 50.

Similarly, when the neighboring sample locations 54 and 55 are outside the right boundary of the first layer image 50, the inter-layer video decoding apparatus 20 may determine the neighboring sample values by using sample values of the right boundary.

In addition, when the neighboring sample locations 54 and 55 are outside the top or bottom boundary of the first layer image 50, the inter-layer video decoding apparatus 20 may determine the neighboring sample values by using sample values of the top or bottom boundary.

Specifically, when the first component values of the neighboring sample locations 54 and 55 are outside the left boundary or the right boundary of the first layer image 50, the inter-layer video decoding apparatus 20 may change the first component values of the neighboring sample locations 54 and 55 based on left or right boundary locations of the first layer image 50. When the second component values of the neighboring sample locations 54 and 55 are outside the top boundary or the bottom boundary of the first layer image 50, the inter-layer video decoding apparatus 20 may change the second component values of the neighboring sample locations 54 and 55 based on top or bottom boundary locations of the first layer image 50. The neighboring sample values may be sample values of the left or right boundary locations of the first layer image 50, or sample values of the top or bottom boundary locations of the first layer image 50.

A method of determining the first layer neighboring sample values as described above in relation to FIG. 5B may be expressed as the following pseudo-code.

xOff=curNbColFlag ? −1:i yOff=curNbColFlag ? i:−1 xP=Clip3(0, (pic_width_in_luma_samples/sub-Width)−1, xRefBlkLX+xOff)

yP=Clip3(0, (pic_height_in_luma_samples/sub-Height)−1, yRefBlkLX+yOff)

refSampleListLX[numSamples]=refRecSamplesLX [xP][yP]

curSampleList[numSamples++]=curRecSamples[xC+xOff][yC+yOff]

Herein, curNbColFlag may be information indicating whether neighboring sample locations are top neighboring sample locations or left neighboring sample locations of a first layer reference location. In addition, availFlagCurLeftCol and availFlagCurAboveRow may be information indicating whether left sample values of a second layer current block are valid, and information indicating whether top sample values of the second layer current block are valid, respectively. Furthermore, xRefBlkLX and yRefBlkLX may indicate an x component and a y component of the first layer reference location, respectively. Besides, xRefBlkLX+xOff and yRefBlkLX+yOff may indicate x components and y components of the neighboring sample locations based on the first layer reference location, respectively.

The x components (xRefBlkLX+xOff) of the neighboring sample locations may be clipped based on a left boundary location (0) of a first layer image, which is the minimum value, and a right boundary location ((pic_width_in_luma_samples/subWidth)−1) of the first layer image, which is the maximum value, and changed into new x components (xP) of the neighboring sample locations. The y components (yRefBlkLX+yOff) of the neighboring sample locations may be clipped based on a top boundary location (0) of the first layer image, which is the minimum value, and a bottom boundary location ((pic_height_in_luma_samples/sub-Height)−1) of the first layer image, which is the maximum value, and changed into new y components (yP) of the neighboring sample locations.

Herein, refRecSamplesLX[xP][yP] may indicate neighboring sample values of a reconstructed first layer image. The inter-layer video decoding apparatus 20 may determine a first layer illumination compensation sample list (refSampleListLX) including the neighboring sample values of the first layer image. In addition, the inter-layer video decoding apparatus 20 may determine a second layer illumination compensation sample list (curSampleList) including neighboring sample values of a second layer image.

Alternatively, the inter-layer video decoding apparatus 20 may determine the neighboring sample values by padding the neighboring sample values of the reference location by using the sample values of a boundary of the first layer image.

Since the inter-layer video decoding apparatus 20 determines the illumination compensation parameter by using the determined neighboring sample values of the first layer reference block 51, more accurate neighboring sample values may be predicted and thus coding efficiency may be increased.

Although the inter-layer video decoding apparatus 20 determines the first layer neighboring sample values used to induce the illumination compensation parameter in FIGS. 5A and 5B, it will be understood by one of ordinary skill in the art that the method described above in relation to FIGS. 5A and 5B is also applicable to the inter-layer video encoding apparatus 10.

Figure 6A:
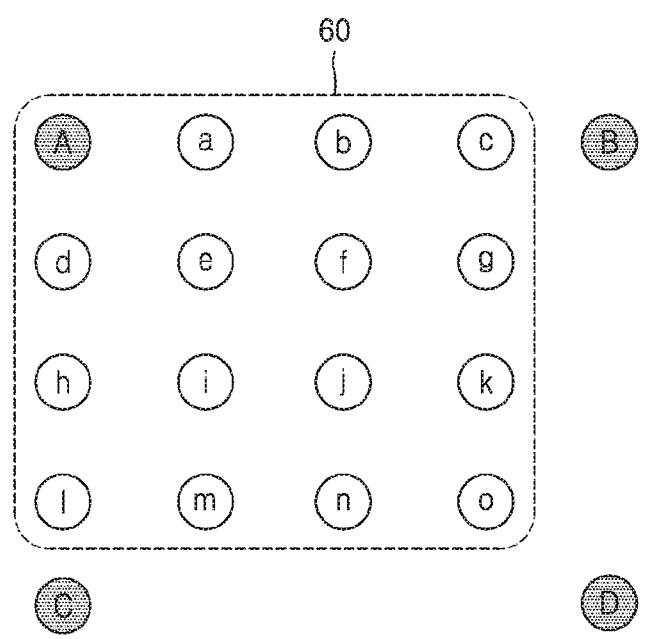
FIGS. 6A to 6C illustrate examples of a method of determining a reference location to determine first layer neighboring sample values, according to various embodiments.
Figure 6B:
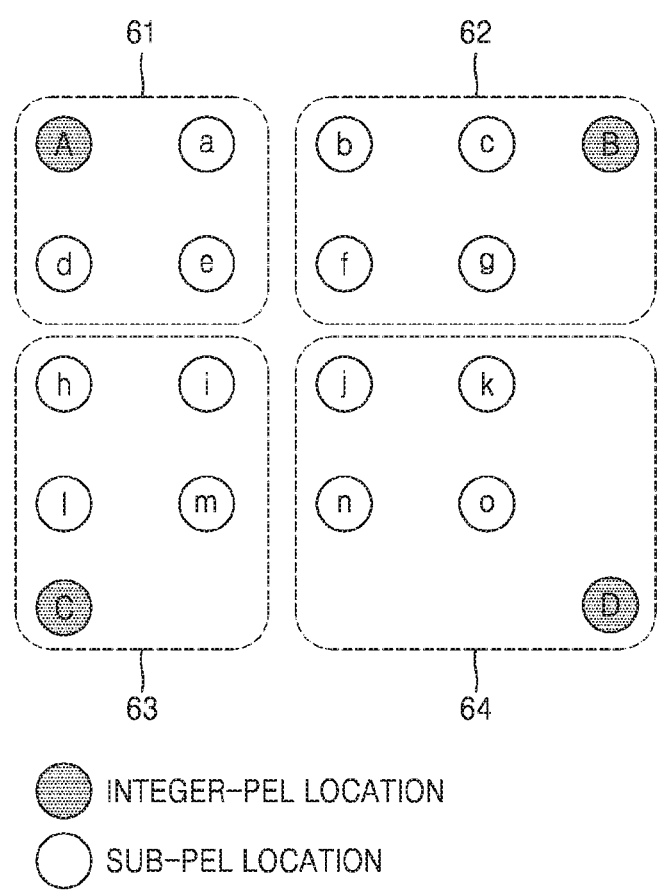
Figure 6C:
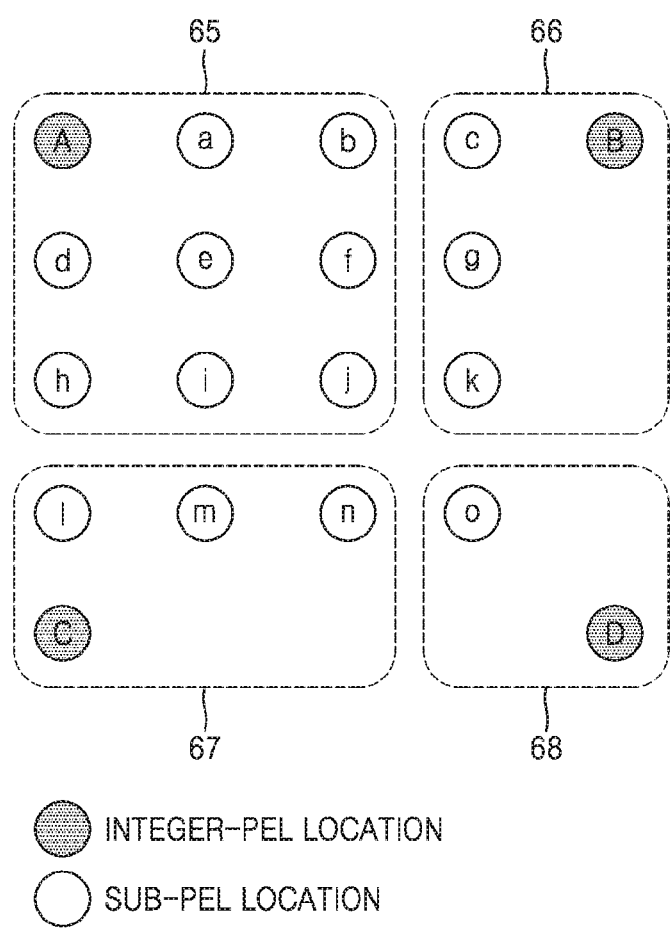

FIGS. 6A to 6C illustrate examples of a method of determining a reference location to determine first layer neighboring sample values, according to various embodiments.

The inter-layer video decoding apparatus 20 according to various embodiments may use a disparity vector indicating a view difference between layers, to determine a first layer reference block corresponding to a second layer current block. The disparity vector may be transmitted in a bitstream or induced from other types of coding information.

Since the disparity vector may have fractional pixel accuracy, e.g., quarter-pel or half-pel accuracy, the location of a first layer image indicated by the disparity vector of the second layer current block may be a sub-pel location. The sub-pel location may be a pixel location other than an integer-pel location.

When the disparity vector indicates a sub-pel location, an integer-pel location adjacent to the sub-pel location may be the reference location of the first layer image to reduce complexity of calculation.

For example, FIGS. 6A to 6C illustrate examples of determining a neighboring integer-pel indicated by the disparity vector, according to embodiments.

In FIGS. 6A to 6C, uppercase A, B, C, and D indicate integer-pel locations, and lowercase a to o indicate sub-pel locations.

Referring to FIG. 6A, the inter-layer video decoding apparatus 20 according to an embodiment may determine an integer-pel location of a 1×1 block including the location of the first layer image indicated by the disparity vector at a base location of the second layer current block, as the first layer reference location.

For example, when the disparity vector indicates a sub-pel location a, b, c, d, e, f, g, h, i, j, k, l, m, n, or o of a top-left region 60, the first layer reference location may be an integer-pel location A.

A method of determining the reference location by using the location of the first layer image indicated by the disparity vector at the base location of the current block as described above in relation to FIG. 6A may be expressed as the following pseudo-code.

$xRLX=xC+(mvLX[0]>>(2+(cldx\ ?\ 1:0)))$ $yRLX=yC+(mvLX[1]\times\times(2+(cldx\ ?\ 1:0)))$ In the above pseudo-code, mvLX[0] and mvLX[1] may denote an x component and a y component of the disparity vector, (xC, yC) may denote a location coordinate of the current block, and cldx may denote a Y component or a depth map when the value thereof is 0, denote a U component when the value thereof is 1, and denote a V component when the value thereof is 2. A luma block and a chroma block have different sizes and thus may have different distances between integer-pixels. Thus, when the disparity vector indicates a sub-pixel, the method of determining the reference location may differ based on whether a conditional "cldx? 1:0" indicates a luma block or a chroma block.

Accordingly, a reference block location (xRLX, yRLX) corresponding to the current block location (xC, yC) may be obtained based on a predetermined shift operation shown by then above pseudo-code. Herein, each of the current block location (xC, yC) and the reference block location (xRLX, yRLX) may be a coordinate value of a top-left corner of the block. However, each of the current block location (xC, yC) and the reference block location (xRLX, yRLX) is not limited thereto and may be a coordinate value of a center pixel of the block.

As another example, referring to FIG. 6B, the inter-layer video decoding apparatus 20 according to an embodiment may determine the first layer reference location by using the closest integer-pel location to the location of the first layer image indicated by the disparity vector at the base location of the current block. The first layer reference location may be the closest integer-pel location to the location of the first layer image indicated by the disparity vector.

For example, when the disparity vector indicates a sub-pel location a, d, or e of a top-left region 61, an integer-pel location A may be the first layer reference location.

Likewise, when the disparity vector indicates a sub-pel location b, c, f, or g of a top-right region 62, an integer-pel location B may be the reference location. When the disparity vector indicates a sub-pel location l, m, or n of a bottom-left region 63, an integer-pel location C may be the reference location. When the disparity vector indicates a sub-pel location j, k, n, or o of a bottom-right region 64, an integer-pel location D may be the reference location. Alternatively, when the disparity vector indicates an integer-pel location, the integer-pel location may be determined as the first layer reference location.

A method of determining the first layer reference location by using the location indicated by the disparity vector at a base pixel 41 of the current block as described above in relation to FIG. 6B may be expressed as the following pseudo-code.

$xRLX=xC+((mvLX[0]+(cldx\ ?\ 4:2))>>(2+(cldx\ ?\ 1:0)))$ $yRLX=yC+((mvLX[1]+(cldx\ ?\ 4:2))>>(2+(cldx\ ?\ 1:0)))$ The above pseudo-code may be modified as shown below.

$xRLX=xC+((mvLX[0]+2+(cldx\ ?\ 2:0))>>(2+(cldx\ ?\ 1:0)))$ $yRLX=yC+((mvLX[1]+2+(cldx\ ?\ 2:0))>>(2+(cldx\ ?\ 1:0)))$ As another example, referring to FIG. 6C, when the disparity vector indicates a sub-pel location a, b, d, e, f, h, i, or j of a top-left region 65, the inter-layer video decoding apparatus 20 according to an embodiment may determine the first layer reference location by using an integer-pel location A.

Likewise, when the disparity vector indicates a sub-pel location c, g, or k of a top-right region 66, an integer-pel location B may be determined as the reference location. When the disparity vector indicates a sub-pel location l, m, or n of a bottom-left region 67, an integer-pel location C may be determined as the reference location. When the disparity vector indicates a sub-pel location o of a bottom-right region 68, an integer-pel location D may be determined as the reference location.

An integer-pel location determined when the disparity vector indicates a predetermined sub-pixel is not limited to the methods of FIGS. 6A to 6C and may be determined by using various methods.

The inter-layer video decoding apparatus 20 may determine neighboring sample locations of the first layer reference block based on the determined first layer reference location, determine neighboring sample values based on the neighboring sample locations, and determine a first layer illumination compensation sample list including the neighboring sample values.

Although the inter-layer video decoding apparatus 20 determines the first layer reference location in FIGS. 6A to 6C, it will be understood by one of ordinary skill in the art that the methods described above in relation to FIGS. 6A to 6C are also applicable to the inter-layer video encoding apparatus 10.

Figure 7A:
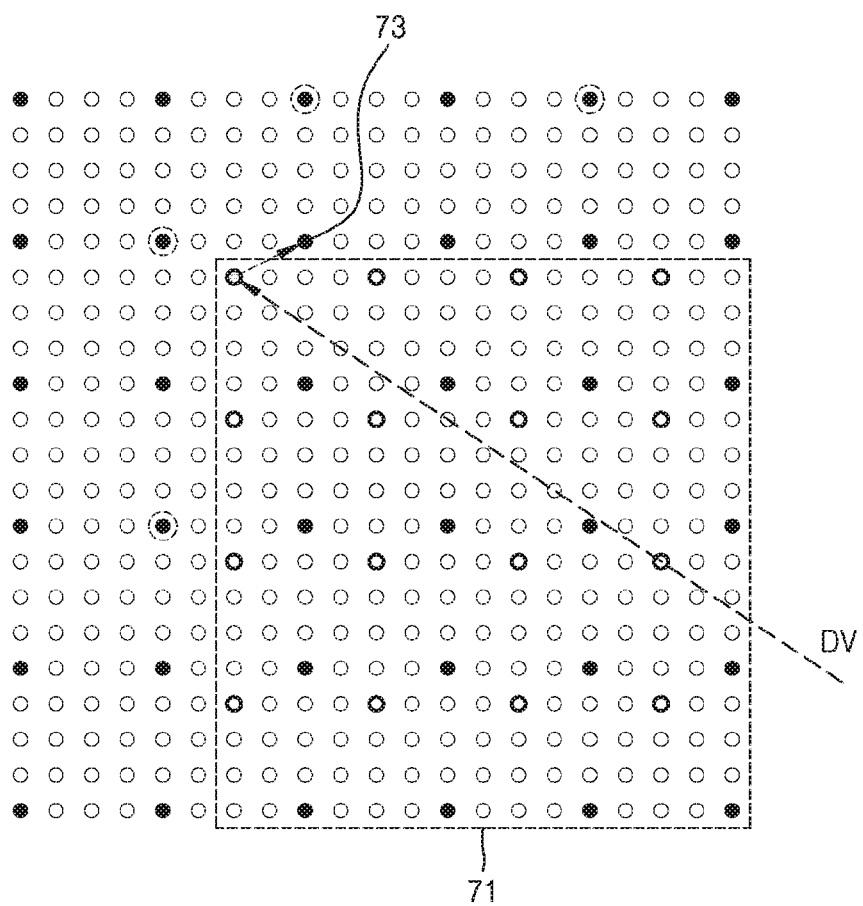
FIGS. 7A to 7C illustrate examples of a method of determining a reference location to determine first layer neighboring sample values, according to various embodiments.
Figure 7B:
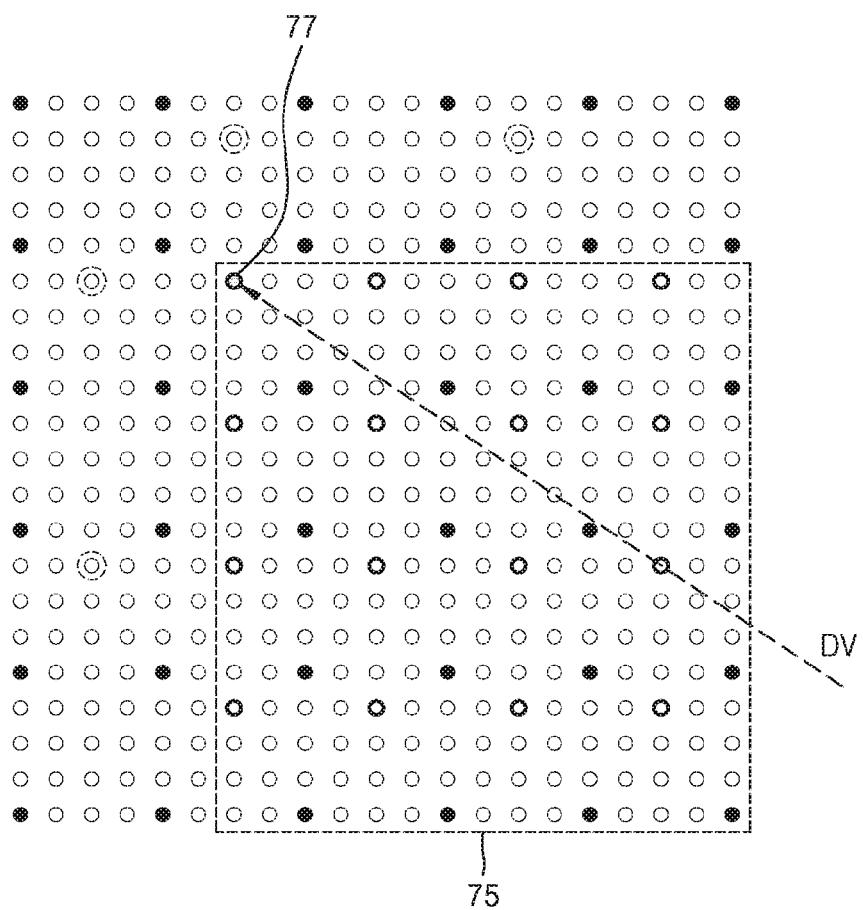
Figure 7C:
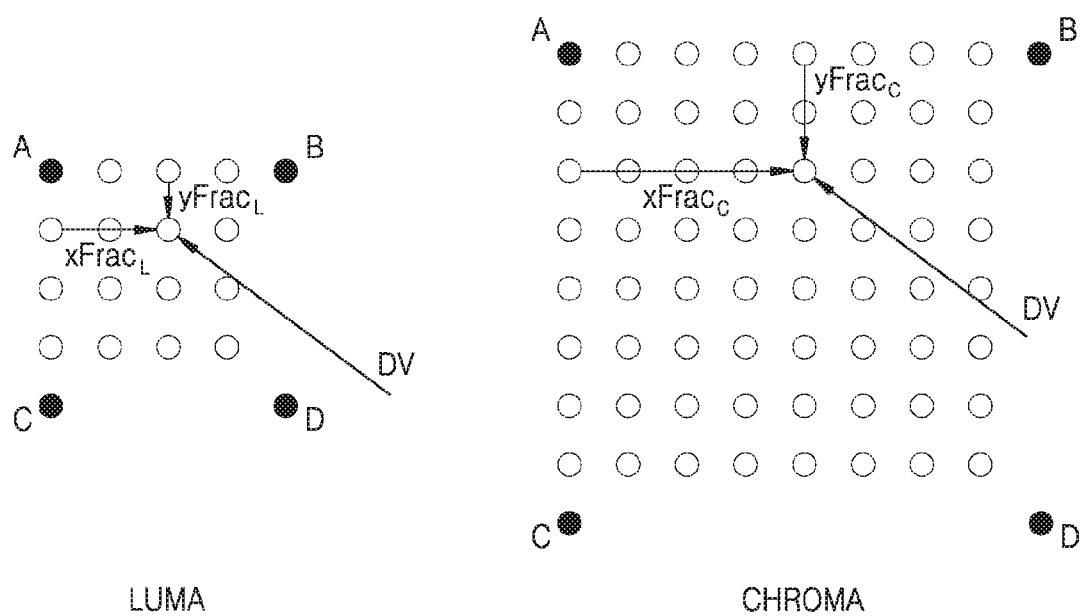

FIGS. 7A to 7C illustrate examples of a method of determining a reference location to determine first layer neighboring sample values, according to various embodiments.

FIG. 7A illustrates a process of determining first layer neighboring sample locations in integer-pel units, according to an embodiment, and FIG. 7B illustrates a process of determining first layer neighboring sample locations in sub-pixel units, according to another embodiment.

In FIG. 7A, when a disparity vector indicates a sub-pel location, the inter-layer video encoding apparatus 10 may determine the first layer reference location by using an integer-pel location adjacent to the sub-pel location, to reduce complexity of calculation. That is, the first layer reference location may be the location of an integer-pixel adjacent to a sub-pixel indicated by the disparity vector.

Referring to FIG. 7A, a reference block 71 of a first layer image is shown. The reference block 71 may be a 4×4 block. The inter-layer video decoding apparatus 20 may determine a block having a top-left corner location corresponding to a location indicated by the disparity vector of a second layer current block, as the reference block 71.

In this case, the inter-layer video decoding apparatus 20 may determine an integer-pel location based on the location indicated by the disparity vector, as a reference location 73, and determine first layer neighboring pixel locations based on the reference location 73.

That is, when the location indicated by the disparity vector is a sub-pel location, the inter-layer video decoding apparatus 20 may determine the closest integer-pel location to the sub-pel location, as the reference location 73. This principle may be the same as that of the method described above in relation to FIG. 6B. Alternatively, the inter-layer video decoding apparatus 20 may determine an integer-pel location based on the location indicated by the disparity vector, as the reference location 73 according to the method described above in relation to FIG. 6A or 6C.

The first layer neighboring pixel locations may be integer-pel locations, x component values or y component values of which are smaller than that of the reference location 73 by 1. In this case, the first layer neighboring pixel locations may not be the closest integer-pel locations to a top or left side of the first layer reference block 71.

According to another embodiment, in FIG. 7B, when the disparity vector indicates a sub-pel location, the inter-layer video decoding apparatus 20 may determine the reference location by using the sub-pel location indicated by the disparity vector, to improve accuracy of an illumination compensation parameter and thus to increase coding efficiency. That is, the first layer reference location may be the sub-pel location indicated by the disparity vector.

Referring to FIG. 7B, a reference block 75 of the first layer image is shown. The reference block 75 may be a 4×4 block. The inter-layer video decoding apparatus 20 may determine a block having a top-left corner location corresponding to a location indicated by the disparity vector of the second layer current block, as the reference block 75.

That is, even when the disparity vector indicates a sub-pel location, the first layer reference block corresponding to the second layer current block is determined as a block having a top-left corner location corresponding to the sub-pel location, the first layer neighboring pixel locations may also be determined based on the sub-pel location and thus accuracy of the illumination compensation parameter may be improved.

The inter-layer video decoding apparatus 20 may determine the location indicated by the disparity vector, as a reference location 77, and determine the first layer neighboring pixel locations based on the reference location 77. That is, when the location indicated by the disparity vector is a sub-pel location, the inter-layer video decoding apparatus 20 may determine the sub-pel location as the reference location 77.

The first layer neighboring pixel locations may be sub-pel locations, x component values or y component values of which are smaller than that of the reference location 77 by 1.

FIG. 7C illustrates examples of a method of determining a reference location to determine first layer neighboring sample values, according to various embodiments.

When the location indicated by the disparity vector of the second layer current block is a sub-pel location, the inter-layer video decoding apparatus 20 according to various embodiments may determine the sub-pel location as the reference location, and determine first layer neighboring sample locations based on the reference location. In this case, the first layer neighboring sample locations may be sub-pel locations.

Referring to FIG. 7C, when the reference location indicated by the disparity vector is a sub-pel location, the inter-layer video decoding apparatus 20 according to various embodiments may express the reference location by using an integer coordinate (xRLX, yRLX) and a fractional coordinate (xFrac, yFrac) as shown by the following pseudo-code.

$xRLX = xC + ((mvLX[0]) >> (2 + (cldx ? 1:0)))$ $yRLX = yC + ((mvLX[1]) >> (2 + (cldx ? 1:0)))$ $xFrac = mvLX[0]\ \&(cldx ? 7:3)$ $yFrac = mvLX[1]\ \&(cldx ? 7:3)$ In the above pseudo-code, mvLX[0] and mvLX[1] may denote an x component and a y component of the disparity vector, (xC, yC) may denote a location coordinate of the current block, and cldx may denote a Y component or a depth map when the value thereof is 0, denote a U component when the value thereof is 1, and denote a V component when the value thereof is 2. A luma block and a chroma block have different sizes and thus may have different distances between integer-pixels. Thus, when the disparity vector indicates a sub-pixel, the method of determining the reference location may differ based on whether a conditional "cldx? 1:0" indicates a luma block or a chroma block.

Referring to FIG. 7C, integer-pel samples A, B, C, and D adjacent to the first layer reference location are shown. The inter-layer video decoding apparatus 20 may determine first layer neighboring sample values (refSample) based on the reference location indicated by the disparity vector, by using the integer coordinate (xRLX, yRLX) and the fractional coordinate (xFrac, yFrac) of the reference location and the integer-pel samples A, B, C, and D adjacent to the reference location. The first layer neighboring sample values (refSample) may be calculated as shown by the following pseudo-code.

$refSample = ((w-xFrac)*(w-yFrac)*refSampleList[4*i] + xFrac*(w-yFrac)*refSampleList[4*i+1] + (w-xFrac)*yFrac*refSampleList[4*i+2] + xFrac*yFrac*refSampleList[4*i+3] + (cldx==0\ ?\ 8:32)) >> (cldx==0\ ?\ 4:6)$ In the above pseudo-code, w denotes the size of a 1×1 block based on a sub-pel unit, and may have a value of 4 when the value of cldx is 0, and have a value of 8 when the value of cldx is not 0. Furthermore, cldx may denote a Y component or a depth map when the value thereof is 0, denote a U component when the value thereof is 1, and denote a V component when the value thereof is 2. In addition, i may have a value ranging from 0 to (No. of Samples included in Illumination Compensation Sample List/2)−1. Besides, refSampleList[4*i], refSampleList[4*i+1], refSampleList[4*i+2], and refSampleList[4*i+3] may be sample values of the locations A, B, C, and D, respectively.

When the disparity vector indicates a sub-pel location, the inter-layer video decoding apparatus 20 may determine the sub-pel location as the reference location and use the neighboring sample values determined based on the reference location, thereby improving accuracy of an illumination compensation parameter and increasing coding efficiency.

Although the inter-layer video decoding apparatus 20 determines the first layer reference location in FIGS. 7A to 7C, it will be understood by one of ordinary skill in the art that the methods described above in relation to FIGS. 7A to 7C are also applicable to the inter-layer video encoding apparatus 10.

As described above, the inter-layer video encoding apparatus 10 according to an embodiment and the inter-layer video decoding apparatus 20 according to an embodiment may spilt blocks of video data into coding units having a tree structure, and coding units, prediction units, and transformation units may be used for inter-layer prediction or inter prediction of coding units. Hereinafter, with reference to FIGS. 8 through 20, a video encoding method, a video encoding apparatus, a video decoding method, and a video decoding apparatus based on coding units having a tree structure and transformation units, according to an embodiment, will be described.

In principle, during encoding and decoding processes for a multilayer video, encoding and decoding processes for first layer images and encoding and decoding processes for second layer images are separately performed. That is, when inter-layer prediction is performed on a multilayer video, encoding and decoding results of single-layer videos may be mutually referred to, but separate encoding and decoding processes are performed according to single-layer videos.

Accordingly, since video encoding and decoding processes based on coding units having a tree structure as described below with reference to FIGS. 8 through 20 for convenience of description are video encoding and decoding processes for processing a single-layer video, only inter prediction and motion compensation are performed. However, as described above with reference to FIGS. 1A through 7B, in order to encode and decode a video stream, inter-layer prediction and compensation are performed on base layer images and second layer images.

Figure 8:
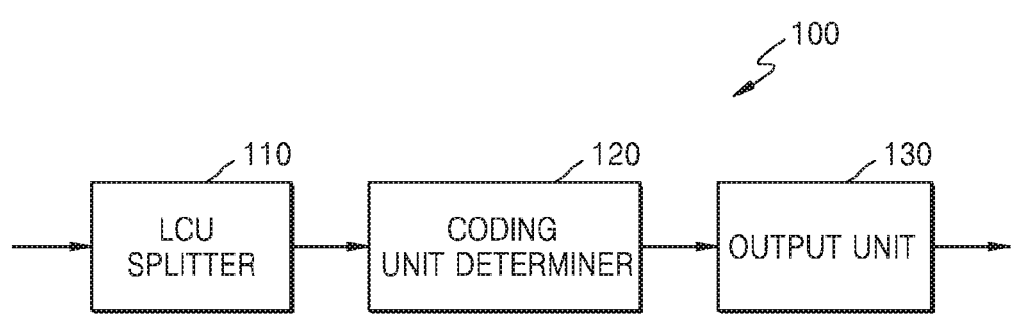
FIG. 8 is a block diagram of a video encoding apparatus based on coding units according to a tree structure, according to an embodiment.

Accordingly, in order for the encoder 12 of the inter-layer video encoding apparatus 10 according to an embodiment to encode a multilayer video based on coding units having a tree structure, the inter-layer video encoding apparatus 10 may include as many video encoding apparatuses 100 of FIG. 8 as the number of layers of the multilayer video so as to perform video encoding according to each single-layer video, thereby controlling each video encoding apparatus 100 to encode an assigned single-layer video. Also, the inter-layer video encoding apparatus 10 may perform inter-view prediction by using encoding results of individual single viewpoints of each video encoding apparatus 100. Accordingly, the encoder 12 of the inter-layer video encoding apparatus 10 may generate a base view video stream and a second layer video stream, which include encoding results according to layers.

Figure 9:
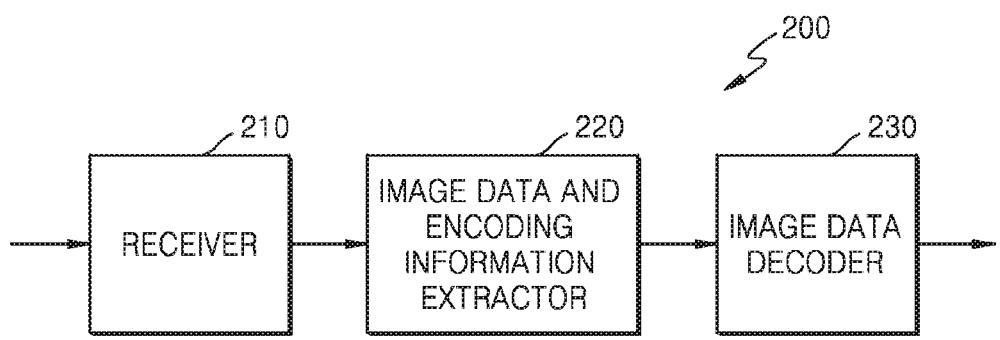
FIG. 9 is a block diagram of a video decoding apparatus based on coding units according to a tree structure, according to an embodiment.

Similarly, in order for the decoder 24 of the inter-layer video decoding apparatus 20 according to an embodiment to decode a multilayer video based on coding units having a tree structure, the inter-layer video decoding apparatus 20 may include as many video decoding apparatuses 200 of FIG. 9 as the number of layers of the multilayer video so as to perform video decoding according to layers with respect to a received first layer video stream and a received second layer video stream, thereby controlling each video decoding apparatus 200 to decode an assigned single-layer video. Also, the inter-layer video decoding apparatus 20 may perform inter-layer compensation by using a decoding result of an individual single layer of each video decoding apparatus 200. Accordingly, the decoder 24 of the inter-layer video decoding apparatus 20 may generate first layer images and second layer images, which are reconstructed according to layers.

FIG. 8 is a block diagram of the video encoding apparatus based on coding units according to a tree structure 100, according to an embodiment of the present disclosure.

The video encoding apparatus involving video prediction based on coding units according to a tree structure 100 according to an embodiment includes a largest coding unit splitter 110, a coding unit determiner 120, and an output unit 130. Hereinafter, for convenience of description, the video encoding apparatus involving video prediction based on coding units according to a tree structure 100 will be abbreviated to the 'video encoding apparatus 100'.

The coding unit determiner 120 may split a current picture based on a largest coding unit that is a coding unit having a maximum size for the current picture of an image. If the current picture is larger than the largest coding unit, image data of the current picture may be split into the at least one largest coding unit. The largest coding unit according to an embodiment may be a data unit having a size of 32×32, 64×64, 128×128, 256×256, etc., wherein a shape of the data unit is a square having a width and length in squares of 2.

A coding unit according to an embodiment may be characterized by a maximum size and a depth. The depth denotes the number of times the coding unit is spatially split from the largest coding unit, and as the depth deepens, deeper coding units according to depths may be split from the largest coding unit to a minimum coding unit. A depth of the largest coding unit is an uppermost depth and a depth of the minimum coding unit is a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to a maximum size of the coding unit, and each of the largest coding units may include deeper coding units that are split according to depths. Since the largest coding unit according to an embodiment is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The coding unit determiner 120 encodes at least one split region obtained by splitting a region of the largest coding unit according to depths, and determines a depth to output a finally encoded image data according to the at least one split region. In other words, the coding unit determiner 120 determines a final depth by encoding the image data in the deeper coding units according to depths, according to the largest coding unit of the current picture, and selecting a depth having the minimum encoding error. The determined final depth and the encoded image data according to the determined coded depth are output to the output unit 130.

The image data in the largest coding unit is encoded based on the deeper coding units corresponding to at least one depth equal to or below the maximum depth, and results of encoding the image data are compared based on each of the deeper coding units. A depth having the minimum encoding error may be selected after comparing encoding errors of the deeper coding units. At least one final depth may be selected for each largest coding unit.

The size of the largest coding unit is split as a coding unit is hierarchically split according to depths, and as the number of coding units increases. Also, even if coding units correspond to the same depth in one largest coding unit, it is determined whether to split each of the coding units corresponding to the same depth to a lower depth by measuring an encoding error of the image data of the each coding unit, separately. Accordingly, even when image data is included in one largest coding unit, the encoding errors may differ according to regions in the one largest coding unit, and thus the final depths may differ according to regions in the image data. Thus, one or more final depths may be determined in one largest coding unit, and the image data of the largest coding unit may be divided according to coding units of at least one final depth.

Accordingly, the coding unit determiner 120 according to an embodiment may determine coding units having a tree structure included in the largest coding unit. The 'coding units having a tree structure' according to an embodiment include coding units corresponding to a depth determined to be the final depth, from among all deeper coding units included in the largest coding unit. A coding unit of a final depth may be hierarchically determined according to depths in the same region of the largest coding unit, and may be independently determined in different regions. Similarly, a final depth in a current region may be independently determined from a final depth in another region.

A maximum depth according to an embodiment is an index related to the number of splitting times from a largest coding unit to a minimum coding unit. A first maximum depth according to an embodiment may denote the total number of splitting times from the largest coding unit to the minimum coding unit. A second maximum depth according to an embodiment may denote the total number of depth levels from the largest coding unit to the minimum coding unit. For example, when a depth of the largest coding unit is 0, a depth of a coding unit, in which the largest coding unit is split once, may be set to 1, and a depth of a coding unit, in which the largest coding unit is split twice, may be set to 2. In this case, if the minimum coding unit is a coding unit in which the largest coding unit is split four times, depth levels of depths 0, 1, 2, 3, and 4 exist, and thus the first maximum depth may be set to 4, and the second maximum depth may be set to 5.

Prediction encoding and transformation may be performed according to the largest coding unit. The prediction encoding and the transformation are also performed based on the deeper coding units according to a depth equal to or depths less than the maximum depth, according to the largest coding unit.

Since the number of deeper coding units increases whenever the largest coding unit is split according to depths, encoding, including the prediction encoding and the transformation, is performed on all of the deeper coding units generated as the depth deepens. For convenience of description, the prediction encoding and the transformation will now be described based on a coding unit of a current depth, in a largest coding unit.

The video encoding apparatus 100 according to an embodiment may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the largest coding unit, the prediction encoding may be performed based on a coding unit corresponding to a final depth according to an embodiment, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit and a data unit obtained by splitting at least one of a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition mode according to an embodiment may selectively include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a minimum encoding error.

The video encoding apparatus 100 according to an embodiment may also perform the transformation on the image data in a coding unit based not only on the coding unit for encoding the image data, but also based on a data unit that is different from the coding unit. In order to perform the transformation in the coding unit, the transformation may be performed based on a transformation unit having a size less than or equal to the coding unit. For example, the transformation unit may include a data unit for an intra mode and a transformation unit for an inter mode.

The transformation unit in the coding unit may be recursively split into smaller sized regions in a manner similar to that in which the coding unit is split according to the tree structure, according to an embodiment. Thus, residual data in the coding unit may be split according to the transformation unit having the tree structure according to transformation depths.

A transformation depth indicating the number of splitting times to reach the transformation unit by splitting the height and width of the coding unit may also be set in the transformation unit according to an embodiment. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. That is, the transformation unit having the tree structure may be set according to the transformation depths.

Split information according to depths requires not only information about a depth, but also about information related to prediction encoding and transformation. Accordingly, the coding unit determiner 120 not only determines a depth having a minimum encoding error, but also determines a partition mode of splitting a prediction unit into a partition, a prediction mode according to prediction units, and a size of a transformation unit for transformation.

Coding units according to a tree structure in a largest coding unit and methods of determining a prediction unit/partition, and a transformation unit, according to various embodiments, will be described in detail below with reference to FIGS. 9 through 19.

The coding unit determiner 120 may measure an encoding error of deeper coding units according to depths by using Rate-Distortion Optimization based on Lagrangian multipliers.

The output unit 130 outputs the image data of the largest coding unit, which is encoded based on the at least one depth determined by the coding unit determiner 120, and split information according to the depth, in bitstreams.

The encoded image data may be obtained by encoding residual data of an image.

The split information according to depth may include information about the depth, about the partition mode in the prediction unit, about the prediction mode, and about split of the transformation unit.

The information about the final depth may be defined by using split information according to depths, which indicates whether encoding is performed on coding units of a lower depth instead of a current depth. If the current depth of the current coding unit is a depth, the current coding unit is encoded, and thus the split information may be defined not to split the current coding unit to a lower depth. On the other hand, if the current depth of the current coding unit is not the depth, the encoding is performed on the coding unit of the lower depth, and thus the split information may be defined to split the current coding unit to obtain the coding units of the lower depth.

If the current depth is not the depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one largest coding unit, and split information is determined for a coding unit of a depth, at least one piece of split information may be determined for one largest coding unit. Also, a depth of the image data of the largest coding unit may be different according to locations since the image data is hierarchically split according to depths, and thus a depth and split information may be set for the image data.

Accordingly, the output unit 130 according to an embodiment may assign a corresponding depth and encoding information about an encoding mode to at least one of the coding unit, the prediction unit, and a minimum unit included in the largest coding unit.

The minimum unit according to an embodiment is a square data unit obtained by splitting the minimum coding unit constituting the lowermost depth by 4. Alternatively, the minimum unit according to an embodiment may be a maximum square data unit that may be included in all of the coding units, prediction units, partition units, and transformation units included in the largest coding unit.

For example, the encoding information output by the output unit 130 may be classified into encoding information according to deeper coding units, and encoding information according to prediction units. The encoding information according to the deeper coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit allowed with respect to a current video, and information about a minimum size of the transformation unit may also be output through a header of a bitstream, a sequence parameter set, or a picture parameter set. The output unit 130 may encode and output reference information related to prediction, prediction information, and slice type information.

In the video encoding apparatus 100 according to the simplest embodiment, the deeper coding unit may be a coding unit obtained by dividing a height or width of a coding unit of an upper depth, which is one layer above, by two. That is, when the size of the coding unit of the current depth is 2N×2N, the size of the coding unit of the lower depth is N×N. Also, a current coding unit having a size of 2N×2N may maximally include four lower-depth coding units each having a size of N×N.

Accordingly, the video encoding apparatus 100 may form the coding units having the tree structure by determining coding units having an optimum shape and an optimum size for each largest coding unit, based on the size of the largest coding unit and the maximum depth determined considering characteristics of the current picture. Also, since encoding may be performed on each largest coding unit by using any one of various prediction modes and transformations, an optimum encoding mode may be determined considering characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus 100 according to an embodiment, image compression efficiency may be increased since a coding unit is adjusted while considering characteristics of an image while increasing a maximum size of a coding unit while considering a size of the image.

The inter-layer video encoding apparatus 10 described above with reference to FIG. 1A may include as many video encoding apparatuses 100 as the number of layers, in order to encode single-layer images according to layers of a multilayer video. For example, the first layer encoder 12 may include one video encoding apparatus 100 and the second layer encoder 14 may include as many video encoding apparatuses 100 as the number of second layers.

When the video encoding apparatus 100 encodes first layer images, the coding unit determiner 120 may determine, for each largest coding unit, a prediction unit for inter-prediction according to coding units having a tree structure, and perform inter-prediction according to prediction units.

Even when the video encoding apparatus 100 encodes second layer images, the coding unit determiner 120 may determine, for each largest coding unit, coding units and prediction units having a tree structure, and perform inter-prediction according to prediction units.

The video encoding apparatus 100 may encode a luminance difference to compensate for a luminance difference between a first layer image and a second layer image. However, whether to perform luminance may be determined according to an encoding mode of a coding unit. For example, luminance compensation may be performed only on a prediction unit having a size of 2N×2N.

FIG. 9 is a block diagram of the video decoding apparatus based on coding units according to a tree structure 200, according to various embodiments.

The video decoding apparatus that involves video prediction based on coding units having a tree structure 200 according to an embodiment includes a receiver 210, an image data and encoding information extractor 220, and an image data decoder 230. For convenience of description, the video decoding apparatus that involves video prediction based on coding units having a tree structure 200 according to an embodiment will be abbreviated to the 'video decoding apparatus 200'.

Definitions of various terms, such as a coding unit, a depth, a prediction unit, a transformation unit, and various split information, for decoding operations of the video decoding apparatus 200 according to an embodiment are identical to those described with reference to FIG. 8 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each largest coding unit, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts a final depth and split information for the coding units having a tree structure according to each largest coding unit, from the parsed bitstream. The extracted final depth and split information are output to the image data decoder 230. That is, the image data in a bit stream is split into the largest coding unit so that the image data decoder 230 decodes the image data for each largest coding unit.

A depth and split information according to the largest coding unit may be set for at least one piece of depth information, and split information may include information about a partition mode of a corresponding coding unit, about a prediction mode, and about split of a transformation unit. Also, split information according to depths may be extracted as the information about a depth.

The depth and the split information according to each largest coding unit extracted by the image data and encoding information extractor 220 is a depth and split information determined to generate a minimum encoding error when an encoder, such as the video encoding apparatus 100 according to an embodiment, repeatedly performs encoding for each deeper coding unit according to depths according to each largest coding unit. Accordingly, the video decoding apparatus 200 may reconstruct an image by decoding the image data according to a coded depth and an encoding mode that generates the minimum encoding error.

Since encoding information about a depth and an encoding mode according to an embodiment may be assigned to a predetermined data unit from among a corresponding coding unit, a prediction unit, and a minimum unit, the image data and encoding information extractor 220 may extract the depth and the split information according to the predetermined data units. If the depth and the split information of a corresponding largest coding unit is recorded according to predetermined data units, the predetermined data units to which the same depth and the same split information is assigned may be inferred to be the data units included in the same largest coding unit.

The image data decoder 230 may reconstruct the current picture by decoding the image data in each largest coding unit based on the depth and the split information according to the largest coding units. That is, the image data decoder 230 may decode the encoded image data based on the extracted information about the partition mode, the prediction mode, and the transformation unit for each coding unit from among the coding units having the tree structure included in each largest coding unit. A decoding process may include a prediction including intra prediction and motion compensation, and an inverse transformation.

The image data decoder 230 may perform intra prediction or motion compensation according to a partition and a prediction mode of each coding unit, based on the information about the partition mode and the prediction mode of the prediction unit of the coding unit according to depths.

In addition, the image data decoder 230 may read information about a transformation unit according to a tree structure for each coding unit so as to perform inverse transformation based on transformation units for each coding unit, for inverse transformation for each largest coding unit. Via the inverse transformation, a pixel value of a spatial domain of the coding unit may be reconstructed.

The image data decoder 230 may determine a depth of a current largest coding unit by using split information according to depths. If the split information indicates that image data is no longer split in the current depth, the current depth is a depth. Accordingly, the image data decoder 230 may decode encoded data in the current largest coding unit by using the information about the partition mode of the prediction unit, the prediction mode, and the size of the transformation unit.

That is, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

The inter-layer video decoding apparatus 20 described above with reference to FIG. 2A may include the number of video decoding apparatuses 200 as much as the number of viewpoints, so as to reconstruct first layer images and second layer images by decoding a received first layer image stream and a received second layer image stream.

When the first layer image stream is received, the image data decoder 230 of the video decoding apparatus 200 may split samples of first layer images extracted from the first layer image stream by the image data and encoding information extractor 220 into coding units having a tree structure. The image data decoder 230 may reconstruct the first layer images by performing motion compensation according to prediction units for inter prediction, on the coding units having the tree structure obtained by splitting the samples of the first layer images.

When the second layer image stream is received, the image data decoder 230 of the video decoding apparatus 200 may split samples of second layer images extracted from the second layer image stream by the image data and encoding information extractor 220 into coding units having a tree structure. The image data decoder 230 may reconstruct the second layer images by performing motion compensation according to prediction units for inter prediction, on the coding units obtained by splitting the samples of the second layer images.

The extractor 220 may obtain information related to a luminance error from a bitstream so as to compensate for a luminance difference between a first layer image and a second layer image. However, whether to perform luminance may be determined according to an encoding mode of a coding unit. For example, luminance compensation may be performed only on a prediction unit having a size of 2N×2N.

Thus, the video decoding apparatus 200 may obtain information about at least one coding unit that generates the minimum encoding error when encoding is recursively performed for each largest coding unit, and may use the information to decode the current picture. In other words, the coding units having the tree structure determined to be the optimum coding units in each largest coding unit may be decoded.

Accordingly, even if image data has high resolution and a large amount of data, the image data may be efficiently decoded and reconstructed by using a size of a coding unit and an encoding mode, which are adaptively determined according to characteristics of the image data, by using optimum split information received from an encoder.

Figure 10:
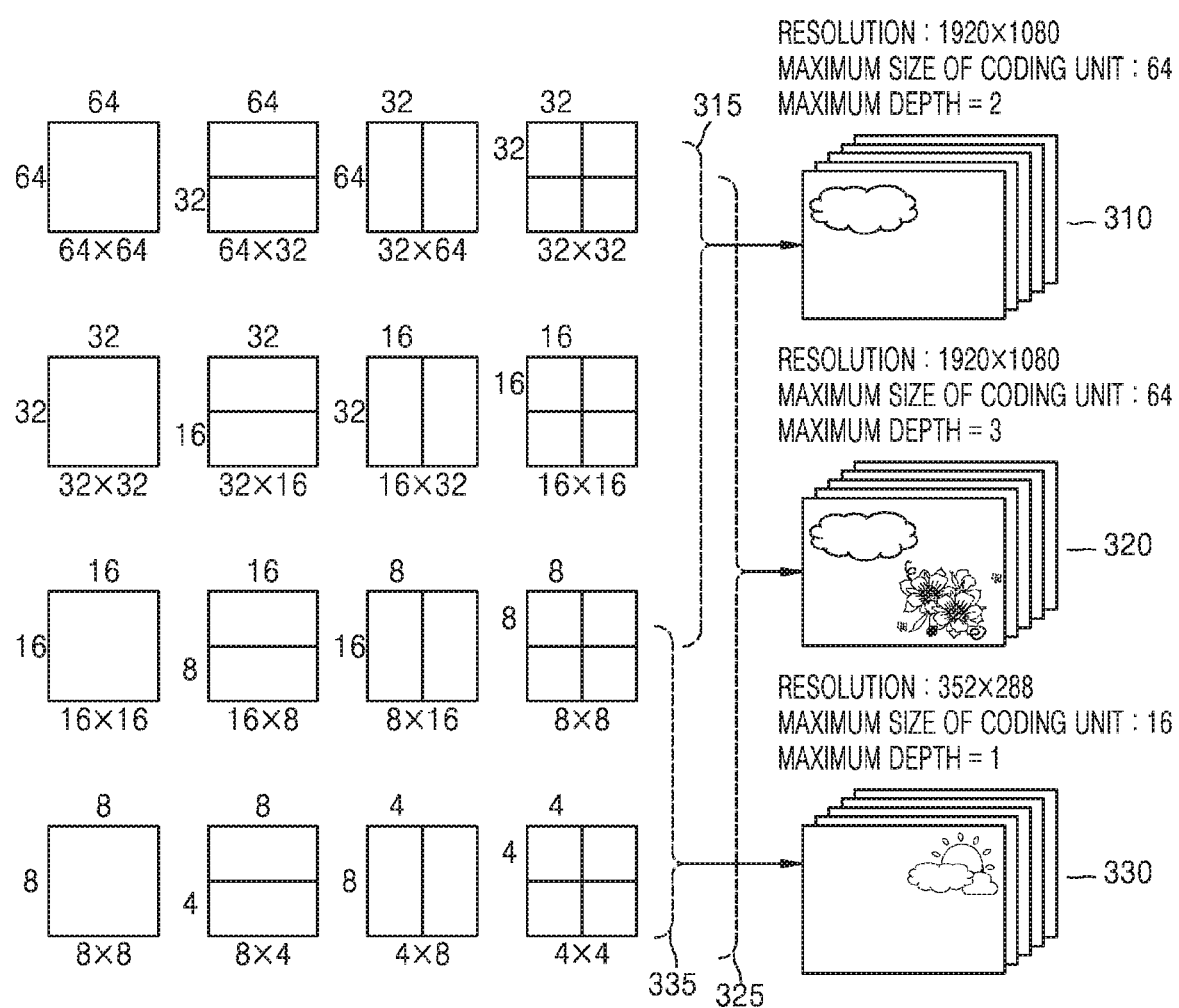
FIG. 10 is a diagram for describing a concept of coding units, according to an embodiment of the present disclosure.

FIG. 10 is a diagram for describing a concept of coding units, according to various embodiments.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 10 denotes a total number of splits from a largest coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a higher resolution than the video data 330 may be 64.

Since the maximum depth of the video data 310 is 2, coding units 315 of the vide data 310 may include a largest coding unit having a long axis size of 64, and coding units having long axis sizes of 32 and 16 since depths are deepened to two layers by splitting the largest coding unit twice. Since the maximum depth of the video data 330 is 1, coding units 335 of the video data 330 may include a largest coding unit having a long axis size of 16, and coding units having a long axis size of 8 since depths are deepened to one layer by splitting the largest coding unit once.

Since the maximum depth of the video data 320 is 3, coding units 325 of the video data 320 may include a largest coding unit having a long axis size of 64, and coding units having long axis sizes of 32, 16, and 8 since the depths are deepened to 3 layers by splitting the largest coding unit three times. As a depth deepens, detailed information may be precisely expressed.

Figure 11:
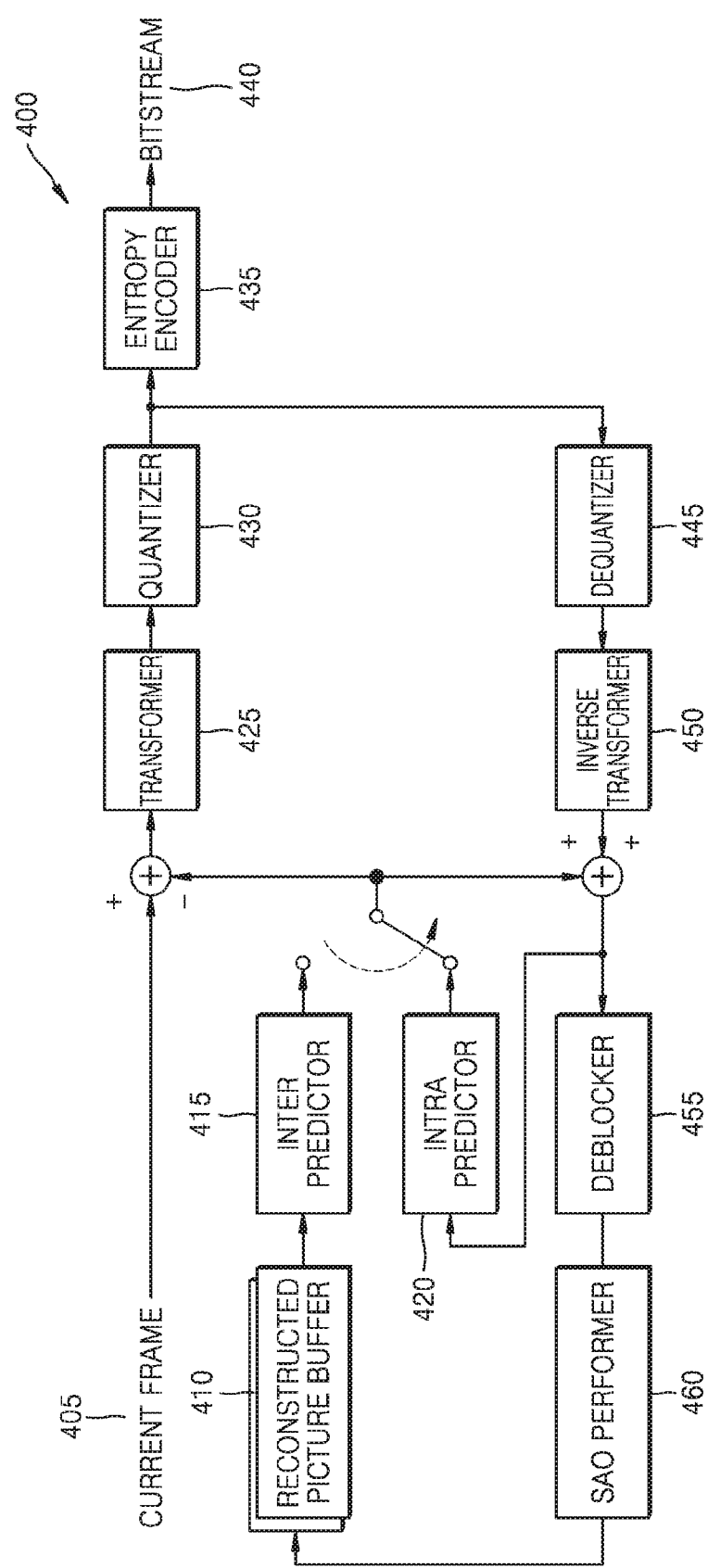
FIG. 11 is a block diagram of an image encoder based on coding units, according to an embodiment of the present disclosure.

FIG. 11 is a block diagram of an image encoder 400 based on coding units, according to various embodiments.

The image encoder 400 according to an embodiment performs operations of the coding unit determiner 120 of the video encoding apparatus 100 to encode image data. In other words, an intra predictor 420 performs intra prediction on coding units in an intra mode, from among a current frame 405, per prediction unit, and an inter predictor 415 performs inter prediction on coding units in an inter mode by using the current image 405 and a reference image obtained by a restored picture buffer 410, per prediction unit. The current picture 405 may be split into largest coding units, and then the largest coding units may be sequentially encoded. Here, the encoding may be performed on coding units split in a tree structure from the largest coding unit.

Residual data is generated by subtracting prediction data of a coding unit of each mode output from the intra predictor 420 or the inter predictor 415 from data of the current image 405 to be encoded, and the residual data is output as a quantized transformation coefficient through a transformer 425 and a quantizer 430 per transformation unit. The quantized transformation coefficient is restored to residual data in a spatial domain through an inverse quantizer 445 and an inverse transformer 450. The residual data in the spatial domain is added to the prediction data of the coding unit of each mode output from the intra predictor 420 or the inter predictor 415 to be restored as data in a spatial domain of the coding unit of the current image 405. The data in the spatial domain passes through a deblocker 455 and a sample adaptive offset (SAO) performer 460 and thus a restored image is generated. The restored image is stored in the restored picture buffer 410. Restored images stored in the restored picture buffer 410 may be used as a reference image for inter prediction of another image. The quantized transformation coefficient obtained through the transformer 425 and the quantizer 430 may be output as a bitstream 440 through an entropy encoder 435.

In order for the image encoder 400 according to an embodiment to be applied in the video encoding apparatus 100, components of the image encoder 400, i.e., the inter predictor 415, the intra predictor 420, the transformer 425, the quantizer 430, the entropy encoder 435, the inverse quantizer 445, the inverse transformer 450, the deblocking unit 455, and the SAO performer 460 perform operations based on each coding unit among coding units having a tree structure per largest coding unit.

In particular, the intra predictor 420 and the inter predictor 415 determine partitions and a prediction mode of each coding unit from among the coding units having a tree structure while considering the maximum size and the maximum depth of a current largest coding unit, and the transformer 425 may determine whether to split a transformation unit according to a quad-tree in each coding unit from among the coding units having the tree structure.

Figure 12:
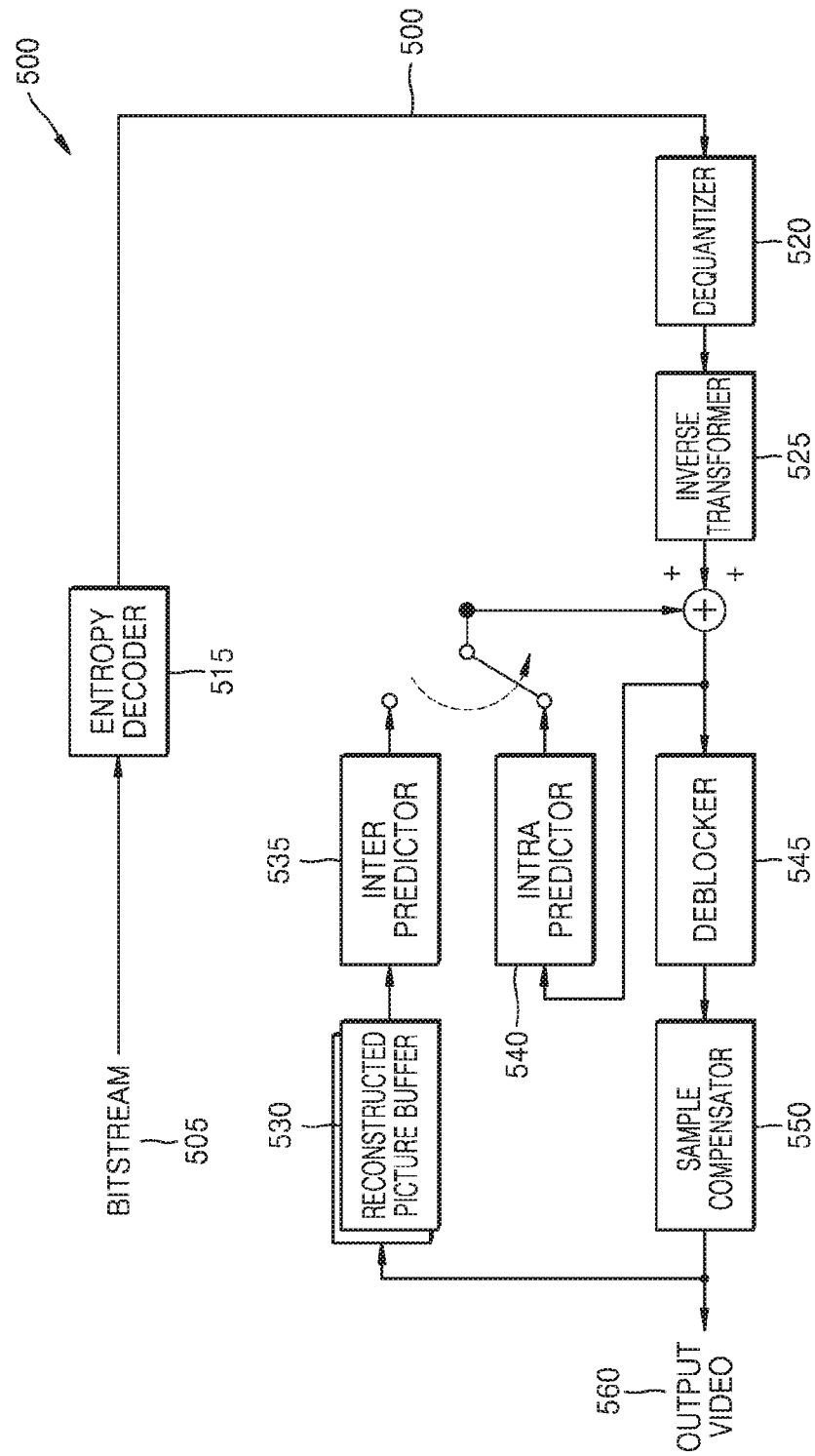
FIG. 12 is a block diagram of an image decoder based on coding units, according to an embodiment of the present disclosure.

FIG. 12 is a block diagram of an image decoder 500 based on coding units, according to various embodiments.

An entropy decoder 515 parses encoded image data that is to be decoded and encoding information required for decoding from a bitstream 505. The encoded image data is a quantized transformation coefficient, and an inverse quantizer 520 and an inverse transformer 525 restores residual data from the quantized transformation coefficient.

An intra predictor 540 performs intra prediction on a coding unit in an intra mode according to prediction units. An inter predictor performs inter prediction on a coding unit in an inter mode from a current image according to prediction units, by using a reference image obtained by a restored picture buffer 530.

Data in a spatial domain of coding units of the current image is restored by adding the residual data and the prediction data of a coding unit of each mode through the intra predictor and the inter predictor 535, and the data in the spatial domain may be output as a restored image through a deblocking unit 545 and an SAO performer 550. Also, restored images stored in the restored picture buffer 530 may be output as reference images.

In order to decode the image data in the image data decoder 230 of the video decoding apparatus 200, operations after the entropy decoder 515 of the image decoder 500 according to an embodiment may be performed.

In order for the image decoder 500 to be applied in the video decoding apparatus 200 according to an embodiment, components of the image decoder 500, i.e., the entropy decoder 515, the inverse quantizer 520, the inverse transformer 525, the intra predictor 540, the inter predictor 535, the deblocking unit 545, and the SAO performer 550 may perform operations based on coding units having a tree structure for each largest coding unit.

In particular, the intra predictor 540 and the inter predictor 535 determine a partition mode and a prediction mode according to each of coding units having a tree structure, and the inverse transformer 525 may determine whether to split a transformation unit according to a quad-tree structure per coding unit.

An encoding operation of FIG. 10 and a decoding operation of FIG. 11 are respectively a video stream encoding operation and a video stream decoding operation in a single layer. Accordingly, when the encoder 12 of FIG. 1A encodes a video stream of at least two layers, the video encoding apparatus 100 of FIG. 1A may include as many image encoder 400 as the number of layers. Similarly, when the decoder 24 of FIG. 2A decodes a video stream of at least two layers, the video decoding apparatus 200 of FIG. 2A may include as many image decoders 500 as the number of layers.

Figure 13:
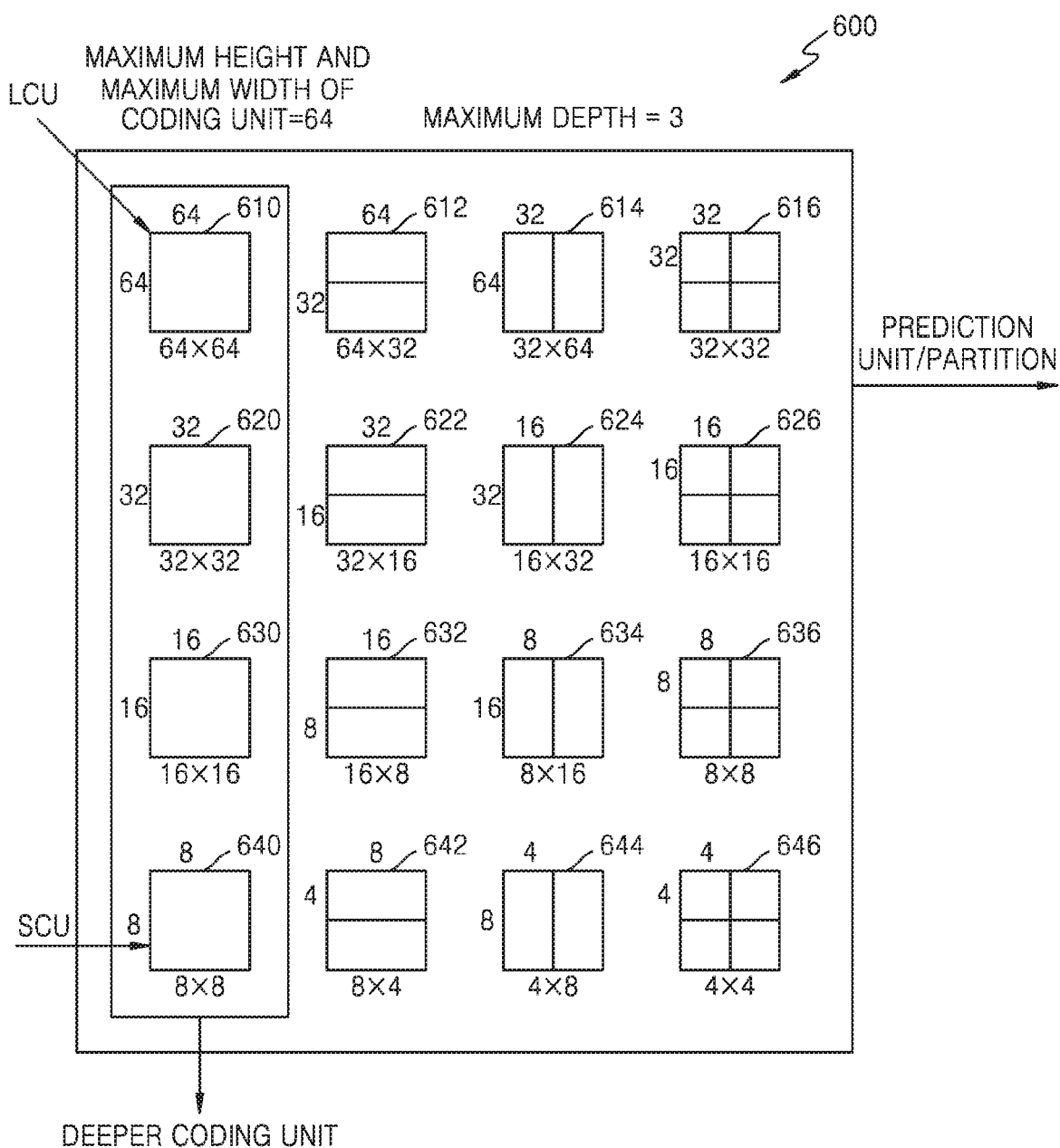
FIG. 13 is a diagram illustrating coding units and partitions, according to an embodiment of the present disclosure.

FIG. 13 is a diagram illustrating coding units and partitions, according to various embodiments.

The video encoding apparatus 100 according to an embodiment and the video decoding apparatus 200 according to an embodiment use hierarchical coding units so as to consider characteristics of an image. A maximum height, a maximum width, and a maximum depth of coding units may be adaptively determined according to the characteristics of the image, or may be variously set according to user requirements. Sizes of deeper coding units according to depths may be determined according to the predetermined maximum size of the coding unit.

In a hierarchical structure 600 of coding units according to an embodiment, the maximum height and the maximum width of the coding units are each 64, and the maximum depth is 3. In this case, the maximum depth refers to a total number of times the coding unit is split from the largest coding unit to the minimum coding unit. Since a depth deepens along a vertical axis of the hierarchical structure 600 of coding units according to an embodiment, a height and a width of the deeper coding unit are each split. Also, a prediction unit and partitions, which are bases for prediction encoding of each deeper coding unit, are shown along a horizontal axis of the hierarchical structure 600.

That is, a coding unit 610 is a largest coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3. The coding unit 640 having a size of 8×8 and a depth of 3 is a minimum coding unit.

The prediction unit and the partitions of a coding unit are arranged along the horizontal axis according to each depth. That is, if the coding unit 610 having a size of 64×64 and a depth of 0 is a prediction unit, the prediction unit may be split into partitions included in the encoding unit 610 having a size of 64×64, i.e. a partition 610 having a size of 64×64, partitions 612 having the size of 64×32, partitions 614 having the size of 32×64, or partitions 616 having the size of 32×32.

Equally, a prediction unit of the coding unit 620 having the size of 32×32 and the depth of 1 may be split into partitions included in the coding unit 620 having the size of 32×32, i.e. a partition 620 having a size of 32×32, partitions 622 having a size of 32×16, partitions 624 having a size of 16×32, and partitions 626 having a size of 16×16.

Equally, a prediction unit of the coding unit 630 having the size of 16×16 and the depth of 2 may be split into partitions included in the coding unit 630 having the size of 16×16, i.e. a partition having a size of 16×16 included in the coding unit 630, partitions 632 having a size of 16×8, partitions 634 having a size of 8×16, and partitions 636 having a size of 8×8.

Equally, a prediction unit of the coding unit 640 having the size of 8×8 and the depth of 3 may be split into partitions included in the coding unit 640 having the size of 8×8, i.e. a partition having a size of 8×8 included in the coding unit 640, partitions 642 having a size of 8×4, partitions 644 having a size of 4×8, and partitions 646 having a size of 4×4.

In order to determine the depth of the largest coding unit 610, the coding unit determiner 120 of the video encoding apparatus 100 according to an embodiment performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a minimum encoding error may be selected for the current depth by performing encoding for each prediction unit in the coding units corresponding to the current depth, along the horizontal axis of the hierarchical structure 600. Alternatively, the minimum encoding error may be searched for by comparing the minimum encoding errors according to depths, by performing encoding for each depth as the depth deepens along the vertical axis of the hierarchical structure 600. A depth and a partition having the minimum encoding error in the largest coding unit 610 may be selected as the depth and a partition mode of the largest coding unit 610.

Figure 14:
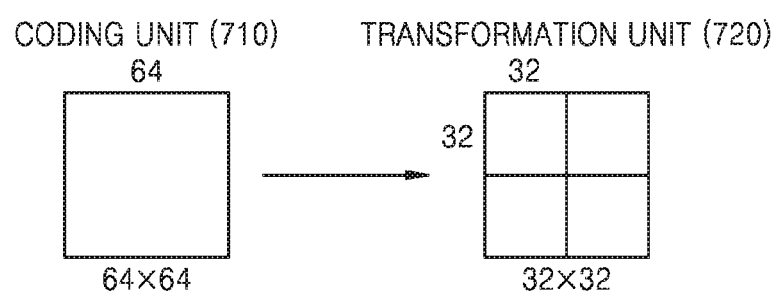
FIG. 14 is a diagram for describing a relationship between a coding unit and transformation units, according to an embodiment of the present disclosure.

FIG. 14 is a diagram for describing a relationship between a coding unit and transformation units, according to various embodiments.

The video encoding apparatus 100 according to an embodiment or the video decoding apparatus 200 according to an embodiment encodes or decodes an image according to coding units having sizes less than or equal to a largest coding unit for each largest coding unit. Sizes of transformation units for transformation during encoding may be selected based on data units that are not larger than a corresponding coding unit.

For example, in the video encoding apparatus 100 according to an embodiment or the video decoding apparatus 200 according to an embodiment, if a size of a coding unit 710 is 64×64, transformation may be performed by using a transformation unit 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

Figure 15:
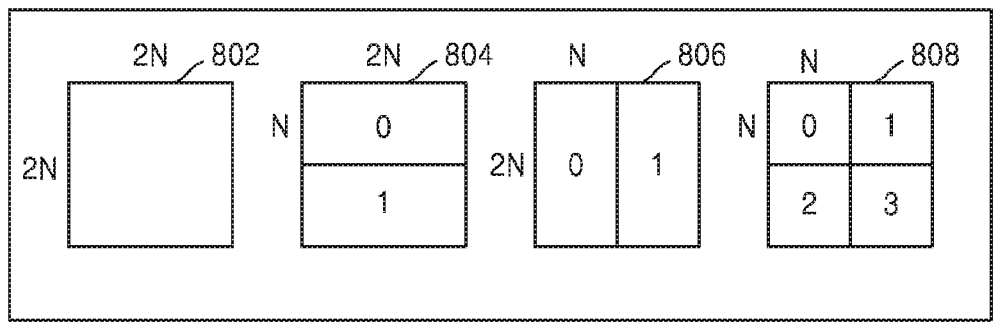
FIG. 15 is a diagram illustrating a plurality of pieces of encoding information, according to an embodiment of the present disclosure.
Figure 15:
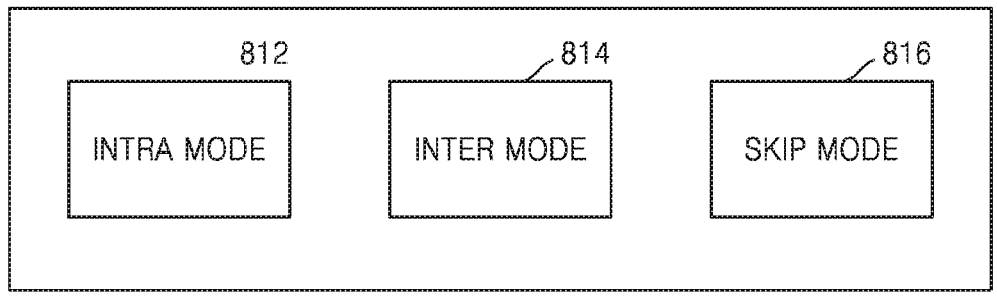
Figure 15:
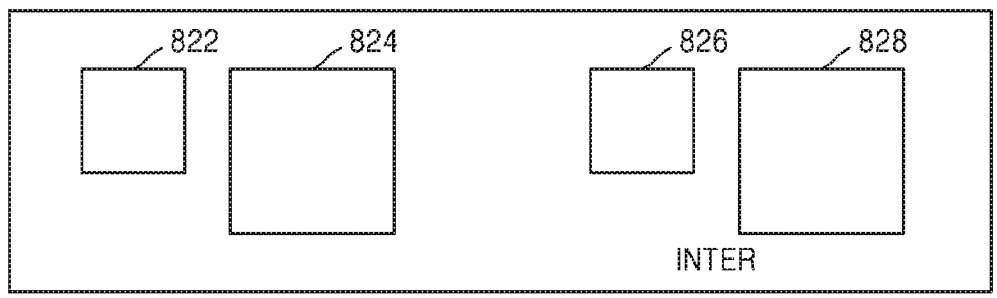

FIG. 15 illustrates a plurality of pieces of encoding information, according to various embodiments.

The output unit 130 of the video encoding apparatus 100 according to an embodiment may encode and transmit information 800 about a partition mode, information 810 about a prediction mode, and information 820 about a size of a transformation unit for each coding unit corresponding to a depth, as split information.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. In this case, the information 800 about a partition type of a current coding unit is set to indicate one of the partition 804 having a size of 2N×N, the partition 806 having a size of N×2N, and the partition 808 having a size of N×N.

The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 220 of the video decoding apparatus 200 according to an embodiment may extract and use the information 800, 810, and 820 for decoding, according to each deeper coding unit.

Figure 16:
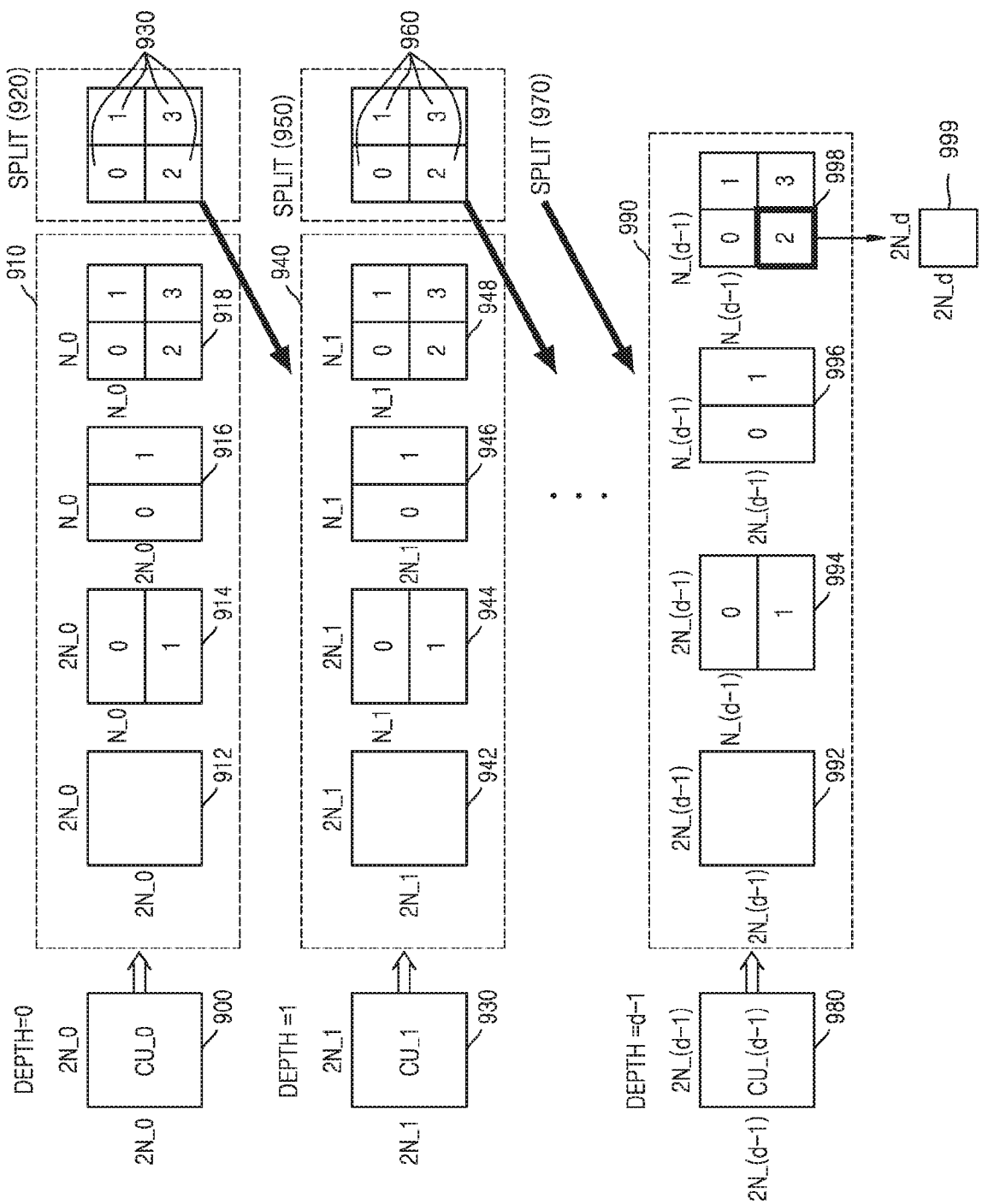
FIG. 16 is a diagram of coding units, according to an embodiment of the present disclosure.

FIG. 16 is a diagram of deeper coding units according to depths, according to various embodiments.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition mode 912 having a size of 2N_0×2N_0, a partition mode 914 having a size of 2N_0×N_0, a partition mode 916 having a size of N_0×2N_0, and a partition mode 918 having a size of N_0×N_0. FIG. 9 only illustrates the partitions 912 through 918 which are obtained by symmetrically splitting the prediction unit, but a partition mode is not limited thereto, and the partitions of the prediction unit may include asymmetrical partitions, partitions having an arbitrary shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition mode. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error in one of the partition modes 912, 914, and 916 is a minimum error, the prediction unit 910 may not be split into a lower depth.

If the encoding error in the partition mode 918 is a minimum error, a depth is changed from 0 to 1 to split the partition mode 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition mode 942 having a size of 2N_1×2N_1, a partition mode 944 having a size of 2N_1×N_1, a partition mode 946 having a size of N_1×2N_1, and a partition mode 948 having a size of N_1×N_1.

If the encoding error in the partition mode 948 is a least error, a depth is changed from 1 to 2 to split the partition mode 948 in operation 950, and encoding is repeatedly performed on coding units 960, which have a depth of 2 and a size of N_2×N_2 to search for a minimum encoding error.

When a maximum depth is d, deeper coding units according to depths may be set until when a depth corresponds to d−1, and split information may be set until when a depth corresponds to d−2. That is, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition mode 992 having a size of 2N_(d−1)×2N_(d−1), a partition mode 994 having a size of 2N_(d−1)×N_(d−1), a partition mode 996 having a size of N_(d−1)×2N_(d−1), and a partition mode 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition modes to search for a partition mode having a minimum encoding error.

Even when the partition mode 998 has the minimum encoding error, since a maximum depth is d, a coding unit CU_(d−1) having a depth of d−1 is no longer split to a lower depth, and a depth for the coding units constituting a current largest coding unit 900 is determined to be d−1 and a partition mode of the current largest coding unit 900 may be determined to be N_(d−1)×N_(d−1). Also, since the maximum depth is d, split information for a coding unit 952 having a depth of d−1 is not set.

A data unit 999 may be a 'minimum unit' for the current largest coding unit. A minimum unit according to an embodiment may be a square data unit obtained by splitting a minimum coding unit having a lowermost depth by 4. By performing the encoding repeatedly, the video encoding apparatus 100 according to an embodiment may select a depth having the minimum encoding error by comparing encoding errors according to depths of the coding unit 900 to determine a depth, and set a corresponding partition mode and a prediction mode as an encoding mode of the depth.

As such, the minimum encoding errors according to depths are compared in all of the depths of 0, 1, . . . , d−1, d, and a depth having the minimum encoding error may be determined as a depth. The depth, the partition mode of the prediction unit, and the prediction mode may be encoded and transmitted as split information. Also, since a coding unit is split from a depth of 0 to a depth, only split information of the depth is set to 0, and split information of depths excluding the depth is set to 1.

The image data and encoding information extractor 220 of the video decoding apparatus 200 according to an embodiment may extract and use the information about the depth and the prediction unit of the coding unit 900 to decode the partition 912. The video decoding apparatus 200 according to an embodiment may determine a depth, in which split information is 0, as a depth by using split information according to depths, and use split information of the corresponding depth for decoding.

depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. That is, partition modes in the coding units 1014, 1022, 1050, and 1054 have a size of 2N×N, partition modes in the coding units 1016, 1048, and 1052 have a size of N×2N, and a partition modes of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are data units different from those in the prediction units 1060 in terms of sizes and shapes. That is, the video encoding and decoding apparatuses 100 and 200 according to embodiments may perform intra prediction, motion estimation, motion compensation, transformation, and inverse transformation on an individual data unit in the same coding unit.

Accordingly, encoding is recursively performed on each of coding units having a hierarchical structure in each region of a largest coding unit to determine an optimum coding unit, and thus coding units having a recursive tree structure may be obtained. Encoding information may include split information about a coding unit, information about a partition mode, information about a prediction mode, and information about a size of a transformation unit. Table 1 shows the encoding information that may be set by the video encoding and decoding apparatuses 100 and 200 according to embodiments.

TABLE 1

Split Information 0
(Encoding on Coding Unit having Size of 2N × 2N and Current Depth of d)

| | Partition Mode | | Size of Transformation Unit | | |
| --- | --- | --- | --- | --- | --- |
| Prediction Mode | Symmetrical Partition Type | Asymmetrical Partition Type | Split Information 0 of Transformation Unit | Split Information 1 of Transformation Unit | Split Information 1 |
| Intra Inter Skip (Only 2N × 2N) | 2N × 2N 2N × N N × 2N N × N | 2N × nU 2N × nD nL × 2N nR × 2N | 2N × 2N | N × N (Symmetrical Partition Mode) N/2 × N/2 etc. (Asymmetrical Partition Mode) | Repeatedly Encode Coding Units having Lower Depth of d + 1 |

Figure 17:
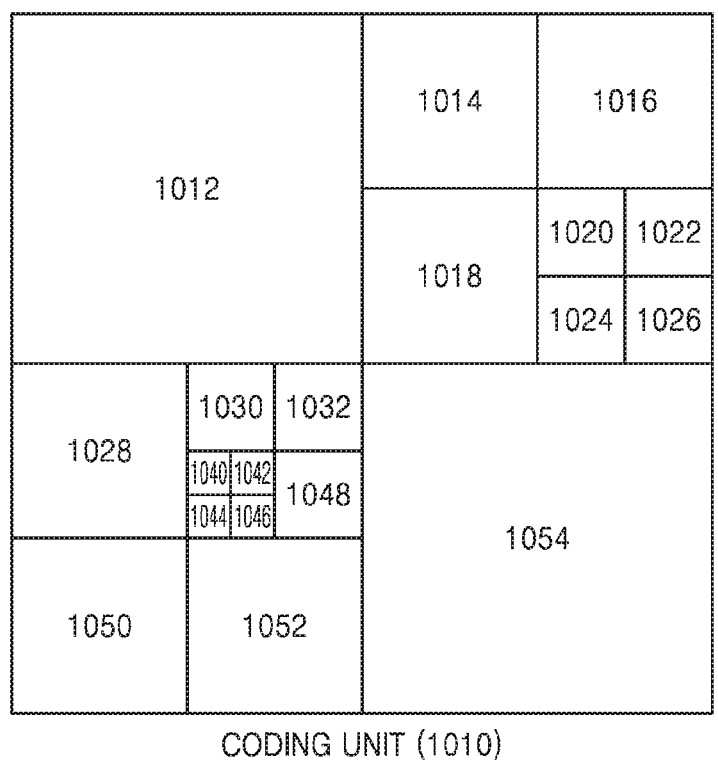
FIGS. 17, 18, and 19 are diagrams for describing a relationship between coding units, prediction units, and transformation units, according to an embodiment of the present disclosure.
Figure 18:
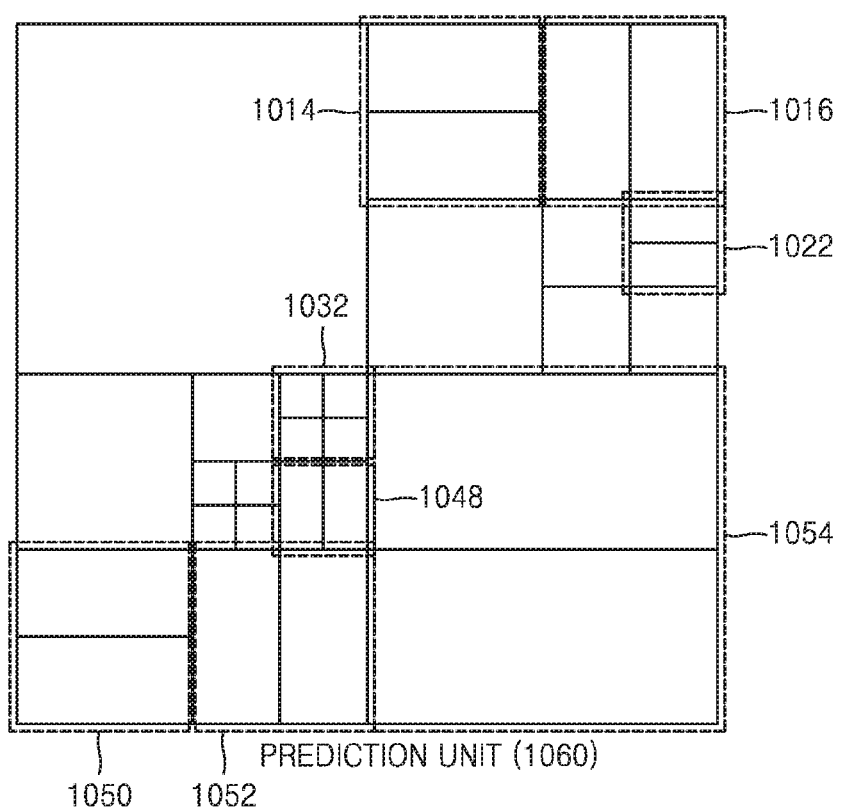
Figure 19:
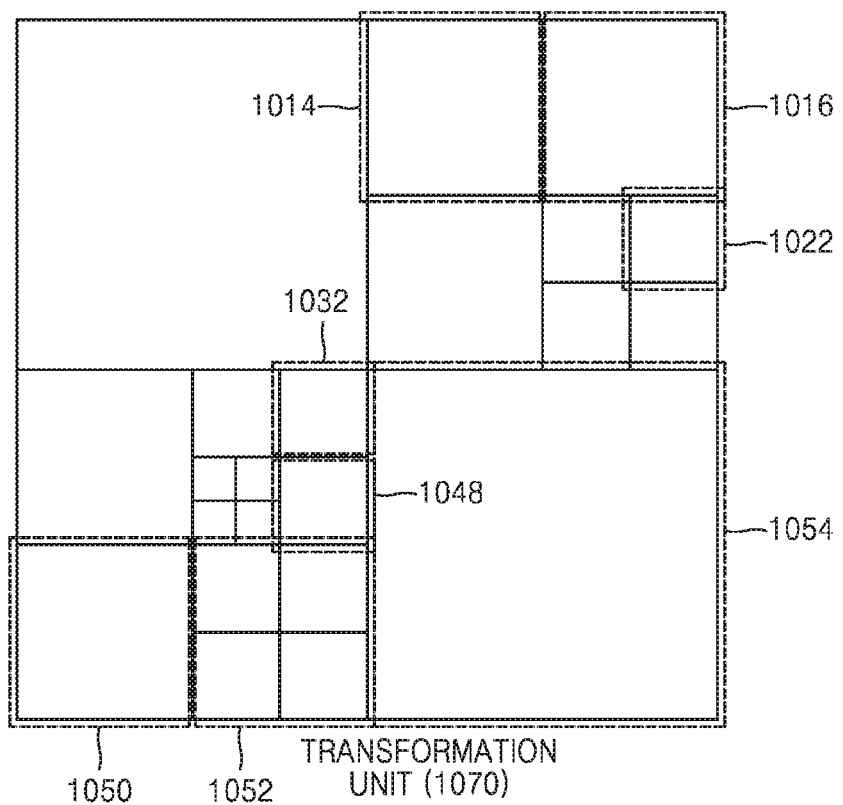

FIGS. 17, 18, and 19 are diagrams for describing a relationship between coding units, prediction units, and transformation units, according to various embodiments.

Coding units 1010 are coding units having a tree structure, according to depths determined by the video encoding apparatus 100 according to an embodiment, in a largest coding unit. Prediction units 1060 are partitions of prediction units of each of coding units according to depths, and transformation units 1070 are transformation units of each of coding units according to depths.

When a depth of a largest coding unit is 0 in the coding units 1010, depths of coding units 1012 and 1054 are 1, The output unit 130 of the video encoding apparatus 100 according to an embodiment may output the encoding information about the coding units having a tree structure, and the image data and encoding information extractor 220 of the video decoding apparatus 200 according to an embodiment may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a depth, and thus information about a partition mode, prediction mode, and a size of a transformation unit may be defined for the depth. If the current coding unit is further split according to the split information, encoding has to be independently performed on four split coding units of a lower depth.

A prediction mode may be one of an intra mode, an inter mode, and a skip mode. The intra mode and the inter mode may be defined in all partition modes, and the skip mode may be defined only in a partition mode having a size of 2N×2N.

The information about the partition mode may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1.

The size of the transformation unit may be set to be two types in the intra mode and two types in the inter mode. That is, if split information of the transformation unit is 0, the size of the transformation unit may be 2N×2N, which is the size of the current coding unit. If the split information of the transformation unit is 1, the transformation units may be obtained by splitting the current coding unit. Also, if a partition mode of the current coding unit having the size of 2N×2N is a symmetrical partition mode, a size of a transformation unit may be N×N, and if the partition type of the current coding unit is an asymmetrical partition mode, the size of the transformation unit may be N/2×N/2.

The encoding information about coding units having a tree structure according to an embodiment may be assigned to at least one of a coding unit corresponding to a depth, a prediction unit, and a minimum unit. The coding unit corresponding to the depth may include at least one of a prediction unit and a minimum unit that have the same encoding information.

Accordingly, it is determined whether adjacent data units are included in the same coding unit corresponding to the depth by comparing a plurality of pieces of encoding information of the adjacent data units. Also, a corresponding coding unit corresponding to a depth is determined by using encoding information of a data unit, and thus a distribution of depths in a largest coding unit may be determined.

Accordingly, if a current coding unit is predicted based on encoding information of adjacent data units, encoding information of data units in deeper coding units adjacent to the current coding unit may be directly referred to and used.

As another example, if a current coding unit is prediction-encoded by referring to adjacent coding units, a data unit that is adjacent to the current coding unit and is in adjacent deeper coding units is searched by using a plurality of pieces of encoding information of the adjacent coding units, in such a manner that the adjacent coding units may be referred to.

Figure 20:
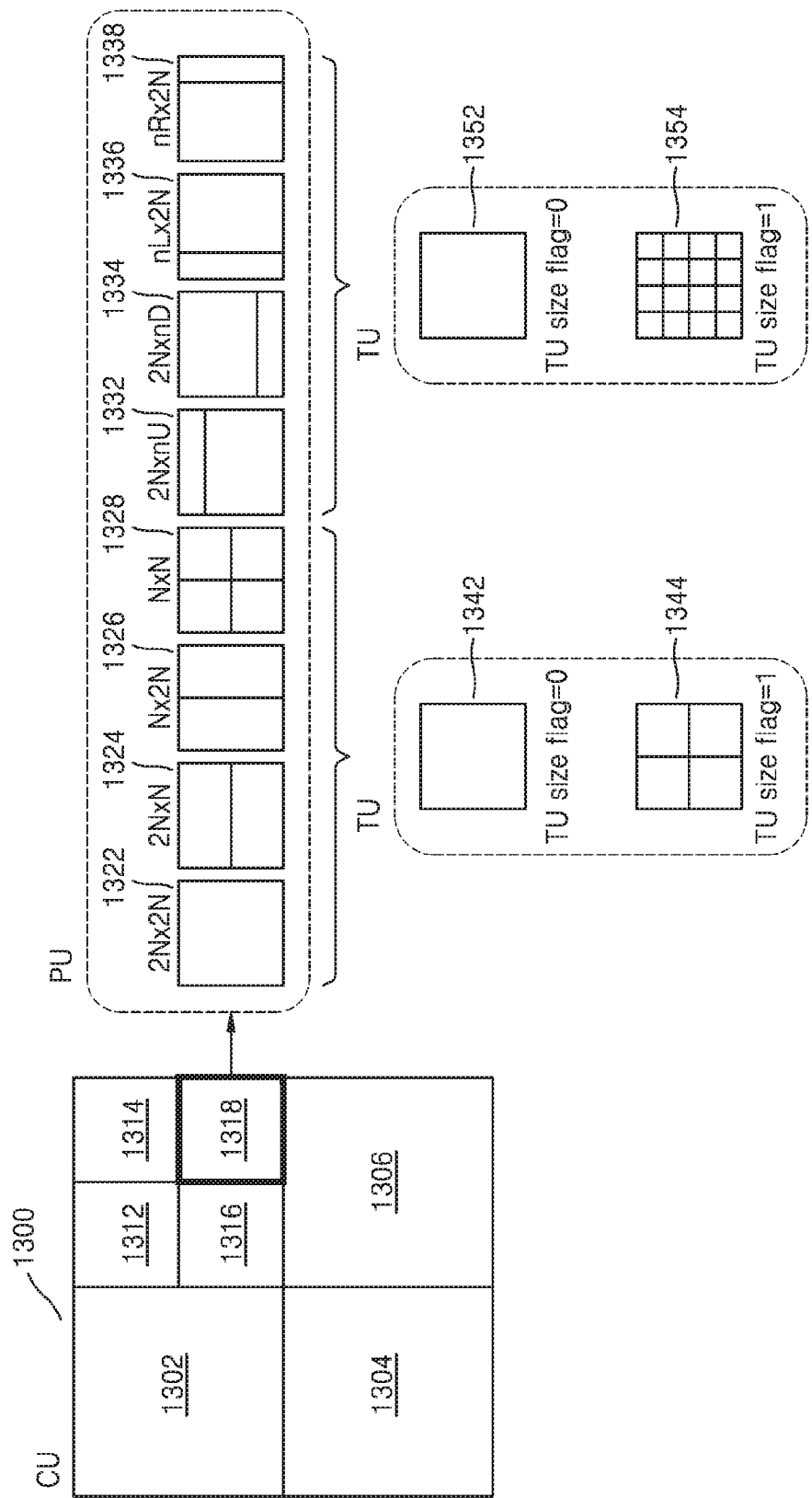
FIG. 20 is a diagram for describing a relationship between a coding unit, a prediction unit, and a transformation unit, according to encoding mode information of Table 1.

FIG. 20 is a diagram for describing a relationship between a coding unit, a prediction unit, and a transformation unit, according to encoding mode information of Table 1.

A largest coding unit 1300 includes coding units 1302, 1304, 1306, 1312, 1314, 1316, and 1318 of depths. Here, since the coding unit 1318 is a coding unit of a depth, split information may be set to 0. Information about a partition mode of the coding unit 1318 having a size of 2N×2N may be set to be one of a partition mode 1322 having a size of 2N×2N, a partition mode 1324 having a size of 2N×N, a partition mode 1326 having a size of N×2N, a partition mode 1328 having a size of N×N, a partition mode 1332 having a size of 2N×nU, a partition mode 1334 having a size of 2N×nD, a partition mode 1336 having a size of nL×2N, and a partition mode 1338 having a size of nR×2N.

Split information (TU size flag) of a transformation unit is a type of a transformation index. A size of the transformation unit corresponding to the transformation index may be changed according to a prediction unit type or a partition mode of the coding unit.

For example, when information about the partition mode is set to be symmetrical, i.e. the partition mode 1322 having a size of 2N×2N, the partition mode 1324 having a size of 2N×N, the partition mode 1326 having a size of N×2N, or the partition mode 1328 having a size of N×N, a transformation unit 1342 having a size of 2N×2N may be set if the TU size flag of the transformation unit is 0, and a transformation unit 1344 having a size of N×N may be set if the TU size flag is 1.

When the information about the partition mode is set to be asymmetrical, i.e., the partition mode 1332 having a size of 2N×nU, the partition mode 1334 having a size of 2N×nD, the partition mode 1336 having a size of nL×2N, or the partition mode 1338 having a size of nR×2N, a transformation unit 1352 having a size of 2N×2N may be set if the TU size flag is 0, and a transformation unit 1354 having a size of N/2×N/2 may be set if the TU size flag is 1.

Referring to FIG. 19, the TU size flag is a flag having a value or 0 or 1, but the TU size flag according to an embodiment is not limited to a flag of 1 bit, and the transformation unit may be hierarchically split while the TU size flag increases from 0. The TU size flag may be an example of the transformation index.

In this case, the size of the transformation unit that has been actually used may be expressed by using the TU size flag according to an embodiment together with a maximum size of the transformation unit and a minimum size of the transformation unit. The video encoding apparatus 100 according to an embodiment may encode maximum transformation unit size information, minimum transformation unit size information, and maximum TU size flag information. The result of encoding the maximum transformation unit size information, the minimum transformation unit size information, and the maximum TU size flag information may be inserted into an SPS. The video decoding apparatus 200 according to an embodiment may decode video by using the maximum transformation unit size information, the minimum transformation unit size information, and the maximum TU size flag information.

For example, (a) if a size of a current coding unit is 64×64 and a maximum transformation unit size is 32×32, (a-1) then a size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and the maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$CurrMinTuSize=\max(MinTransformSize, RootTuSize/(2^{\wedge}MaxTransformSizeIndex)) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

The maximum transformation unit size RootTuSize according to an embodiment may vary according to a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$RootTuSize=\min(MaxTransformSize, PUSize) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize=\min(MaxTransformSize, PartitionSize) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and the present disclosure is not limited thereto.

According to the video encoding method based on coding units having a tree structure as described with reference to FIGS. 8 through 20, image data of a spatial domain is encoded for each coding unit of a tree structure. According to the video decoding method based on coding units having a tree structure, decoding is performed for each largest coding unit to reconstruct image data of a spatial domain. Thus, a picture and a video that is a picture sequence may be reconstructed. The reconstructed video may be reproduced by a reproducing apparatus, may be stored in a storage medium, or may be transmitted through a network.

The embodiments according to the present disclosure may be written as computer programs and may be implemented in general-use digital computers that execute the programs using a computer-readable recording medium. Examples of the computer-readable recording medium include magnetic storage media (e.g., ROM, floppy discs, hard discs, etc.) and optical recording media (e.g., CD-ROMs, or DVDs).

For convenience of description, the inter-layer video encoding method and/or the video encoding method described above with reference to FIGS. 1A through 20 will be collectively referred to as a 'video encoding method of the present disclosure'. In addition, the inter-layer video decoding method and/or the video decoding method described above with reference to FIGS. 1A through 20 will be referred to as a 'video decoding method of the present disclosure'.

Also, a video encoding apparatus including the inter-layer video encoding apparatus 10, the video encoding apparatus 100, or the image encoder 400, which has been described with reference to FIGS. 1A through 20, will be referred to as a 'video encoding apparatus of the present disclosure'. In addition, a video decoding apparatus including the inter-layer video decoding apparatus 20, the video decoding apparatus 200, or the image decoder 500, which has been described with reference to FIGS. 1A through 20, will be referred to as a 'video decoding apparatus of the present disclosure'.

The computer-readable recording medium such as a disc 26000 that stores the programs according to an embodiment will now be described in detail.

Figure 21:
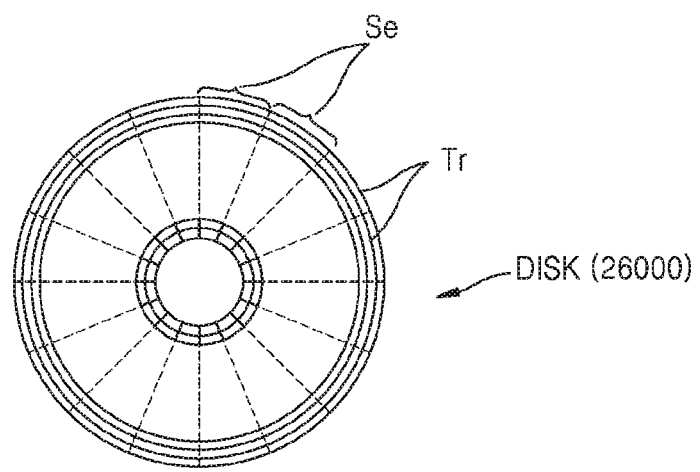
FIG. 21 is a diagram of a physical structure of a disc in which a program is stored, according to an embodiment.

FIG. 21 is a diagram of a physical structure of the disc 26000 in which a program is stored, according to various embodiments. The disc 26000, which is a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000 according to an embodiment, a program that executes the quantization parameter determining method, the video encoding method, and the video decoding method described above may be assigned and stored.

A computer system embodied using the storage medium that stores the program for executing the video encoding method and the video decoding method as described above will now be described with reference to FIG. 22.

Figure 22:
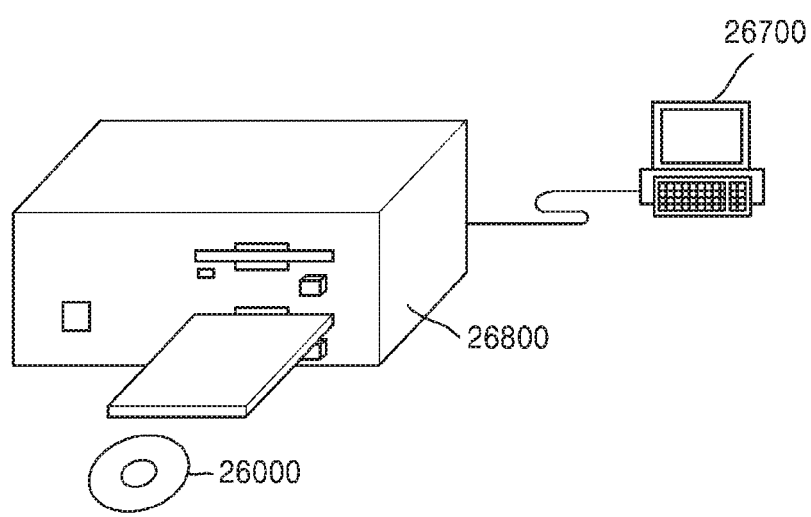
FIG. 22 is a diagram of a disc drive for recording and reading a program by using the disc.

FIG. 22 is a diagram of a disc drive 26800 for recording and reading a program by using the disc 26000. A computer system 27000 may store a program that executes at least one of a video encoding method and a video decoding method of the present disclosure, in the disc 26000 via the disc drive 26800. In order to run the program stored in the disc 26000 in the computer system 27000, the program may be read from the disc 26000 and be transmitted to the computer system 26700 by using the disc drive 27000.

The program that executes at least one of a video encoding method and a video decoding method of the present disclosure may be stored not only in the disc 26000 illustrated in FIGS. 21 and 22 but also in a memory card, a ROM cassette, or a solid state drive (SSD).

A system to which the video encoding method and the video decoding method according to the embodiments described above are applied will be described below.

Figure 23:
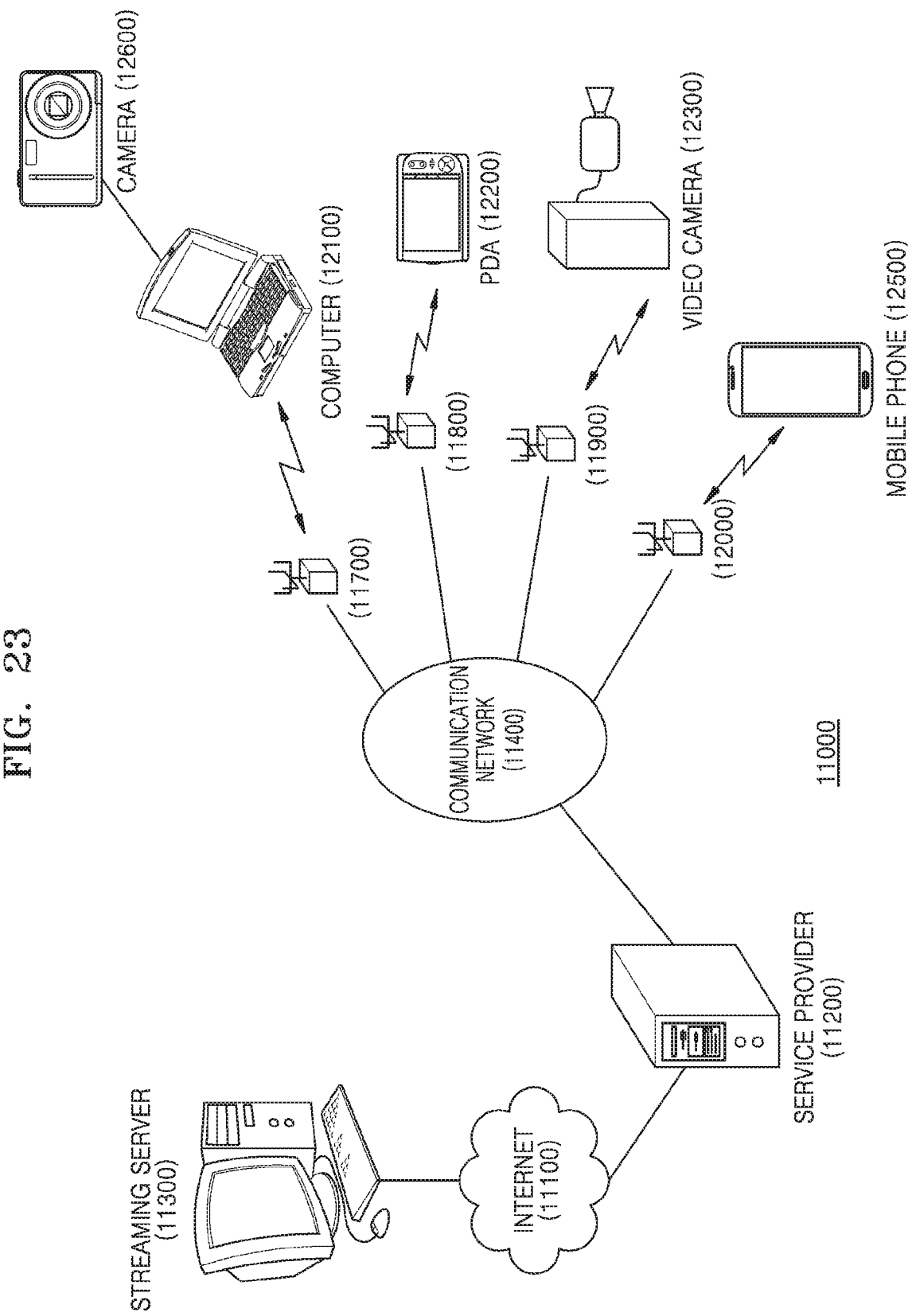
FIG. 23 is a diagram of an overall structure of a content supply system for providing a content distribution service.

FIG. 23 is a diagram of an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

Figure 24:
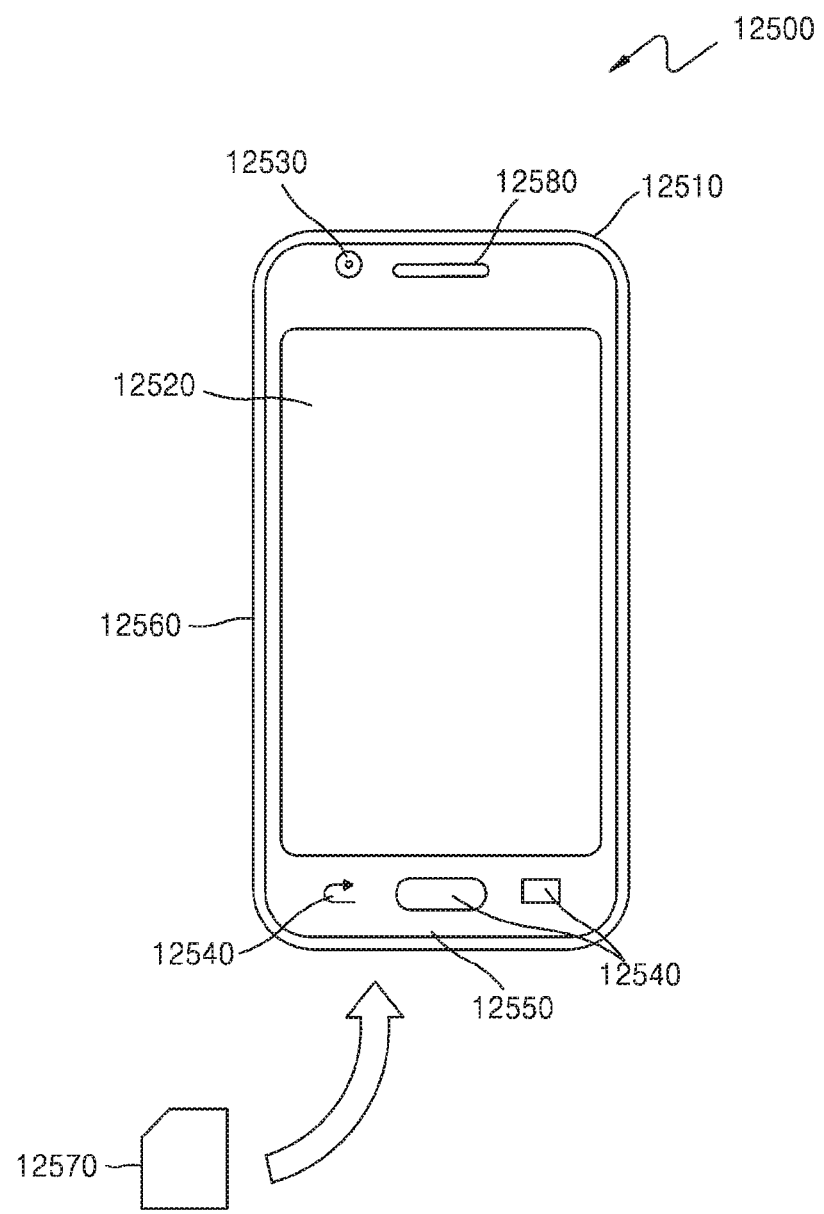
FIGS. 24 and 25 are diagrams respectively of an external structure and an internal structure of a mobile phone to which the video encoding method and video decoding method of the present disclosure are applied, according to an embodiment.

However, the content supply system 11000 is not limited to as illustrated in FIG. 24, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded by the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessible by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

In the content supply system 11000 according to an embodiment, content data, e.g., content recorded during a concert, which has been recorded by a user using the video camera 12300, the camera 12600, the mobile phone 12500, or another imaging device is encoded and is transmitted to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real-time, thereby enabling personal broadcasting.

The video encoding apparatus and the video decoding apparatus of the present disclosure may be applied to encoding and decoding operations of the plurality of independent devices included in the content supply system 11000.

Figure 25:
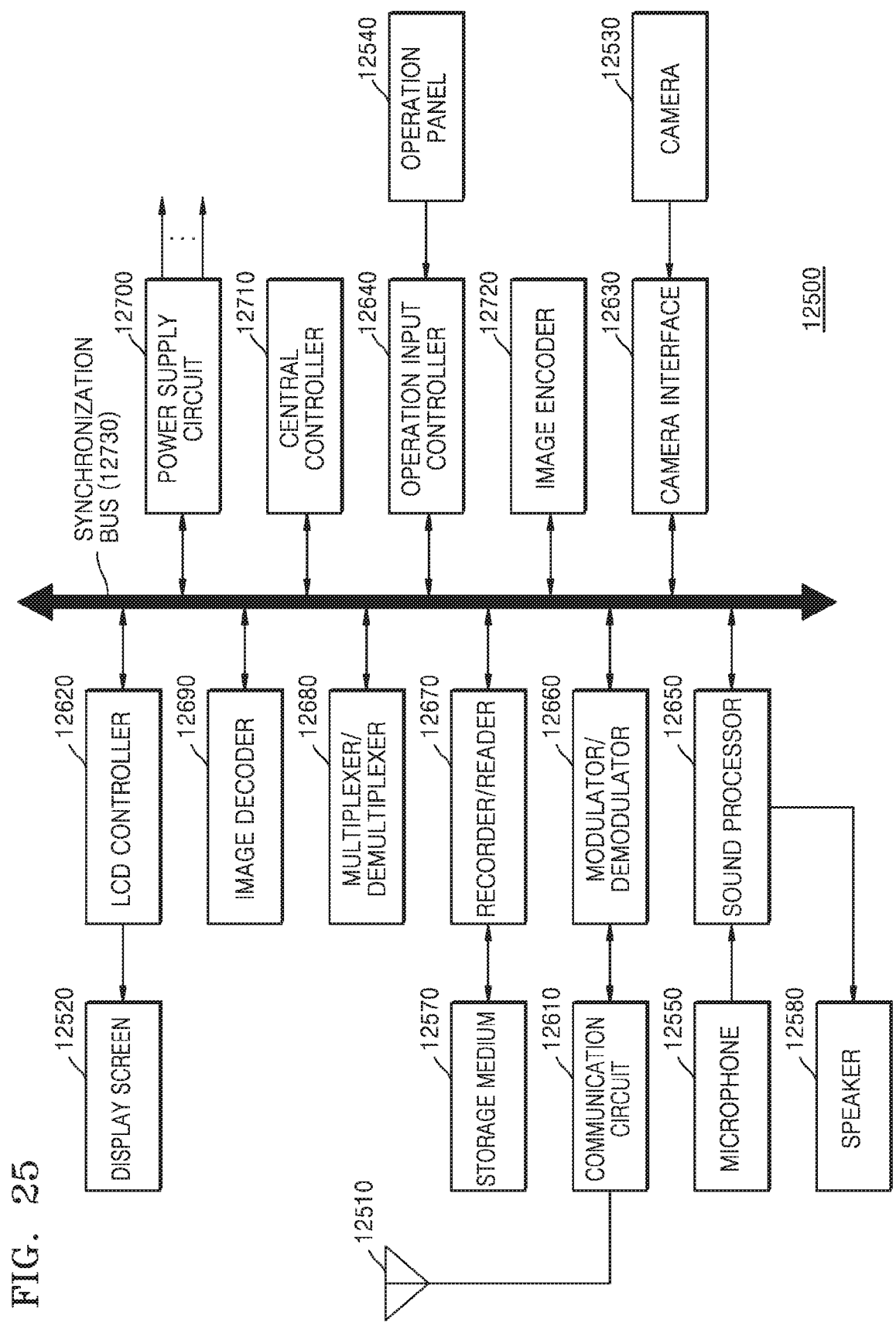

With reference to FIGS. 24 and 25, an embodiment of the mobile phone 12500 included in the content supply system 11000 will now be described in detail.

FIG. 24 illustrates an external structure of the mobile phone 12500 to which the video encoding method and the video decoding method of the present disclosure are applied, according to various embodiments. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000 of FIG. 21, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of sound output unit, and a microphone 12550 for inputting voice and sound or another type sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

FIG. 25 illustrates an internal structure of the mobile phone 12500. In order to systemically control parts of the mobile phone 12500 including the display screen 12520 and the operation panel 12540, a power supply circuit 12700, an operation input controller 12640, an image encoding unit 12720, a camera interface 12630, an LCD controller 12620, an image decoding unit 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button and sets from a 'power off' state to a 'power on' state, the power supply circuit 12700 supplies power to all the parts of the mobile phone 12500 from a battery pack, thereby setting the mobile phone 12500 in an operation mode.

The central controller 12710 includes a central processing unit (CPU), a ROM, and a RAM.

While the mobile phone 12500 transmits communication data to the outside, a digital signal is generated by the mobile phone 12500 under control of the central controller 12710. For example, the sound processor 12650 may generate a digital sound signal, the image encoding unit 12720 may generate a digital image signal, and text data of a message may be generated via the operation panel 12540 and the operation input controller 12640. When a digital signal is transmitted to the modulation/demodulation unit 12660 under control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is converted into a digital sound signal by the sound processor 12650, under control of the central controller 12710. The digital sound signal may be converted into a transmission signal via the modulation/demodulation unit 12660 and the communication circuit 12610, and may be transmitted via the antenna 12510.

When a text message, e.g., email, is transmitted in a data communication mode, text data of the text message is input via the operation panel 12540 and is transmitted to the central controller 12610 via the operation input controller 12640. Under control of the central controller 12610, the text data is transformed into a transmission signal via the modulation/demodulation unit 12660 and the communication circuit 12610 and is transmitted to the wireless base station 12000 via the antenna 12510.

In order to transmit image data in the data communication mode, image data captured by the camera 12530 is provided to the image encoding unit 12720 via the camera interface 12630. The captured image data may be directly displayed on the display screen 12520 via the camera interface 12630 and the LCD controller 12620.

A structure of the image encoding unit 12720 may correspond to that of the video encoding apparatus 100 described above. The image encoding unit 12720 may transform the image data received from the camera 12530 into compressed and encoded image data according to the video encoding method described above, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoding unit 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from an outer source, frequency recovery and analog-to-digital conversion (ADC) are performed on a signal received via the antenna 12510 to transform the signal into a digital signal. The modulation/demodulation unit 12660 modulates a frequency band of the digital signal. The frequency-band modulated digital signal is transmitted to the video decoding unit 12690, the sound processor 12650, or the LCD controller 12620, according to the type of the digital signal.

In the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulation/demodulation unit 12660 and the sound processor 12650, and the analog sound signal is output via the speaker 12580, under control of the central controller 12710.

When in the data communication mode, data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

In order to decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoding unit 12690 and the sound processor 12650, respectively.

A structure of the image decoding unit 12690 may correspond to that of the video decoding apparatus 200 described above. The image decoding unit 12690 may decode the encoded video data to obtain reconstructed video data and provide the reconstructed video data to the display screen 12520 via the LCD controller 12620, according to a video decoding method employed by the video decoding apparatus 200 or the image decoder 500 described above.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both a video encoding apparatus and a video decoding apparatus of the present disclosure, may be a transceiving terminal including only the video encoding apparatus, or may be a transceiving terminal including only the video decoding apparatus.

Figure 26:
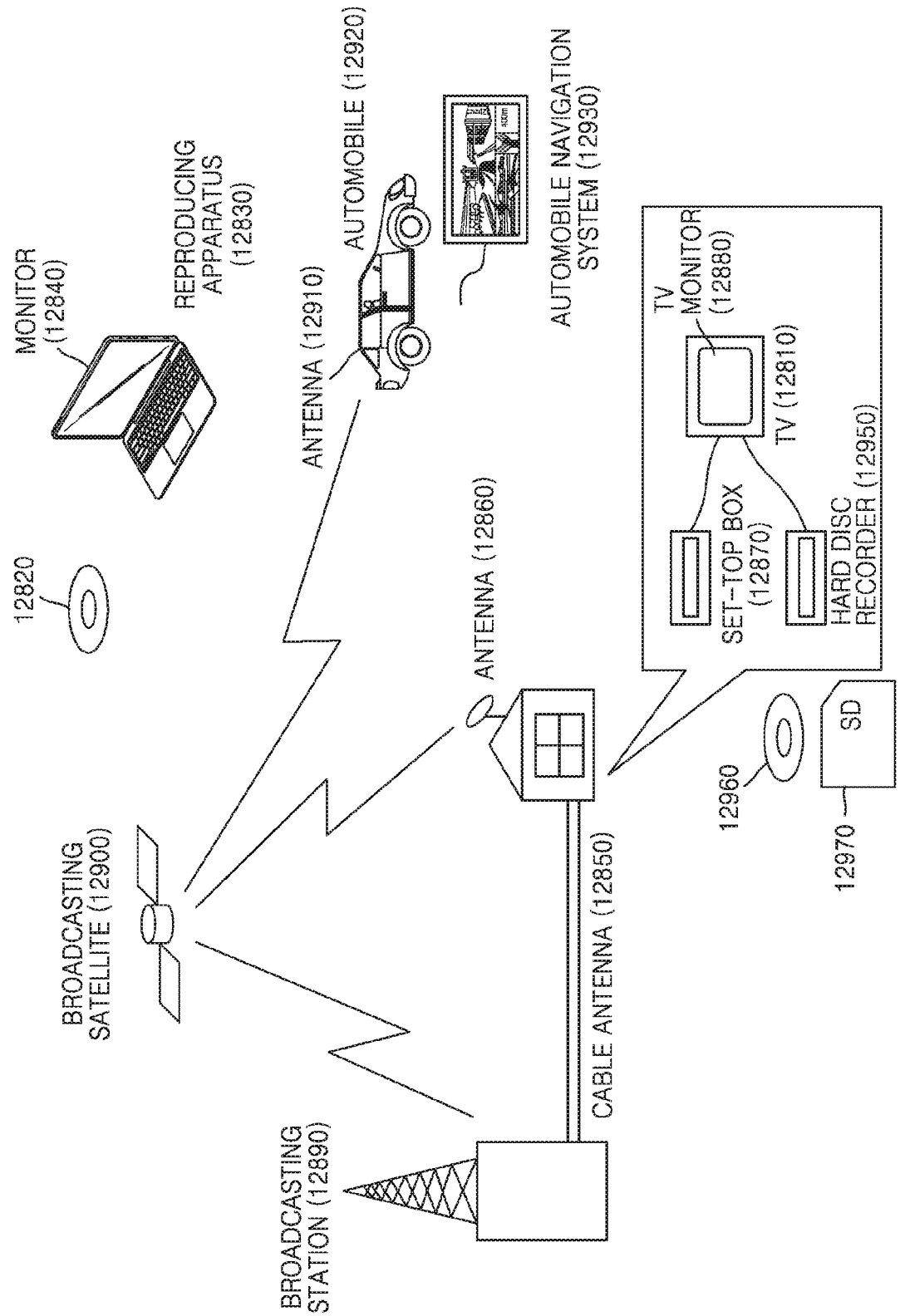
FIG. 26 is a diagram of a digital broadcast system to which a communication system according to the present disclosure is applied.

A communication system according to the present disclosure is not limited to the communication system described above with reference to FIG. 24. For example, FIG. 26 illustrates a digital broadcasting system employing a communication system, according to various embodiments. The digital broadcasting system of FIG. 26 according to an embodiment may receive a digital broadcast transmitted via a satellite or a terrestrial network by using the video encoding apparatus and the video decoding apparatus of the present disclosure.

In more detail, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When the video decoding apparatus of the present disclosure is implemented in a reproducing apparatus 12830, the reproducing apparatus 12830 may parse and decode an encoded video stream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, a video decoding apparatus of the present disclosure may be installed. Data output from the set-top box 12870 may also be reproduced on a TV monitor 12880.

As another example, a video decoding apparatus of the present disclosure may be installed in the TV receiver 12810 instead of the set-top box 12870.

An automobile 12920 that has an appropriate antenna 12910 may receive a signal transmitted from the satellite 12900 or the wireless base station 11700 of FIG. 23. A decoded video may be reproduced on a display screen of an automobile navigation system 12930 installed in the automobile 12920.

A video signal may be encoded by a video encoding apparatus of the present disclosure and may then be recorded to and stored in a storage medium. Specifically, an image signal may be stored in a DVD disc 12960 by a DVD recorder or may be stored in a hard disc by a hard disc recorder 12950. As another example, the video signal may be stored in an SD card 12970. If the hard disc recorder 12950 includes a video decoding apparatus of the present disclosure according to an embodiment, a video signal recorded on the DVD disc 12960, the SD card 12970, or another storage medium may be reproduced on the TV monitor 12880.

The automobile navigation system 12930 may not include the camera 12530, the camera interface 12630, and the image encoding unit 12720 of FIG. 26. For example, the computer 12100 and the TV receiver 12810 may not include the camera 12530, the camera interface 12630, and the image encoding unit 12720 of FIG. 26.

Figure 27:
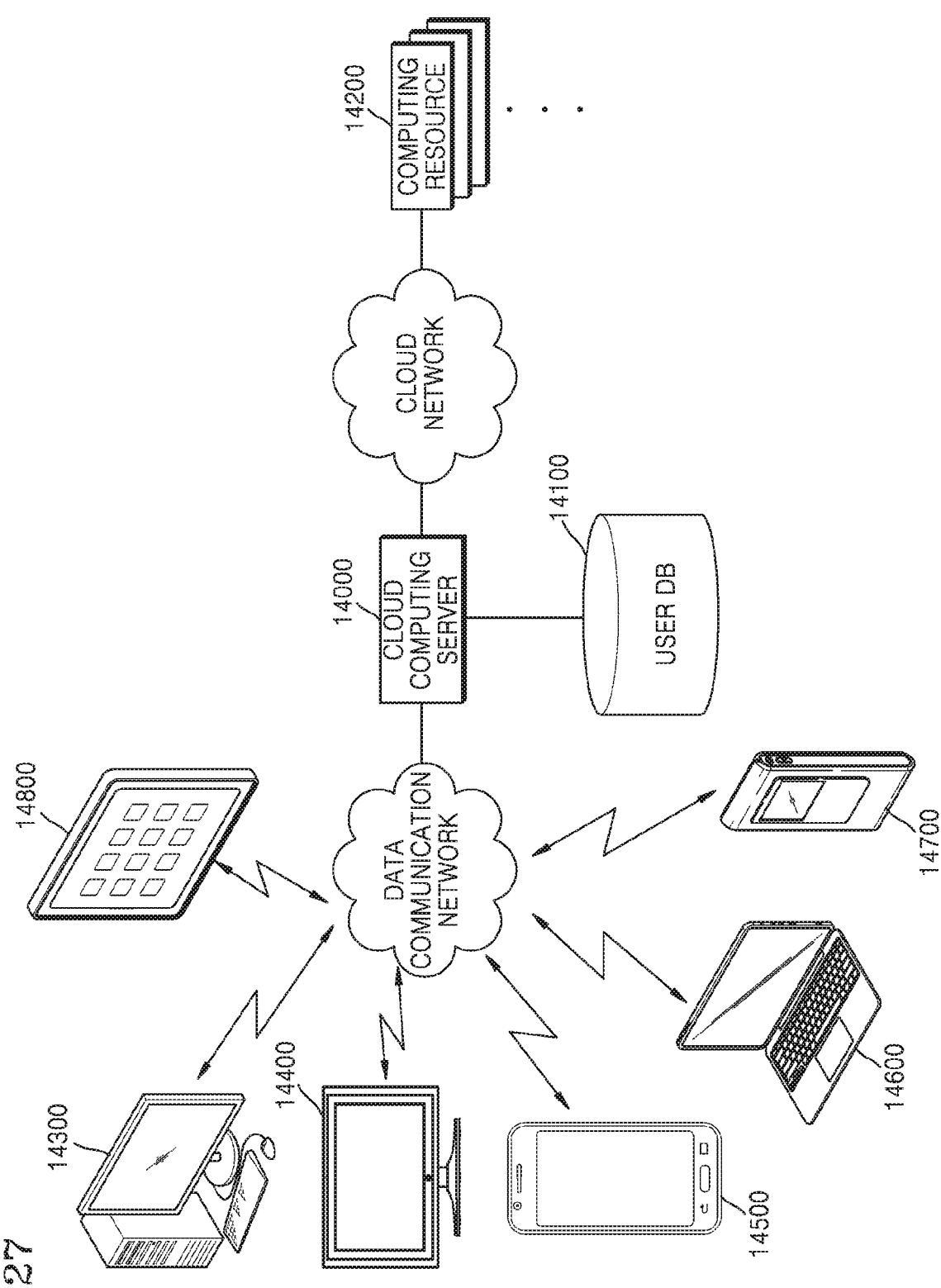
FIG. 27 is a diagram illustrating a network structure of a cloud computing system that uses the video encoding apparatus and video decoding apparatus according to the present disclosure of the present disclosure.

FIG. 27 is a diagram illustrating a network structure of a cloud computing system using a video encoding apparatus and a video decoding apparatus, according to various embodiments.

The cloud computing system of the present disclosure may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14000 may combine the plurality of computing resources 14200 distributed in a cloud network and provide user terminals with a result of combining. The plurality of computing resources 14200 may include various data services, and may include data uploaded from user terminals. As described above, the cloud computing server 14000 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce this video service is received from the smart phone 14500, the cloud computing server 14000 searches for and reproduces this video service, based on the user DB 14100. When the smart phone 14500 receives a video data stream from the cloud computing server 14000, a process of reproducing video by decoding the video data stream is similar to an operation of the mobile phone 12500 described above with reference to FIG. 24.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

In this case, the user terminal may include a video decoding apparatus of the present disclosure as described above with reference to FIGS. 1A through 20. As another example, the user terminal may include a video encoding apparatus of the present disclosure as described above with reference to FIGS. 1A through 20. Alternatively, the user terminal may include both the video decoding apparatus and the video encoding apparatus of the present disclosure as described above with reference to FIGS. 1A through 20.

Various applications of a video encoding method, a video decoding method, a video encoding apparatus, and a video decoding apparatus according to various embodiments described above with reference to FIGS. 1A through 20 have been described above with reference to FIGS. 21 through 27. However, methods of storing the video encoding method and the video decoding method in a storage medium or methods of implementing the video encoding apparatus and the video decoding apparatus in a device, according to various embodiments, are not limited to the embodiments described above with reference to FIGS. 21 through 27.

It will be understood by one of ordinary skill in the art that various changes in form and details may be made therein without departing from the spirit and scope of the disclosure as defined by the appended claims. The embodiments should be considered in a descriptive sense only and not for purposes of limitation. Therefore, the scope of the disclosure is defined not by the detailed description of the disclosure but by the appended claims, and all differences within the scope will be construed as being included in the present disclosure.

The invention claimed is:

1. An inter-layer video decoding method comprising:
    decoding a first layer image, wherein the first layer image is associated with a first layer;
    determining to perform an illumination compensation for a second layer current block when neighboring samples adjacent to the second layer current block are located in a second layer image, wherein the second layer image is associated with a second layer different with the first layer;
    determining a reference location of the first layer image corresponding to a disparity vector of the second layer current block;
    determining values of neighboring samples adjacent to a reference block comprising the reference location by using sample values of a boundary of the first layer image when the neighboring samples adjacent to the reference block are located outside the boundary of the first layer image;
    determining an illumination compensation parameter of the second layer current block based on the values of the neighboring samples adjacent to the second layer current block and the values of the neighboring samples adjacent to the reference block, and
    performing the illumination compensation to the second layer current block by using the determined illumination compensation parameter,
    wherein the reference location is a location of a top-left corner sample of the reference block, and the neighboring samples adjacent to the reference block comprise top samples and left samples adjacent to the reference block.

2. The method of claim 1, wherein the determining of the values of the neighboring samples comprises clipping locations of the neighboring samples based on the boundary of the first layer image.

3. The method of claim 1, wherein the determining of the values of the neighboring samples comprises:
    determining the values of the neighboring samples by using sample values of a left boundary or a right boundary of the first layer image when locations of the neighboring samples are outside the left boundary or the right boundary of the first layer image; and
    determining the values of the neighboring samples by using sample values of a top boundary or a bottom boundary of the first layer image when the locations of the neighboring samples are outside the top boundary or the bottom boundary of the first layer image.

4. The method of claim 1, wherein the determining of the reference location of the first layer image comprises determining the reference location of the first layer image corresponding to the location of the second layer current block by using the disparity vector.

5. The method of claim 4, wherein the determining of the reference location of the first layer image comprises determining the reference location based on an integer-pel location adjacent to a location of a first layer indicated by the disparity vector.

6. The method of claim 5, wherein a sub-pel location of the first layer image is determined as the reference location when the disparity vector indicates the sub-pel location, and
    wherein locations of the neighboring samples are determined based on the reference location.

7. The method of claim 1, wherein the illumination compensation parameter comprises at least one of a scale factor and an offset.

8. An inter-layer video decoding apparatus comprising:
    a first layer decoder configured to reconstruct a first layer image, wherein the first layer image is associated with a first layer; and
    a second layer decoder configured to reconstruct a second layer image by using the reconstructed first layer image, wherein the second layer image is associated with a second layer different with the first layer,
    wherein the second layer decoder comprises at least one processor, wherein the at least one processor is configured to:
        determine to perform an illumination compensation for a second layer current block when neighboring samples adjacent to the second layer current block are located in the second layer image,
        determine a reference location of the first layer image corresponding to a disparity vector of the second layer current block, and determine values of neighboring samples adjacent to a reference block comprising the reference location by using sample values of a boundary of the first layer image when the neighboring samples adjacent to the reference block are located outside the boundary of the first layer image,
        determine an illumination compensation parameter of the second layer current block based on the values of the neighboring samples adjacent to the second layer current block and the values of the neighboring samples adjacent to the reference block, and
        perform the illumination compensation to the second layer current block by using the determined illumination compensation parameter,
    wherein the reference location is a location of a top-left corner sample of the reference block, and the neighboring samples adjacent to the reference block comprise top samples and left samples adjacent to the reference block.

9. An inter-layer video encoding method comprising:
    encoding a first layer image, wherein the first layer image is associated with a first layer;
    determining to perform an illumination compensation for a second layer current block when neighboring samples adjacent to the second layer current block are located in a second layer image, wherein the second layer image is associated with a second layer different with the first layer;
    determining a reference location of the first layer image corresponding to a disparity vector of the second layer current block;
        determining values of neighboring samples adjacent to a reference block comprising the reference location by using sample values of a boundary of the first layer image when the neighboring samples adjacent to the reference block are located outside the boundary of the first layer image;
        determining an illumination compensation parameter of the second layer current block based on the values of the neighboring samples adjacent to the second layer current block and the values of the neighboring samples adjacent to the reference block, and performing the illumination compensation to the second layer current block by using the determined illumination compensation parameter, wherein the reference location is a location of a top-left corner sample of the reference block, and the neighboring samples adjacent to the reference block comprise top samples and left samples adjacent to the reference block.

10. The method of claim 9, wherein the determining of the values of the neighboring samples comprises clipping locations of the neighboring samples based on the boundary of the first layer image.

11. The method of claim 9, wherein the determining of the values of the neighboring samples comprises:

determining the values of the neighboring samples by using sample values of a left boundary or a right boundary of the first layer image when locations of the neighboring samples are outside the left boundary or the right boundary of the first layer image; and determining the values of the neighboring samples by using sample values of a top boundary or a bottom boundary of the first layer image when the locations of the neighboring samples are outside the top boundary or the bottom boundary of the first layer image.

12. The method of claim 9, wherein the determining of the reference location of the first layer image comprises determining the reference location of the first layer image corresponding to the location of the second layer current block by using the disparity vector.

13. The method of claim 12, wherein the determining of the reference location of the first layer image comprises determining the reference location based on an integer-pel location adjacent to a location of a first layer indicated by the disparity vector.

14. The method of claim 13, wherein a sub-pel location of the first layer image is determined as the reference location when the disparity vector indicates the sub-pel location, and wherein locations of the neighboring samples are determined based on the reference location.

15. The method of claim 9, wherein the illumination compensation parameter comprises at least one of a scale factor and an offset.

* * * * *